(12) United States Patent
Kobayashi et al.

(10) Patent No.: US 7,173,721 B1
(45) Date of Patent: Feb. 6, 2007

(54) MULTIFUNCTION MACHINE, SERVER, MULTIFUNCTION MACHINE/SERVER SYSTEM AND PROGRAM RECORDING MEDIUM

(75) Inventors: Sumitake Kobayashi, Kawasaki (JP); Keiji Ishiguro, Kawasaki (JP); Ken Murata, Kawasaki (JP); Takashi Kawasaki, Kawasaki (JP); Fumitake Abe, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/360,520

(22) Filed: Jul. 23, 1999

Related U.S. Application Data

(63) Continuation-in-part of application No. 09/100,320, filed on Jun. 19, 1998.

(30) Foreign Application Priority Data

| Jan. 8, 1998 | (JP) | ................................ 10-002642 |
| Sep. 18, 1998 | (JP) | ................................ 10-264585 |

(51) Int. Cl.
*G06F 13/00* (2006.01)
*G06F 15/00* (2006.01)

(52) U.S. Cl. ..................... 358/1.15; 358/1.14; 358/1.6; 358/468

(58) Field of Classification Search ............... 358/1.15, 358/1.14, 1.6, 468
See application file for complete search history.

(56) References Cited

U.S. PATENT DOCUMENTS

| 4,740,814 | A | * | 4/1988 | Folkins ..................... 399/15 |
| 4,947,345 | A | | 8/1990 | Paradise et al. |
| 5,377,016 | A | | 12/1994 | Kashiwagi et al. |
| 5,408,618 | A | | 4/1995 | Aho et al. |
| 5,483,589 | A | | 1/1996 | Ishida et al. |
| 5,552,901 | A | * | 9/1996 | Kikuchi et al. ............. 358/468 |
| 5,627,658 | A | * | 5/1997 | Connors et al. ............ 358/407 |
| 5,629,980 | A | | 5/1997 | Stefik et al. |
| 5,669,040 | A | | 9/1997 | Hisatake |

(Continued)

FOREIGN PATENT DOCUMENTS

DE  29 06 073  8/1979

(Continued)

OTHER PUBLICATIONS

English Translation of Office Action mailed by German Patent Office Sep. 25, 2003.

(Continued)

*Primary Examiner*—Douglas Q. Tran
*Assistant Examiner*—Alan Rahimi
(74) *Attorney, Agent, or Firm*—Staas & Halsey LLP

(57) ABSTRACT

A multifunction machine/server system capable of dealing with electronic documents at a higher efficiency and being actualized at low costs, is disclosed. The multifunction machine executes, when given a request for a second kind of process, the requested second kind of process without linkage with the server, and, when given a request for a first kind of process, requests the server to execute the first kind of process. The server incorporates a function of executing the first kind of processes that a plurality of multifunction machines request the server to execute. The multifunction machine/server system is constructed of the thus structured server and the plurality of thus structured multifunction machines.

17 Claims, 40 Drawing Sheets

U.S. PATENT DOCUMENTS

| | | | |
|---|---|---|---|
| 5,689,625 A | 11/1997 | Austin et al. | |
| 5,859,711 A | 1/1999 | Barry et al. | |
| 5,933,584 A * | 8/1999 | Maniwa | 358/1.15 |
| 5,974,234 A | 10/1999 | Levine et al. | |
| 5,978,522 A | 11/1999 | Ishii et al. | |
| 5,982,994 A | 11/1999 | Mori | |
| 5,987,225 A | 11/1999 | Okano | |
| 5,995,240 A * | 11/1999 | Sato | 358/407 |
| 6,020,973 A | 2/2000 | Levine et al. | |
| 6,023,345 A | 2/2000 | Bloomfield | |
| 6,031,975 A * | 2/2000 | Iijima | 358/1.15 |
| 6,069,707 A * | 5/2000 | Pekelman | 358/1.6 |
| 6,084,685 A | 7/2000 | Mori | |
| 6,130,757 A * | 10/2000 | Yoshida et al. | 358/1.15 |
| 6,288,791 B1 | 9/2001 | Minamizawa | |
| 6,330,070 B1 * | 12/2001 | Toyoda et al. | 358/1.15 |
| 6,353,482 B1 * | 3/2002 | Abe et al. | 358/1.15 |
| 6,434,343 B1 | 8/2002 | Kobayashi et al. | |
| 6,687,018 B1 | 2/2004 | Leong et al. | |
| 6,999,945 B1 | 2/2006 | Freeny, Jr. | |
| 7,023,979 B1 | 4/2006 | Wu et al. | |
| 2001/0012124 A1 * | 8/2001 | Morikawa | 358/296 |
| 2001/0038632 A1 | 11/2001 | Matsumoto et al. | |

FOREIGN PATENT DOCUMENTS

| | | |
|---|---|---|
| GB | 2015304 A | 9/1979 |
| JP | 05-328098 | 12/1993 |
| JP | 06-276347 | 9/1994 |

OTHER PUBLICATIONS

U.S. Appl. No. 10/721,512, filed Nov. 26, 2003, Sumitake Kobayashi et al.

* cited by examiner

FIG. 3

| FUNCTION | EFFECTIVE/ UNEFFECTIVE |
|---|---|
| FAX MANAGEMENT FUNCTION | EFFECTIVE |
| DOCUMENT MANAGEMENT FUNCTION | EFFECTIVE |
| ... | ... |

FIG. 4

| MAXIMUM CONNECTION NUMBER ||
|---|---|
| COMPOSITE MACHINE IDENTIFICATION INF.-1 | CONNECTION STATUS INF. (CONNECTED/UNCONNECTED) |
| COMPOSITE MACHINE IDENTIFICATION INF.-2 | CONNECTION STATUS INF. (CONNECTED/UNCONNECTED) |
| COMPOSITE MACHINE IDENTIFICATION INF.-3 | CONNECTION STATUS INF. (CONNECTED/UNCONNECTED) |
| ... | ... |
| COMPOSITE MACHINE IDENTIFICATION INF.-m | CONNECTION STATUS INF. (CONNECTED/UNCONNECTED) |

FIG. 5

| TITLE INF. | ADDRESS | FOLDER | ACCESS USER | ACCESS PASSWORD | COOPERATION SCHEME |
|---|---|---|---|---|---|
| | | | | | |
| | | | | | |
| | | | | | |
| | | | | | |

```
SERVER IP ADDRESS  :  172.22.21.101
  SELF-IP ADDRESS  :  172.22.21.102
   ROUTER ADDRESS  :  172.22.21.192
   OPERATION MODE  :  NORMAL OPERATION/COPY & PRINT
CONNECTION STATUS  :  CONNECTED/UNCONNECTED
```

FIG. 9

| FUNCTION | FUNCTION FLAG |
|---|---|
| COPY | USABLE (0xFF)/UNUSABLE (0x00) |
| PRINT | USABLE (0xFF)/UNUSABLE (0x00) |
| FAX TRANSMISSION | USABLE (0xFF)/UNUSABLE (0x00) |
| DOCUMENT REGISTRATION (SCANNER) | USABLE (0xFF)/UNUSABLE (0x00) |

FIG. 14
(A)
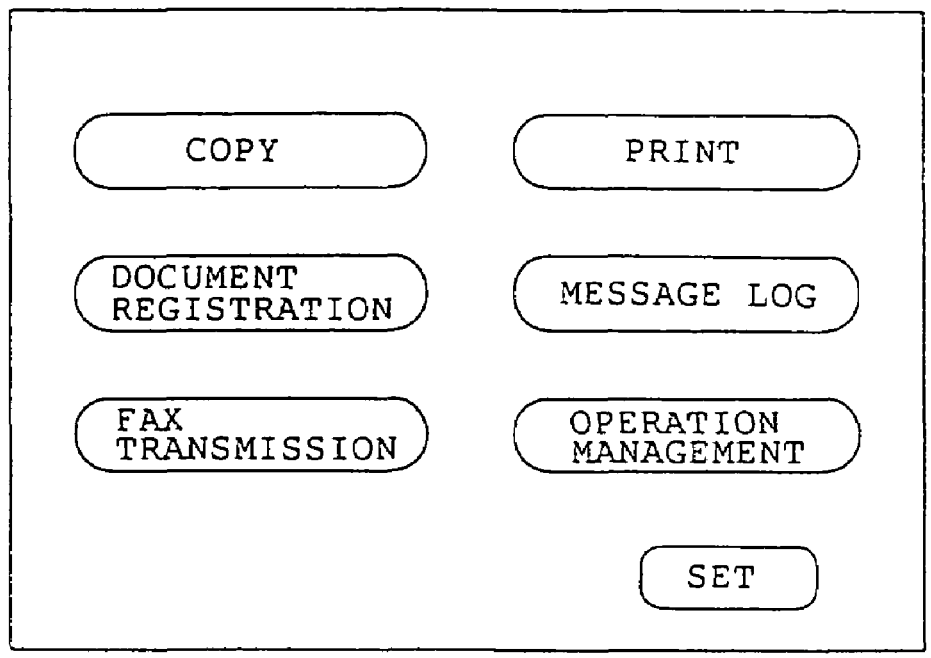
(B)
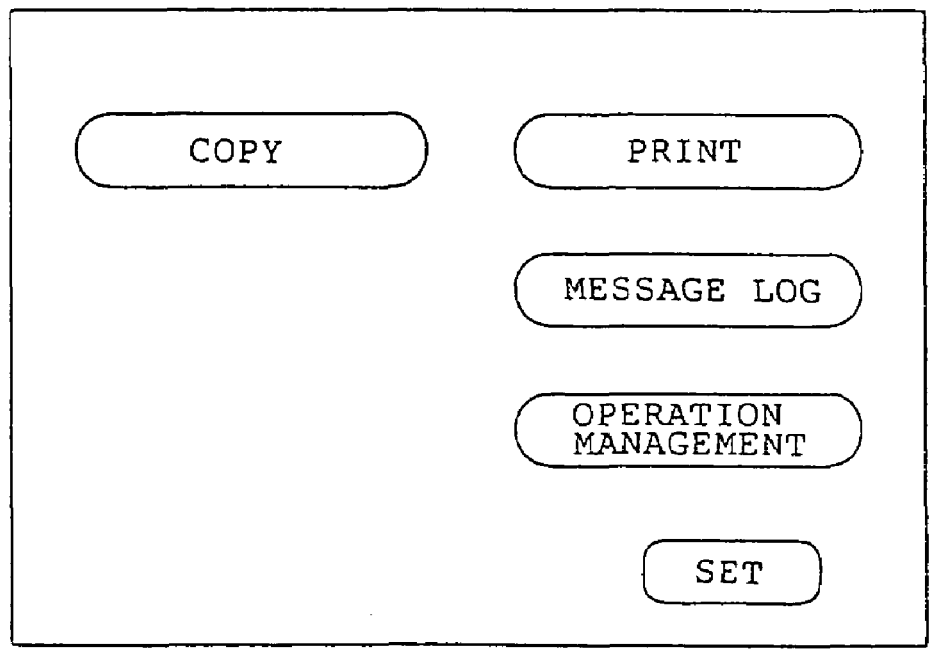

FIG. 20

Copying, document registration, and fax transmission are being performed ( STOP COPYING )

( STOP DOCUMENT REGISTRATION )

( STOP FAX TRANSMISSION )

FIG. 22

|  |  | SHEET SIZE | | | | | |
|---|---|---|---|---|---|---|---|
|  |  | A 3 | A 4 | A 5 | B 3 | B 4 | LETTER |
| PRINT | SINGLE SIDE | 0 | 1000 | 0 | 100 | 0 | 0 |
|  | DOUBLE SIDE | 0 | 50 | 0 | 200 | 0 | 0 |
| FAX | SINGLE SIDE | 10 | 50 | 0 | 50 | 0 | 0 |
|  | DOUBLE SIDE | 11 | 100 | 0 | 50 | 0 | 0 |
| COPY | SINGLE SIDE | 0 | 20 | 0 | 200 | 0 | 0 |
|  | DOUBLE SIDE | 5 | 50 | 0 | 400 | 0 | 0 |

FIG. 23

| COMPOSITE MACHINE | DATE | COPY | | | PRINT | | | FAX | | |
|---|---|---|---|---|---|---|---|---|---|---|
| | | A3-SINGLE SIDE | A3-DOUBLE SIDE | ... | A3-SINGLE SIDE | A3-DOUBLE SIDE | ... | A3-SINGLE SIDE | A3-DOUBLE SIDE | ... |
| 1 | | | | | | | | | | |
| 1 | | | | | | | | | | |
| 1 | | | | | | | | | | |
| 2 | | | | | | | | | | |
| 2 | | | | | | | | | | |
| c | | | | | | | | | | |
| c | | | | | | | | | | |
| c | | | | | | | | | | |

FIG. 24

COMMAND BODY :

C H A R G E
T E R M =1998/1/1-1998/3/31    (KIND OF COMMAND: CHARGING INFORMATION
R E P L Y = M A I L              NOTIFICATION REQUEST)
[EOF]                          (ADDING-UP TERM DESIGNATION INFORMATION)
                               (REPLY COOPERATION SCHEME DESIGNATION INFORMATION)
                               (END OF FILE)

COMMAND RESPONSE BODY :

C H A R G E
T E R M=1998/1/1-1998/3/31
<SEPARATOR INDICATING THAT MIME ATTACHMENT FILE IS ADDED>
TABULAR FILE OF CHARGING INFORMATION
[EOF]

FIG. 30

| ADDRESSEE | | |
|---|---|---|
| | COPY | NO DEFINITION |
| | PRINT | URL NAME (http://host01.co.jp/print01) (OR) HOST NAME PLUS PRINTER NAME (host01/print01) |
| | SCANNER | URL NAME (http://host01.co.jp/file01) (OR) HOST NAME PLUS STORAGE LOCATION DIRECTORY NAME (pc01/file01) |
| | FAX | FAX NUMBER (03-1234-5678) (OR) ABBREVIATED NUMBER (ABBREVIATION; 01) |

MULTIFUNCTION MACHINE, SERVER, MULTIFUNCTION MACHINE/SERVER SYSTEM AND PROGRAM RECORDING MEDIUM

This application is a Continuation-In-Part of U.S. Ser. No. 09/100,320, filed Jun. 19, 1998.

FIELD OF THE INVENTION

The present invention relates to a multifunction machine/server system constructed by connecting multifunction machines to a server via a network, a multifunction machine and a server for structuring the multifunction machine/server system, and a program recording medium recorded with a program for making a computer incorporating a communications function operate as a server. The present invention further relates to a multifunction machine connected to both of a local network to which a computer etc is connected, and a line such as a public telephone line and a private telephone line, to which a facsimile device etc is connected.

In recent years, the information in a variety of categories has been transferred and received between computers via a network such as a LAN (Local Area Network), a WAN (Wide Area Network) and Internet etc. Further, with a more-sophisticated digitization of copying machines, functions working as a FAX and a printer can be easily imparted to the copying machine, as a result of which an apparatus called a multifunction machine incorporating a copy function, a FAX function and a printer function becomes commercially available.

Known also is a multifunction machine of such a type as to add a LAN board (to which a function of a network printer is added) in order to enable the printer function incorporated into the multifunction machine to be utilized through the computer connected to the LAN.

FIG. 41 is a block diagram showing one mode of a prior art multifunction machine.

A multifunction machine 200 illustrated in FIG. 41 is constructed of a scanner unit 201, a printer unit 202, a display/operation unit 203, a communications control unit 204, a line control unit 205 and a control unit 206. Herein, the scanner unit 201 scans as an image a document etc printed on, e.g., a sheet of paper, and thus generates image data representing this very image.

Further, the printer unit 202 is a constructive element for printing on the sheet the image of the document etc which is based on the image data.

The display/operation unit 203 is constructed of an operation unit for effecting a variety of setting operations for the multifunction machine, and of a display unit for displaying an operation screen for the operation thereof and a result of the operation by the operation unit.

The communications control unit 204 is connected to the local network, and has a function of transmitting the image data onto the local network and receiving the image data transmitted via the local network. In addition to the multifunction machine shown herein, for example, a personal computer or a multifunction machine having the same functions as those of the former multifunction machine, is connected to the local network.

Further, the line control unit 205 is connected to a line such as a general public telephone line and a private telephone line used for, e.g., office telephones in a company, and incorporates a function of transmitting the image data to these lines and receiving the image data transmitted via the lines. A FAX device in addition to the multifunction machine is connected to this line.

Moreover, the control unit 206 controls all of the above elements, i.e., the scanner unit 201, the printer unit 202, the display/operation unit 203, the communications control unit 204 and the line control unit 205, thereby actualizing the four functions such as the copy function, the scanner function, the print function and the FAX function which will hereinafter be explained.

The copy function works in such a way that the scanner unit 201 generates the image data by reading the image and sends the image data to the printer unit 202, wherein the printer unit 202 prints on the sheet the image based on the image data. In this copy function, the user displays a copy-oriented operation screen on the display/operation unit 203, and sets the copy through an operation on the screen. Herein, according to the necessity, there is carried out a copying method such as double-side copying and forming a binding margin, and the number of copies may also be set. Further, the user set an original copy in the scanner unit 201 before and after this copy setting. Thereafter, upon pressing a start button (not shown) of the display/operation unit 203, the scanner unit 201 reads the original copy, and the image data obtained through this reading process is converted by the control unit 206 into a data format suited to the copying. The thus converted image data is thereafter transmitted to the printer unit 202, by which the printing based on the image data is conducted. Namely, according to this copy function, the image data flows along an arrow line a in FIG. 41.

Further, the scanner function works such that the scanner unit 201 reads the original copy 201, and the thus obtained image data is saved in a personal computer etc. When utilizing the scanner function, the user operates the display/operation unit 203 to display a scanner-oriented operation screen thereon, then sets a scanner input as well as setting a location in which to save the image data, and sets the original copy in the scanner unit 201. When setting the scanner input, as the necessity arises, the double-sides of the original copy are read as well as setting a read density etc. Thereafter, upon pressing the start button, the scanner unit 201 reads the original copy and thus generates the image data. The image data is, along a flow of an arrow line b shown in FIG. 41, converted by the control unit into a predetermine data format, and transmitted via the local network toward the saving location, i.e., the personal computer from the communications control unit 204.

Moreover, the print function works in such a way that the image data generated by the scanner unit 201 is transmitted along an arrow line b toward the local network, and further sent to a non-self printer or a printer unit of a non-self multifunction machine via this local network, and the printer or the printer unit effects printing based on the thus transmitted image data. Further, herein, the print function embraces such a function that when the image data generated by a non-self scanner or a scanner unit of the non-self-multifunction machine is transmitted via the local network, the transmitted image data is sent along an arrow line c to the printer unit 202, and the printer unit 202 performs printing thereof.

On the occasion of utilizing such a print function that the multifunction machine generates the image data generated by the multifunction machine shown in FIG. 41, then sent to a non-self printer or a non-self multifunction machine and print-outputted therefrom, the user operates the display/operation unit 203 to display a print-oriented operation screen thereon, and sets the print and a print addressee as well. Further, according to the necessity, the user designates the number of prints and double-side printing etc, then sets the original copy in the scanner unit 201, and presses the start button. Thereupon, the scanner unit 201 reads the original copy and thereby generates the image data. The image data is transmitted along the arrow line b to the control unit 206, by which the image data is converted into a data format suited to a transmission to a non-self printer or a non-self multifunction machine. The thus converted image data is transmitted from the communications control unit 204 via the local network toward an output addressee designated.

Furthermore, the FAX function works such that the scanner unit 201 generates the image data, and the generated image data is transmitted along an arrow line d via a line to a non-self FAX device connected to the line or to a non-self multifunction machine connected to the line. Further, herein the FAX function embraces a function of receiving the self-addressed image data via the line from the non-self FAX device or non-self multifunction machine connected to the line, then sending along an arrow line e the received image data to the printer unit 202, and making the printer unit 202 effect the printing based on the image data.

When utilizing the FAX, the user operates the display/operation unit 203 to display a FAX-oriented operation screen thereon, then designates, through operations on the operation screen, that the FAX function be utilized and a telephone number (FAX number) of an addressee of the image data, further designates a FAX mode and a read density etc as the case may be, then sets the original copy in the scanner unit 201, and presses the start button. Thereupon, the scanner unit 201 reads the original copy and thus generates the image data, and the generated image data is sent to and converted by the control unit into a FAX transmission format. Then, the line control unit 205 transmits the image data via the line toward a target FAX device or multifunction machine etc.

In the thus constructed multifunction machine is capable of actualizing the four functions such as the copy function, the scanner function, the printer function and the FAX function within this single apparatus, and is more advantageous in terms of an installation space and an introduction cost than in the case of individually introducing single-function apparatuses. This is because the scanner unit 201 and the print unit 202 can be structured in common through a plurality of functions.

According to a prior art system structured by connecting to a LAN a plurality of multifunction machines each having a function working as a network printer, a document can be copied and faxed by use of each multifunction machine, and besides a document created by a computer connected to the LAN can be printed by an arbitrary multifunction machine.

The prior art multifunction machine is, however, constructed without taking into consideration such a utilizing mode as to transfer and receive the data between the multifunction machines, and hence the LAN system including the plurality of conventional multifunction machines connected, is incapable of simply executing a process of transferring scan data created by a certain multifunction machine to other multifunction machines. In short, the conventional multifunction machine has a variety of functions and is nevertheless still an apparatus which can be utilized as a mere printer from the side of a computer connected to the network.

Under such circumstances, it is a first object of the present invention to provide a multifunction machine/server system incorporating equal or more functions than in a system constructed by utilizing prior art multifunction machines, and capable of dealing with an electronic document at a higher efficiency and of its being actualized at low costs, and a multifunction machine and a server which can be used for structuring the multifunction machine/server system. Further, in the prior art multifunction machine described referring to, e.g., FIG. 41, as explained above, the costs and the space are reduced by providing the scanner unit and a print unit which are structured in common through a plurality of functions, and further there is such a usability that a plurality of functions can be utilized by a single apparatus. Nevertheless, a method of using the individual functions is no better than a simple aggregation of methods of using the individual single-function devices in the prior art, and is still a method of how the conventional single-function devices should be used. In other words, for instance, there is obtained one copy of image data generated by reading an original copy with a scanner unit, the image data is sent to and saved in a personal computer and further sent to and printed by a non-self printer, and the image data is faxed. In such a case, there must be displayed respective operation screens for a copy function, a scanner function, a print function and a FAX function, and given an indication for each function. It is also required that a start button be pressed for each function after setting the original copy. The prior art multifunction machine is just a mere aggregation of the single-function devices in terms of operability, and does not sufficiently make the use of advantages of the multifunction machine itself again in terms of the operability.

Such being the case, it is a second object of the present invention to provide a multifunction machine which has pursued a more sophisticated operational usability.

SUMMARY OF THE INVENTION

To accomplish the first object, a multifunction machine/server system is constructed by connecting, to a network, a plurality of multifunction machines each having a second-kind-of-process function of executing, when given a request for a second kind of process, the requested second kind of process without linkage with a server, and a first-kind-of-process function of transferring, when given a request for a first kind of process, to the server an electronic document necessary for executing the first kind of process and requesting the server to execute the first kind of process with respect to the electronic document, and the server having a function of executing the first kind of process that the plurality of multifunction machines request the server to execute. Namely, according to the present invention, when structuring the multifunction machine capable of executing several kinds of processes, these processes are classified into processes (second kind of processes) such as copying which can be, it is desirable, executed solely by the multifunction machine, and processes (first kind of processes; e.g., FAX transmission and a document management) which may not be executed solely by the multifunction machine, or may preferably be executed en bloc by a non-self apparatus (server). As for the first kind of processes, the electronic document (image data etc) needed for executing the first kind of processes, is transferred to the server. In turn, the server is given a function of actually executing the first kind of processes that the plurality of multifunction machines request the server to execute, and the server and these multifunction machines are connected to the network, thereby structuring one system (the multifunction machine/server system). In this multifunction machine/server system, the first kind of processes can be executed by use of each multifunction machine without providing every multifunction machine with hardware (a FAX-oriented circuit, and a document-management-record-oriented recording device) required for only the first kind of processes. Therefore, when using the multifunction machine/server system according to the present invention, a document environment, which is the same as the document environment structured by use of the conventional multifunction machines, can be actualized at lower costs. Further, the electronic documents relative to the first kind of processes executed by the respective multifunction machines, converge at the server and can be therefore managed at a higher efficiency.

When structuring a multifunction machine/server system capable of obviating the above problems, it is feasible to a multifunction machine having the following construction according to the present invention.

According to the present invention, a multifunction machine comprises (a) a scanner unit for generating image data of a document, (b) a first-kind-of-process executing unit for executing a predetermined first kind of process requiring an operation in linkage with the server, which utilizes the image data generated by the scanner unit, (c) a second-kind-of-process executing unit for executing a second kind of process requiring no operation in linkage with the server, which utilizes the image data generated by the scanner unit, (d) a designating unit for designating the first or second kind of process executed by the first- or second-kind-of-process executing unit, (e) an execution control unit for making, when the designating unit designates the first- or second kind of process, the scanner unit generate the image data, and making the first- or second-kind-of-process executing unit execute the first or second kind of process using the image data, (f) a state judging unit for judging whether or not it is in a state of being operable in linkage with the server, and (g) a designation control unit for controlling, when the state judging unit makes a judgement of not being in the operable state in linkage with the server, the designating unit so that the designating unit is unable to designate the first kind of process.

Thus, according to the multifunction machine of the present invention, based on the result of judging whether in the operable state in linkage with the server or not, the operation state is automatically changed to the state of being unable to give an indication of executing an unexecutable process, and hence the indication of which an execution is designated by the user is to be surely executed in the multifunction machine/server system constructed using the multifunction machines of the present invention. In other words, it is feasible to obtain the multifunction machine/server system, wherein it never happens the user is notified of an effect that the process is unexecutable because of being unable to communicate with the server before long after indicating a given multifunction machine to execute a given process.

Note that on the occasion of actualizing the multifunction machine according to the present invention, it is desirable that the state judging unit, when the multifunction machine is started up, and when a first predetermined time elapses since the state judging unit makes a judgement of not being in the operable state in linkage with the server, transmits a request for establishing a connection to the server. It is also desirable that the state judging unit, when the server transmits a completion-of-assignment notification indicating that the linkage operation becomes possible, makes a judgement of being in the operable state in linkage with the server, and that the state judging unit, when the server does not yet transmits the completion-of-assignment notification, or when an elapsed time since a latest connection establishing request has been transmitted to the server comes to a second predetermined time, makes the judgement of not being in the operable state linking with the server.

The following is an elucidation of the reason why so. The multifunction machine/server system is constructed by use of the multifunction adopting the above stage judging unit and the server of the present invention, which includes (1) a predetermined number of request processing units each incorporating a function of processing a request given from the multifunction machine having received via the network, (2) an assigning unit, if there is a request processing unit among the predetermined number of multifunction machine requesting units, to which the multifunction machine is not assigned when receiving a request for establishing the connection from the multifunction machine via the network, assigns the multifunction machine having issued the connection establishing request to the request processing unit to which the multifunction machine is not assigned, and (3) an assignment canceling unit for canceling the assignment of the multifunction machine relative to the request processing unit which does not receive the request from the assigned multifunction machine for a predetermined time. If thus constructed, it is feasible to prevent the requests exceeding a server's processing capability (an information transmitting capability in the network) from being simultaneously inputted to the server from the plurality of multifunction machines. In other words, it follows that this multifunction machine/server system can be operated in such a form that the first kind of process of which the execution is designated by the user can be surely executed at a high speed. Note that the server of the present invention can be actualized either as a dedicated apparatus or by installing a program for making a computer operate as a server from a program recording medium into this computer having a communications function (e.g., a LAN board).

The multifunction machine according to the present invention may be constructed so that the state judging unit recognizes the first kind of process to which the server can correspond on the basis of the completion-of-assignment notification, and the designation judging unit, when the state judging unit makes the judgement of being in the operable state in linkage with the server, controls the designating unit to be unable to designate, within the predetermined first kind of process, a first kind of process excluding the first kind of process to which the server, it is recognized by the state judging unit, can correspond. If the thus constructed multifunction machine is used in combination with the server including the assigning unit for transmitting the completion-of-assignment notification containing the information on the functions executable by the server, it is feasible to structure the multifunction machine/server system operable in such a form that server is given the minimum number of functions when introduced, and thereafter properly given an addition of the function.

Further, the multifunction machine of the present invention may also be constructed by comprising an operation mode information recording unit for recording operation mode information indicating whether or not the first-kind-of-process executing unit is utilized, wherein the state judging unit, when the operation mode information recording unit is recorded with the operation mode information indicating that the first-kind-of-process executing unit is not utilized, makes the judgement of not being in the operable state in linkage with the server without trying to communicate with the server.

Moreover, on the occasion of actualizing the multifunction machine according to the present invention, the execution control unit, when a plurality of processed are designated by the designating unit, makes the scanner unit generate the image data, and controls the first- or second-kind-of-process executing unit to execute the plurality of processes designated by use of the image data in common. With the multifunction machine thus constructed, a plurality of processes (e.g., copy plus FAX transmission, and copy plus document registration) can be completed simply by setting the document in the scanner unit and designating the plurality of processes to be executed, and an operational load upon the operation is thereby reduced. Further, the scanner unit operates only once till the plurality of processes are completed, and hence a total processing time is also decreased.

Further, the multifunction machine according the present invention may further comprise a utilizing situation monitoring unit for monitoring utilized situations of the first- and second-kind-of-process executing units, a utilizing situation information recording unit recorded with utilizing situation information defined as a monitored result of the utilizing situation monitoring unit, and a utilizing situation information transmitting unit for transmitting to the server the utilizing situation information recorded in the utilizing situation information recording unit. The server of the present invention may include a utilizing situation information recording unit for recording, per multifunction machine, the utilizing situation information transmitted from the multifunction machines, and a utilizing situation information transmitting unit for transmitting, when receiving a utilizing situation information transmission request or in accordance with a predetermined schedule, the utilizing situation information recorded in the utilizing situation information recording unit to a node having issued the utilizing situation information transmission request. If the multifunction machine/server system is constructed of the thus structured multifunction machines and server, the server is capable of managing en bloc the utilizing situations of the respective multifunction machines, and the utilizing situation information recorded within the server is read from the node connected to the network. Accordingly, it is possible to easily manage both the accounting and consumables by using this multifunction machine/server system.

Moreover, when the multifunction machine is constructed by use of the utilizing situation information recording unit, the utilizing situation information recording unit may be a non-volatile recording unit, and may include a destruction detecting unit for detecting a destruction of the utilizing situation information recorded in the utilizing situation information recording unit, and a utilizing situation information managing unit for, when the destruction detecting unit detects a destruction of the utilizing situation information, requesting the server to send the utilizing situation information on the self multifunction machine, and making the utilizing situation information recording unit recorded with the utilizing situation information received as a response to the above request. Then, the multifunction machine/server system is constructed by combining this multifunction machine with a server including a non-volatile utilizing situation information recording unit structured as a non-volatile recording device, a destruction detecting unit for detecting a destruction of the utilizing situation information recorded in the utilizing situation information recording unit, and a utilizing situation information managing unit for requesting, when the destruction detecting unit detects the destruction of the utilizing situation information, each multifunction machine to send the utilizing situation information, and recording the utilizing situation information recording unit with the utilizing situation information received as a response to the above request. If thus constructed, the same utilizing situation information is recorded in two locations within the system, and therefore it is feasible to obtain the multifunction machine/server system operable at an extremely low probability that the utilizing situation information might be lost.

Furthermore, when actualizing the multifunction machine of the present invention, the multifunction machine may further comprise a displaying unit capable of displaying the image data. The execution control unit makes, before causing the first- or second-kind-of-process executing unit to execute the first or second kind of process, the displaying unit display the image data generated by the scanner unit, and makes, only when indicated to continue the process, the first- or second-kind-of-process executing unit execute the designated first or second kind of process which uses the image data. According to the thus constructed multifunction machine, if fallen into a failure to generate the image data due to some cause, it is possible to recognize this failure before executing the actual processes (such as printing on the sheet and registering the document in the self-apparatus or in a non-self apparatus) and therefore prevent the sheets and the time from being wasted. It is to be noted that the designating unit as a constructive element of the multifunction machine according to the present invention may involve the use of a touch panel having a function of displaying an image and a function of outputting positional information on a touch position, and the designation control unit may involve the use of a unit for controlling the designating unit (touch panel) to display an image containing no symbol for selecting the process which can not be designated.

To accomplish the second object of the present invention, a multifunction machine comprises a scanner unit for generating image data by scanning an image, a printer unit for printing the image data, a communications control unit for transmitting the image data onto a network, a line control unit for transmitting the image data onto a line, and a main control unit for controlling the scanner unit, the printer unit, the communications control unit and the line control unit in order to actualize a scanner function of sending the image data generated by the scanner unit onto the network for saving the image data, a copy function of making the scanner unit generate the image data, then transmitting the generated image data to the printer unit and making the printer unit execute the printing of the image data, a print function of making the scanner unit generate the image data and sending the image data onto the network for printing the image data generated by the scanner unit, and a FAX function of making the scanner unit generate the image data and sending the generated image data onto the line. The multifunction machine further comprises an operation unit for performing an operation of designating one or more arbitrary addressees among all addressees to which the image data can be sent in advance of the generation of the image data by the scanner unit, and an interlocking operation control unit for executing scheduling so that the image data generated by the scanner unit are distributed to all the addressees designated by the operation of the operation unit.

The above multifunction machine includes the operation unit capable of designating one or more arbitrary addressees among all the addressees to which the multifunction machine is capable of transmitting the image data, i.e., all the addressees irrespective of whether or not the addressee for which any one of the copy function, the scanner function, the print function and the FAX function is utilized. The multifunction machine further includes the interlocking operation control unit for performing the scheduling so that the image data, after being generated by the scanner unit, is distributed to all the designated addressees even when transmitted to the addressees by utilizing any functions. Hence, the addressee to which the image data is transmitted is once designated, the function adapted to this addressee automatically works without being aware of which function is used among the above four functions for transmitting the image data to the addressee, and the image data is transmitted to the addressee. Accordingly, the operability is remarkably enhanced.

Herein, the multifunction machine incorporating the four functions may further comprises a recording unit stored with the image data generated by the scanner unit. What is preferable as a main control unit is the control unit further including a compression/extension processing unit for executing a compression process upon the image data taken in by the scanner unit, thus storing the recording unit with the compressed image data, and executing an extension process upon the compressed image data by reading the same image data from the recording unit.

The above multifunction machine needs the recording unit for temporarily storing the image data taken in by the scanner unit till the image data is transmitted to the addressee. Such being the case, on the occasion of providing this recording unit, the recording unit having a small recording capacity may suffice, which is advantageous in terms of its costs.

Further, in the above multifunction machine incorporating the four functions, the operation unit is capable of designating the number of prints.

It is preferable that the interlocking operation control unit further includes a number-of-prints distributing unit for distributing, when designating a plurality of print-oriented addressees of the image data generated by the scanner unit through the operation of the operation unit and also designating a total number of prints, this designated total number of prints to the plurality of designated addressees.

This number-of-prints distributing unit may distribute the designated total number of prints in accordance with sorting capabilities of the plurality of designated print-oriented addressees. Alternatively, this number-of-prints distributing unit may distribute the designated total number of prints in accordance with print processing capabilities of the plurality of designated print-oriented designated addressees.

For example, the number of copies and the number of prints concerning the individual printer for printing may individually set. However, the plurality of addressees and the number of prints as a whole are designated, and the set number of prints for each addressee are automatically distributed, whereby the usability of the multifunction machine is enhanced all the more.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which:

FIG. 3 is an explanatory diagram showing a content of option information retained by the server in the first embodiment;

FIG. 4 is an explanatory diagram showing a content of multifunction machine connection information retained by the server in the first embodiment;

FIG. 5 is an explanatory diagram showing a content of non-self system linkage information retained by the server in the first embodiment;

FIG. 7 is a diagram showing an external configuration of an operation/display panel unit provided in the multifunction machine in the first embodiment;

FIG. 9 is an explanatory diagram showing a content of effective functional information retained by the multifunction machine in the first embodiment;

FIG. 14 is an explanatory diagram showing a function selection screen displayed by the multifunction machine in the first embodiment;

FIG. 20 is an explanatory diagram showing a state display screen displayed by the multifunction machine in the first embodiment;

FIG. 22 is an explanatory diagram showing a content of the accounting information retained by the multifunction machine in the first embodiment;

FIG. 23 is an explanatory diagram showing a content of the accounting information retained by the server in the first embodiment;

FIG. 24 is a flowchart showing a responding procedure to an accounting information notification request command of the server in the first embodiment;

FIG. 30 is a conceptual diagram showing a part of set information;

DETAILED DESCRIPTION OF THE PREFERRED EMBODIMENTS

Embodiments of the Invention

The present invention will hereinafter be specifically described by way of embodiments.

First Embodiment

Figure 1:
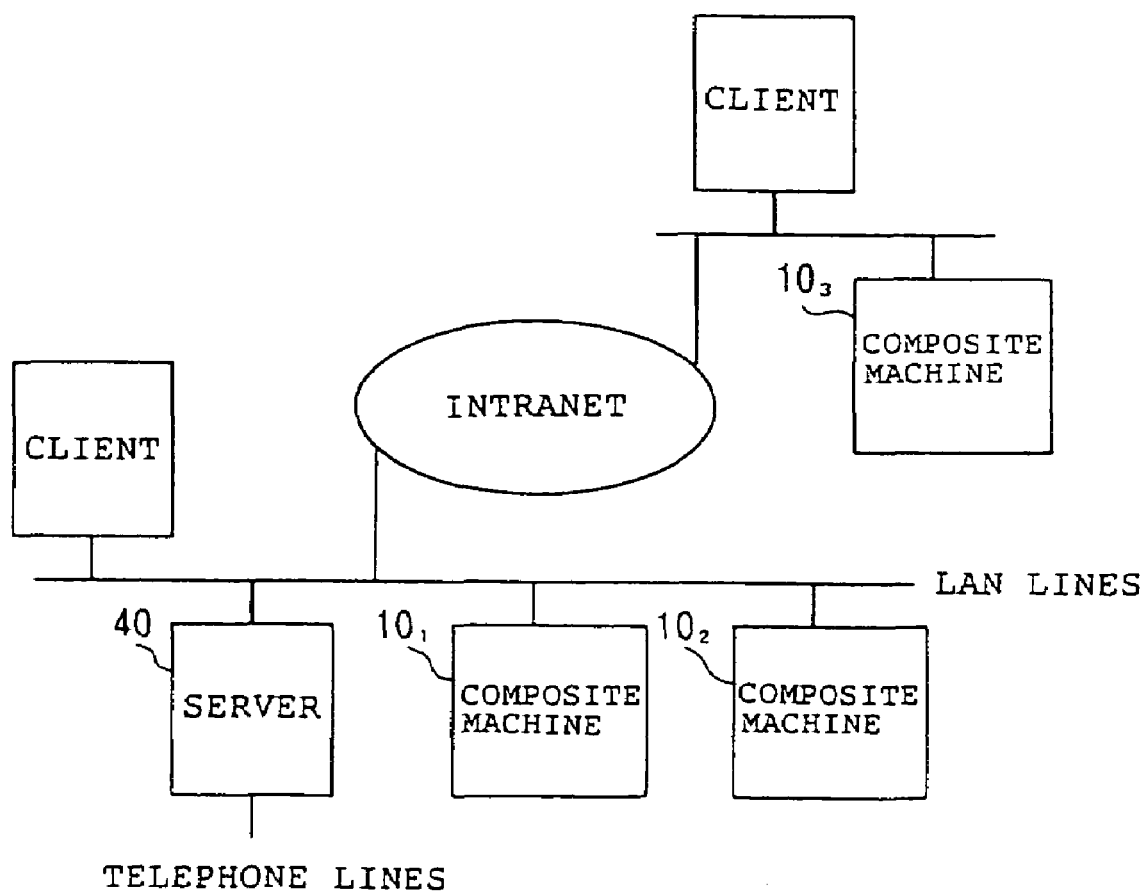
FIG. 1 is an explanatory diagram showing an architecture of a multifunction machine/server system constructed by using multifunction machines and a server in a first embodiment of the present invention.

To start with, an architecture and an operation of a multifunction machine/server system in a first embodiment of the present invention will be outlined referring to FIG. 1.

As illustrated in FIG. 1, the multifunction machine/server system is normally constructed by connecting a plurality of multifunction machines 10 to a single server 40 via a LAN and an intranet. The server 40 is also connected to telephone lines.

The multifunction machine 10 is an apparatus structured by adding, to an apparatus incorporating a copy function, functions classified as a print function, a FAX transmitting function and a document registering function. The print function is defined as a function of causing another multifunction machine (or an apparatus incorporating equivalent functions) connected to the network to print image data obtained by scanning a document (which is hereinafter termed scan data). The print function includes a function capable of processing a print request given from another apparatus connected to the network. The FAX transmitting function is a function of requesting the server 40 to fax the scan data (the multifunction machine 10 itself in the first embodiment does not have the faxing function. The document registering function is a function of requesting the server 40 to register the scan data (i.e., to store the scan data in a folder possessed by the apparatus connected to the network).

Further, the multifunction machine 10 is also structured as an apparatus capable of simultaneously using the plurality of functions on the same document. To be specific, the multifunction machine 10 is the apparatus capable of executing such a process as to, for example, copy a certain document and fax this document at the same time.

The server 40 incorporates functions such as processing simultaneously (in parallel) the FAX transmission requests and document registration requests from the plurality of multifunction machines 10, and managing conditions of how the respective multifunction machines 10 are utilized.

The configurations and operations of the multifunction machine 10 and of the server 40 in the first embodiment will hereinafter be specifically discussed.

Figure 2:
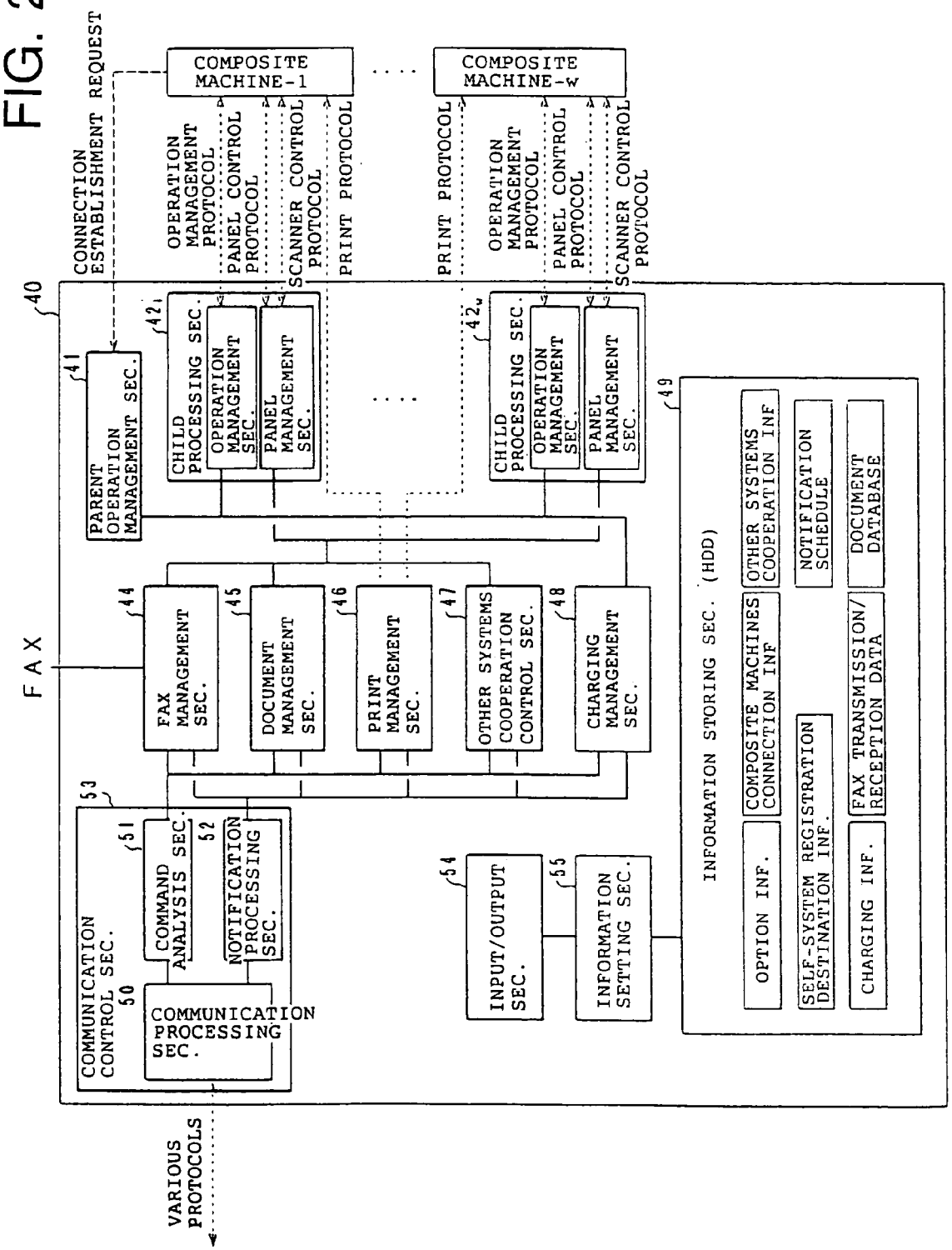
FIG. 2 is a functional block diagram showing a construction of a server in the first embodiment.

To begin with, the configurational and operational outlines of the server 40 are explained. FIG. 2 is a functional block diagram of the server 40 in the first embodiment. As shown in FIG. 2, the server 40 includes a parent operation management unit 41, a plurality of child processing units 42, a FAX management unit 44, a document management unit 45, a print management unit 46, a non-self system linkage control unit 47, an accounting management unit 48, an information recording unit 49, a communications control unit 53, an I/O unit 54, and an information setting unit 55. Note that the server 40 is actualized by installing a for-the-server developed main program and a variety of option programs into a computer provided with a LAN-oriented communications control circuit, a telephone-line-oriented communications control circuit. The illustrated functional block diagram corresponds to a case where all the option programs are installed thereinto.

Further, the server 40 is constructed as a device of which the operation is in principle started in a state where option information, multifunction machine connection information, non-self system linkage information and intra self-system registration addressee information, are set in the information recording unit 49 (corresponding to an HDD (Hard Disk Drive) provided in the computer).

The option information is, as schematically shown in FIG. 3, an item of information indicating the functions executable by the server 40 (which are the option programs installed into the server 40, and is, when installing the option programs, set in the information recording unit 49 by an installer thereof.

The multifunction machine connection information, as shown in FIG. 4, consists of identification information (IP addresses) of the multifunction machines of which the connections are permitted, state-of-connection information indicating whether or not the multifunction machines identified by the corresponding multifunction machine identification information are at present connected to the server 40, and a maximum number of connections defined as the number of multifunction machines which may be simultaneously connected. Moreover, the non-self system linkage information is an item of information utilized when registering the document in an intra non-self system folder, and is, as shown in FIG. 5, composed of pieces of information on the intra non-self system folder (which are an address, a folder, an access user, an access password, and a linkage system) and of title information. Further, the intra self-system registration addressee information is classified as information utilized when registering the document in the intra self-system folder, and as information taking such a form that the address and the linkage system are removed out of the non-self system linkage information.

The multifunction machine connection information, the non-self system linkage information and the intra self-system registration addressee information, of which specific utilizing procedures will be described later on, are to be set, before starting the operation of the server 40 (alternatively when the network architecture is changed), making the information setting unit 55 function through the I/O unit 54 (corresponding to a keyboard, and a display etc). The state-of-connection information defined as an element of the multifunction machine connection information is rewritten by the server 40, and hence, when the multifunction machine connection information is set by use of the information setting unit 55, only the maximum number of connections and the multifunction machine identification information are set.

The parent operation management unit 41, the child processing units 42, the FAX management unit 44, the print management unit 46 and the communications control unit 53 within the server 40, have, as schematically shown in FIG. 2, the functions to communication with other apparatuses.

The parent operation management unit 41 recognizes as a connection request a connection establishing request given from the multifunction machine 10, and judges whether or not this connection request should be accepted with reference to the multifunction connection information (FIG. 4) in the information recording unit 49 (the details thereof will hereinafter be explained). Then, the parent operation management unit 41, when judging that the connection request is to be accepted, allocates one child processing unit 42 to that multifunction machine 10 and activates it.

The child processing unit 42 is constructed of an operation management unit for performing communications based on an operation management protocol with the multifunction machine 10, and a pane management unit for performing communications based on a panel control protocol and a scanner control protocol. The child processing unit 42, when receiving the request (the FAX transmission request, or the document registration request etc) from the multifunction machine 10, starts up the FAX management unit 44, or the document management unit 45 or the non-self system linkage control unit 47 in accordance with a content of the request. Further, the child processing unit 42 also executes a process of reading the data requested by the multifunction machine 10 out of the information recording unit 49, and transmitting the data back to the multifunction machine 10.

The communications control unit 53 is constructed of a communications processing unit 50, a command analyzing unit 51 and a notification processing unit 52. The communications processing unit 50 is classified as a circuit capable of controlling communications based on a variety of network protocols such as HTTP (Hyper Text Transport Protocol) communications, mail communications and ETP (File Transfer Protocol) communications etc, and supplies the command analyzing unit 51 with data (a command) corresponding to a content of the communications data received. The command analyzing unit 51 analyzes the command given from the communications processing unit 50, and activates the management unit or the control unit corresponding to an analyzed result. The notification processing unit 52 creates, based on an indication from the management unit or the control unit, communications data for transmitting the supplied data in accordance with a given protocol. Then, the notification processing unit 52 calls and requests the communications processing unit 50 to transmit the created communications data.

The FAX management unit 44 receives a FAX via a FAX line (a telephone line). Further, the FAX management unit 44, when given an indication of FAX transmission from the multifunction machine 10 or other nodes via the panel management unit 43 or the communications control unit 53, implements the FAX transmission based on this indication. Moreover, the FAX management unit 44 also manages FAX transmitting/receiving data as well as managing a hysteresis of transmitting/receiving events by use of the information recording unit 49.

The document management unit 45 manages document database within the information recording unit 49. The document management unit 45, when given an indication from the command analyzing unit 51 and the panel management unit 43, registers a new document (an electronic document such as image data etc) in the document database, and moves or deletes the document within the document database in accordance with that indication. Further, the document management unit 45 also prints and faxes the documents in the document database in linkage with the print management unit 46 and the FAX transmission unit 44.

The print management unit 46 manages and processes print requests inputted from non-self systems via the command analyzing unit 51. To be more specific, the print management unit 46 indicates the multifunction machine 10 indicated to print the data given from other nodes, using a print protocol.

The non-self system linkage control unit 47 processes document registration requests inputted to the non-self systems via the panel management unit 43 by use of the communications control unit 53.

The accounting management unit 48 periodically collects pieces of accounting information recorded in the connected multifunction machines via the child processing units 42 (the operation management units), and records the accounting information in the information recording unit 49. Further, the accounting management unit 48, when receiving a notification request of the accounting information from the non-self system via the communications control unit 53, notifies the non-self system of the accounting information in response to this notification request. Furthermore, when a notification schedule is set in the information recording unit 49, the accounting management unit 48 executes a process of notifying a specified system of the accounting information in accordance with a schedule defined in the above notification schedule.

Next, constructive and operational outlines of the multifunction machine 10 will be explained.

Figure 6:
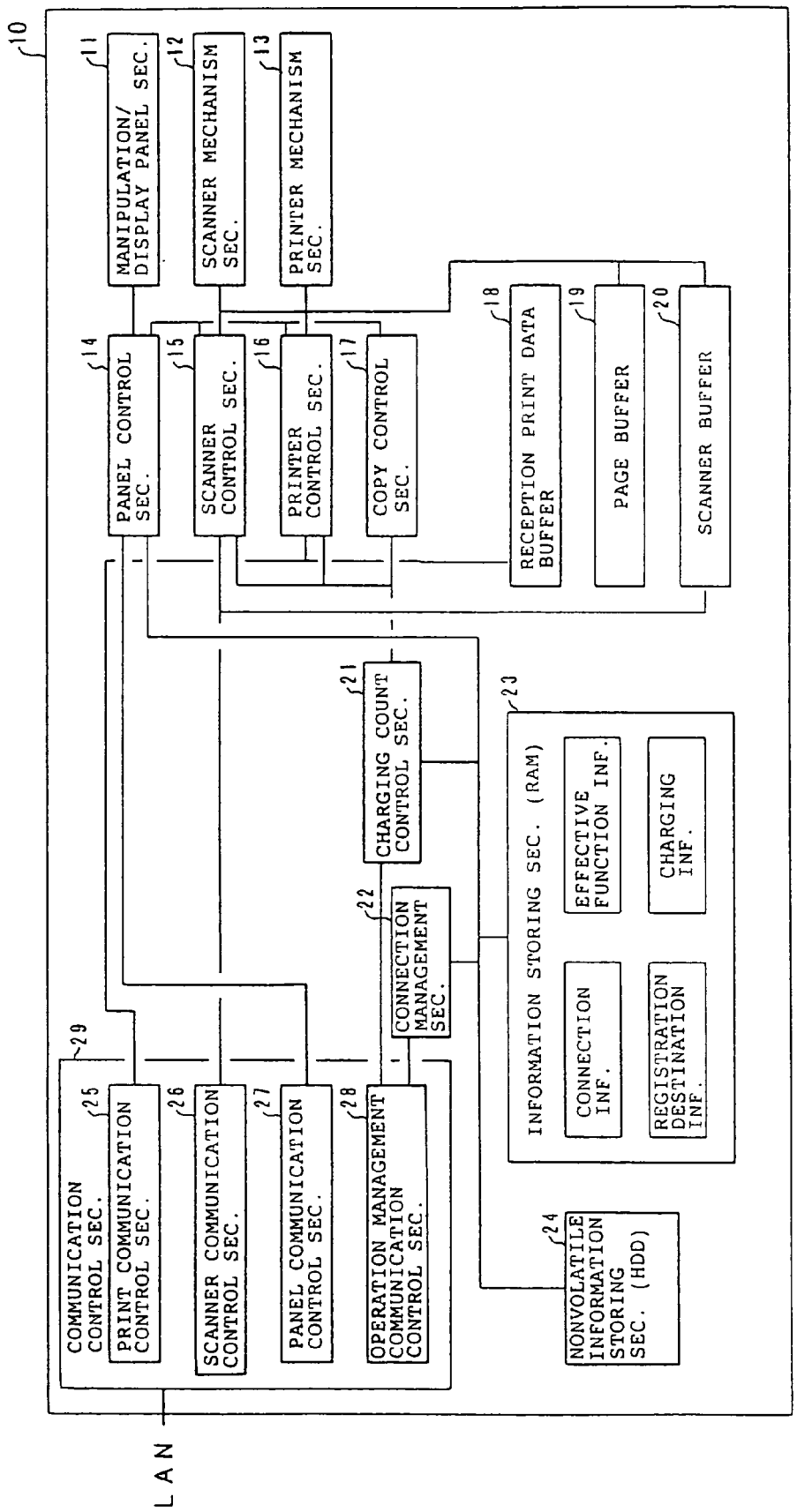
FIG. 6 is a functional block diagram showing a construction of the multifunction machine in the first embodiment.

As shown in FIG. 6, the multifunction machine 10 includes an operation/display panel unit 11, a scanner mechanism unit 12, a printer mechanism unit 13 and a communications control unit 29. The multifunction machine 10 further includes a panel control unit 14, a scanner control unit 15, a printer control unit 16, a copy control unit 17, an accounting control unit 21 and a connection management unit 22. The multifunction machine 10 still further includes a received print data buffer 18, a page buffer 19, a scanner-oriented buffer 20, an information recording unit 23 and a non-volatile information recording unit 24.

The connection information within the information recording unit 23 consists of, as shown in FIG. 7, a server IP address, a self-IP address, a router address, a piece of operation mode information and a piece of state-of-connection information. The server IP address, the self-IP address and the router address are defined as IP addresses of the server 40, the self multifunction machine 10 and a router connected to the LAN to which the self multifunction machine 10 is connected. The operation mode information indicates whether or not the server 40 is connected to the network to which the self multifunction machine 10 is connected (alternatively whether to make the multifunction machine 10 operate in linkage with the server 40). The state-of-connection information indicates whether or not the self multifunction machine 10 is at present connected to the server 40 (i.e., whether or not the multifunction machine 10 is in an operable state in linkage with the server 40).

Note that the multifunction machine 10 starts operating in a state where the original (the state-of-connection information shows "being unconnected") of this item of connection information is set in the non-volatile information recording unit 24.

Figure 8:
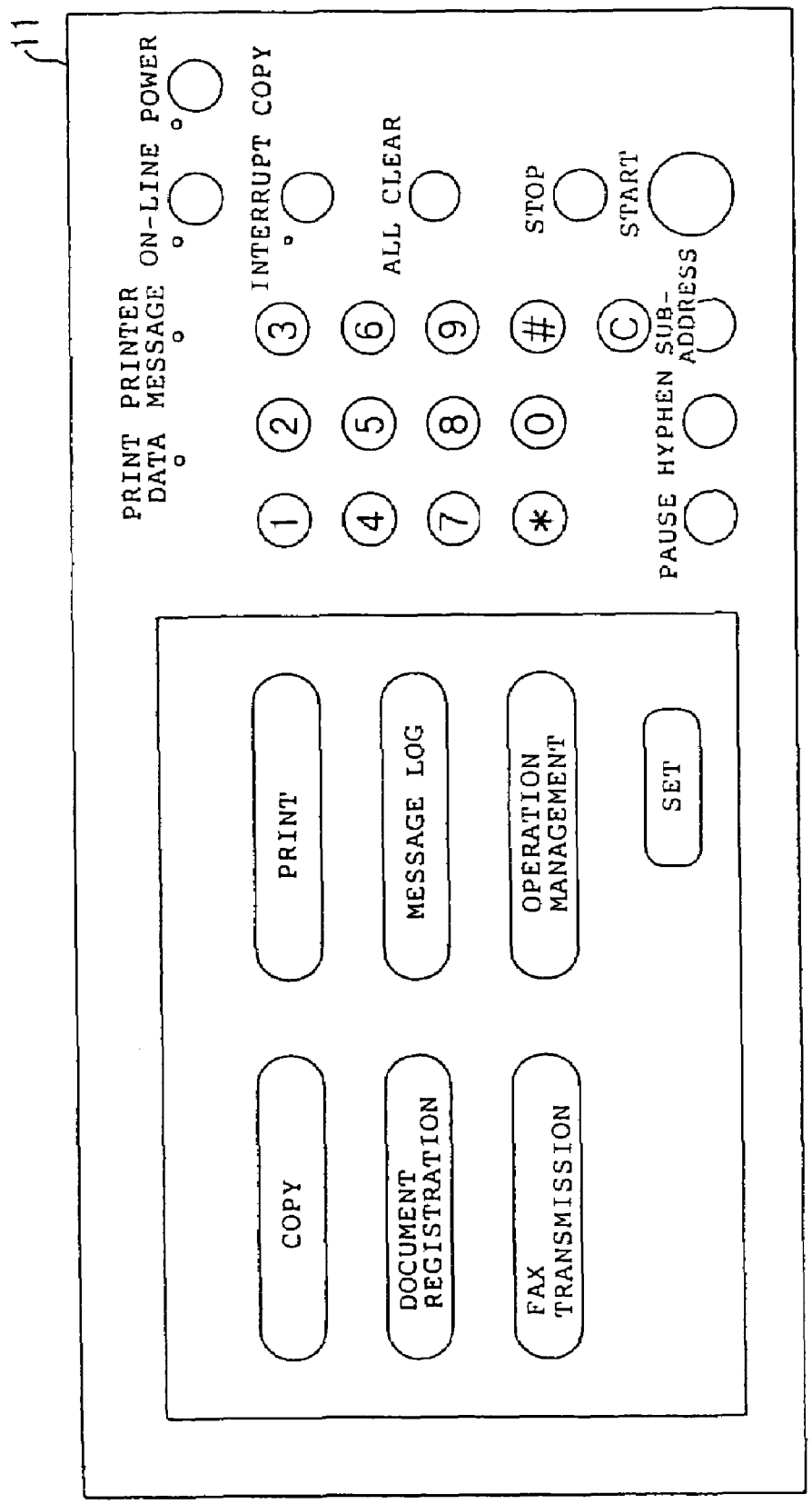
FIG. 8 is an explanatory diagram showing a content of the connection information retained by the multifunction machine in the first embodiment.

The operation/display panel unit 11 is an interface between an operator and the multifunction machine. As shown in FIG. 8, the operation/display panel unit 11 is constructed of a touch screen panel on which to display a variety of screens, a plurality of button switches and a plurality of state-display lamps.

The scanner mechanism unit 12 is a mechanism for scanning the document set to the unit 12 itself by use of a photo detector, and outputting digital data corresponding bright/dark patterns of the document. Note that what is used as the scanner mechanism unit 12 is the mechanism including an automatic document feeder in the first embodiment. The printer mechanism unit 13 is defined as a mechanism for printing on a sheet of paper an image corresponding to raster image data given.

The communications control unit 29 is a device for communicating with other apparatuses (such as the server 40 and the multifunction machine 10 etc) connected to the network via the LAN circuits. The communications control unit 29 comprises a print-oriented communications control unit 25, a scanner-oriented communications control unit 26, a panel-oriented communications control unit 27, and an operation-management-oriented communications control unit 28. The print-oriented communications control unit 25 among these units accepts communications (print requests) from non-self system (the server 40, the non-self multifunction machine 10, and a client), and stores a received print data buffer 18 with the print data transmitted from the requesting system. Further, the print-oriented communications control unit 28, when accepting the print request, notifies the printer control unit 16 of this effect.

The scanner-oriented communications control unit 26 accepts the communications (a scanner control command) pursuant to a scanner control protocol, and notifies the scanner control unit 15 of it. Further, the scanner-oriented communications control unit 26, when given a predetermined indication from the scanner control unit 15, transmits to the server 40 the image data stored in the scanner-oriented buffer 20 via the LAN circuit in accordance with a scanner control protocol.

The panel-oriented communications control unit 27 accepts the communications based on a panel control protocol, and notifies the panel control unit 14 of this effect. Further, the panel-oriented communications control unit 27, when given a command transmitting indication from the panel control unit 14, transmits a command indicated onto the LAN circuit in accordance with the panel control protocol.

The operation-management-oriented communications control unit 28 accepts the communications (a command) based on an operation management protocol and notifies, of this accepted command, any one of the accounting control unit 21 and the connection management unit 22 in accordance with a content thereof. Furthermore, the operation-management-oriented communications control unit 28, when given a command transmitting indication from the accounting control unit 21 or the connection management unit 22, transmits the indicated command onto the LAN circuit according to the operation management protocol.

The panel control unit 14 controls the operation/display panel unit 11 and displays, on the touch screen panel thereof, a function selection screen (see FIG. 8) for the user to select a function and a data setting screen for the user to set the data required for making each function work. Then, the panel control unit 14, in the case of detecting that the operation is done upon the operation/display panel unit 11, executes a process (such as making a change on the operation/display panel unit 11, and starting up he scanner control unit 15 and the copy control unit 17 etc) corresponding to a display content at that point of time and a detected operation content. It is to be noted that the panel control unit 14 also incorporates a function for creating the original of the above-described connection information within the non-volatile information recording unit 24.

When the panel control unit 14 starts a substantial operation, the connection management unit 22 sets, in the information recording unit 23, effective function information for indicating whether or not the respective functions as shown in FIG. 9 incorporated into the multifunction machine 10 are at present effective. The panel control unit 14, when displaying the function selection screen, refers to the effective function information and displays the screen on which only the function with a function flag being "usable" (of which a detailed explanation is given later on).

The scanner control unit 15, in accordance with the indication given from the panel control unit 14 or the copy control unit 17 or the scanner-oriented communications control unit 26, controls the scanner mechanism unit 12 and makes the scanner-oriented buffer 20 stored with the image data of the document set in the scanner mechanism unit 12.

The printer control unit 16, based on the indication given from the copy control unit 17, controls the printer mechanism unit 12 to print on the sheet the image data recorded in the scanner-oriented buffer 20 or the page buffer 19. Further, the printer control unit 16, when given a predetermined indication from the print-oriented communications control unit 25, if necessary, converts the print data recorded in the received print data buffer 18 into raster image data, and thereafter supplies the printer mechanism unit 13 with this piece of raster image data.

The copy control unit 17, when given a start-of-copy-operation indication from the panel control unit 14, synchronously controls the scanner control unit and the printer control unit 16 so that the printer mechanism unit 13 prints the copy of the document set in the scanner mechanism unit 12. The accounting control unit 21, when notified of an occurrence of an event which needs accounting from the scanner control unit 15 or the printer control unit 16 or the copy control unit 17, updates the accounting information within the information recording unit 23. Further, the accounting control unit 21 periodically executes a process of creating, within the non-volatile information recording unit 24, a copy of the accounting information in the information recording unit 23. Moreover, the accounting control unit 21, when receiving an accounting information inquiry command from the server 40 via the operation-management-oriented communications control unit 28, notifies the sever 40 of the accounting information via the operation-management-oriented communications control unit 28.

The operations of the multifunction machine 10 and of the server 40 in the first embodiment will hereinafter be described more specifically referring to a flowchart.

At first, there will be explained the operation when starting up the multifunction machine 10 and the operation of the server 40, which corresponds to the former operation. As shown in a left part of FIG. 10, upon starting up the multifunction machine 10 (upon switching ON the power source), to begin with, the connection management unit 22 reads, into the information recording unit 23, the connection information recorded in the non-volatile information recording unit 24 (step S101). Then, the connection management unit 22 judges whether an operation mode in the connection information indicates a "normal operation" or "print & copy" (step S102). If the operation mode is the "normal operation" (step S102; normal operation), the connection management unit 22 issues a connection establishing request to a node, i.e., the server 40 having the server IP address in the connection information by controlling the operation-management-oriented communications control unit 28 (step S103).

Figure 10:
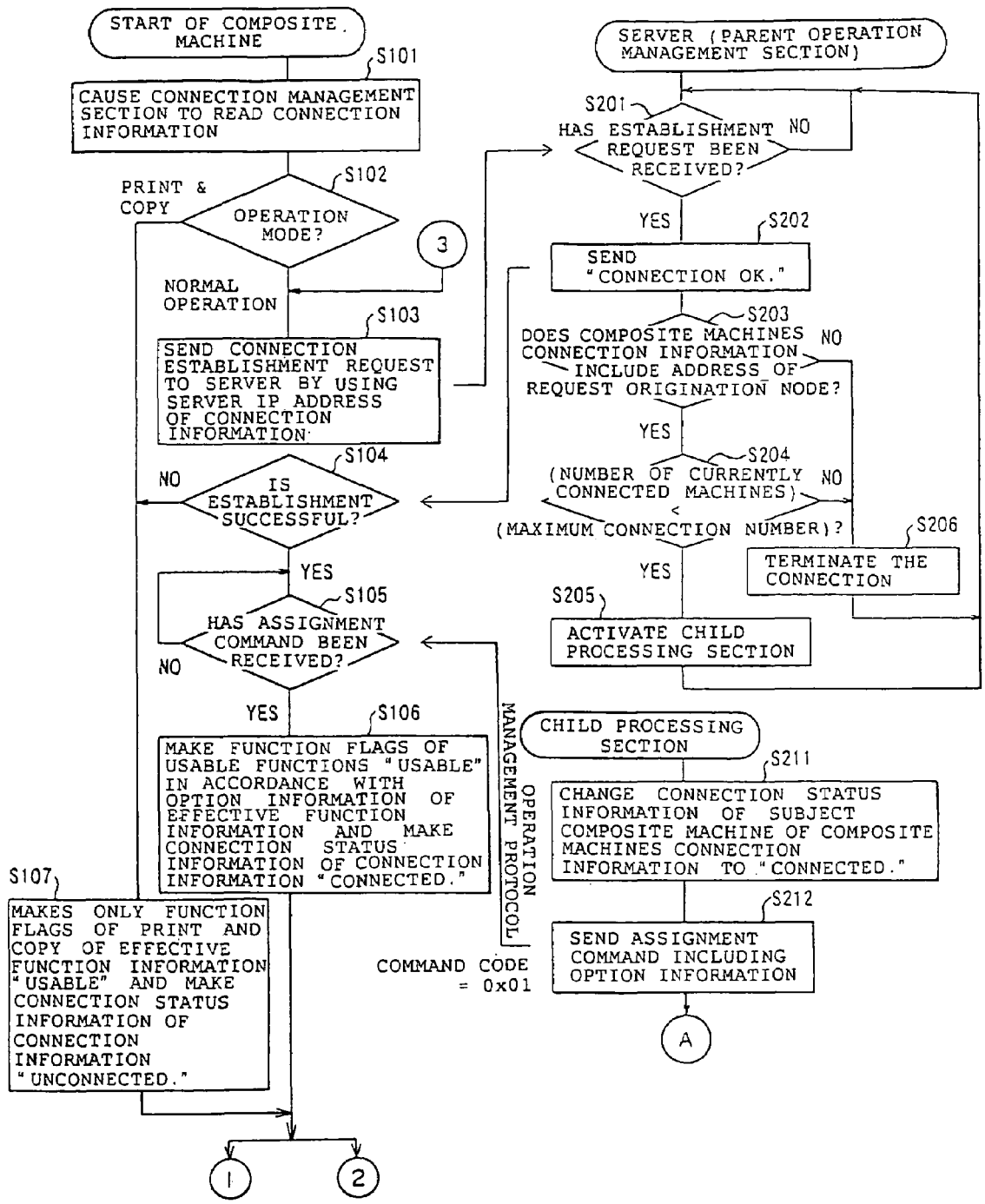
FIG. 10 is a flowchart showing operating procedures of the multifunction machine and the server in the first embodiment.

On the other hand, after starting up the server 40, the parent operation management unit 41 in the server 40, as shown in a right part of FIG. 10, monitors whether or not the connection establishing request is received (step S201), and, when receiving the connection establishing request (step S201; YES), notifies the requesting node of "connection OK" (step S202). Subsequently, the parent operation management unit 41 judges whether or not the requesting node having issued the connection establishing request is a multifunction machine of which an address is recorded in the multifunction connection information (FIG. 4) (step S203). If the requesting node is judged to be the multifunction of which the address is recorded in the multifunction connection information (step S203; YES), the parent operation management unit 41 judges based on the state-of-connection information in the multifunction machine connection information whether or not the number of the multifunction machines connected at present is less than the maximum number of connections (step S204).

If the number of the multifunction machines connected at present is judged to be less than the maximum number of connections (step S204; YES), the parent management unit 41 transfers the address of the multifunction machine having issued the connection establishing request (which is hereinafter referred to as an assigned multifunction machine), and starts up the child processing unit (the operation management unit and the panel management unit) (step S205). Thereafter, the parent operation management unit 41 returns to step S201 and stands by herein till the connection establishing request from the non-self multifunction machine is to be received.

Further, if the requesting node is judged to be a node of which an address is not recorded in the multifunction machine connection information (step S203; NO), and if the number of the multifunction machines connected at present is the maximum number of connections (step S205; NO), the parent operation management unit 41 cuts off the connection (step S206), and moves back to step S201.

The child processing unit 42 (the operation management unit) in the server 40, when started up, at first changes, to being "connected", the state-of-connection information on the assigned multifunction machine in the multifunction connection information (step S211). Subsequently, the child processing unit 42 transmits an assignment command containing option information (see FIG. 3) to the multifunction machine (step S212).

The connection management unit 22 in the multifunction machine 10, after transmitting the connection establishing request, stands by till the "connection OK" is sent back from the server 40 (step S105). Then, when the "connection OK" is sent back (step S105; YES), the connection management unit 22 further stands by till the assignment command is received (step S106; NO). Then, the connection management unit 22, when receiving the assignment command is received (step S106; YES), recognizes, based on the option information contained in the assignment command, the function usable at present, sets a function flag relative to the usable function in the effective function information (see FIG. 9) to "being usable" and a function flag relative to an unusable function therein to "being unusable", and also sets the intra-connection-information state-of-connection information to being "connected" (step S106).

While on the other hand, if the operation mode is "print & copy" (step S102; print& copy), and if the connection establishment falls into a failure (step S104; NO), the connection management unit 22 sets function flags relative to the print function and the copy function in the effective function information, to being "usable". Further, the connection management unit 22 sets the function flags relative to the FAX transmitting function and the document registering function to being "unusable", and the intra-connection-information state-of-connection information to being "unconnected" (step S107).

After the connection management unit 22 have finished executing the processes shown in the Figure, the panel control unit 14 etc starts executing processes (which will hereinafter be explained in details) in the multifunction machine 10. Further, the connection management unit 22 starts processes shown in FIG. 11 independently of the processes by the panel control unit 14 etc.

To be more specific, the connection management unit 22, if a state of connection in the connection information indicates being "connected" (step S111; YES), monitors whether or not a time of over 5 minutes has elapsed since the command was received from the server 40 last time (step S112). Then, the connection management unit 22, when detecting that the time of over 5 min has elapsed since the command was received last time (step S112; YES), sets the function flags pertaining to the FAX transmitting function and the document registering function in the effective function information to being "unusable", and sets the intraconnection-information state-of-connection information to being "unconnected" (step S113). Subsequently, the connection management unit 22 notifies the panel control unit 14 of such an effect that the effective function information has been updated (step S114).

Whereas if the state of connection in the connection information indicates being "unconnected" (step S111; NO) the connection management unit 22 monitors whether or not 2 minutes have elapsed since the state of connection turned out to be "unconnected" (step S115). Then, the connection management unit 22, when detecting that 2 minutes have elapsed (step S115; YES), returns to step S103 in FIG. 10, and reissues the connection establishing request to the server 40.

Figure 11:
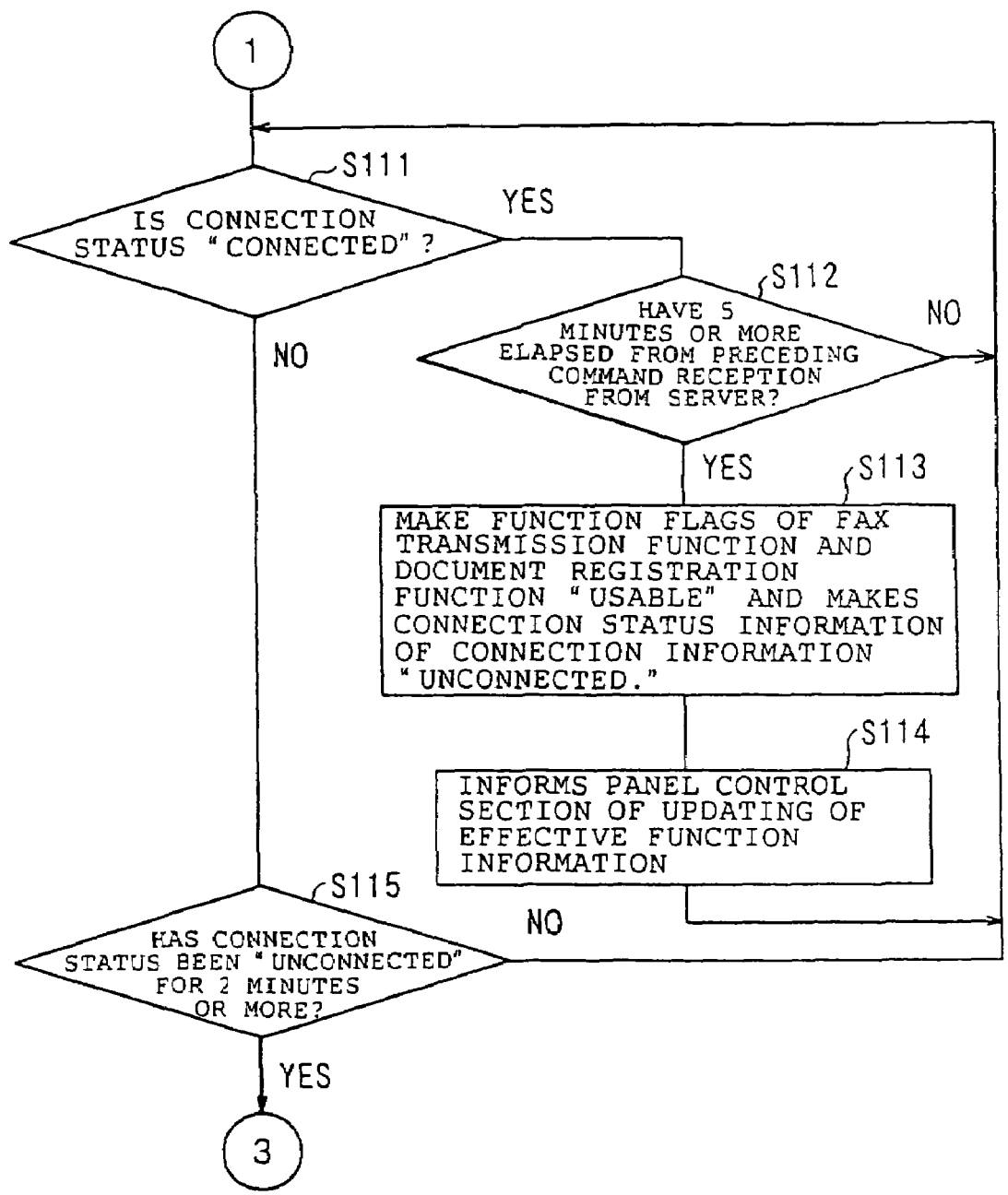
FIG. 11 is a flowchart showing an operating procedure of the multifunction machine in the first embodiment.

Note that the processes shown in FIG. 11 are, though not shown for avoiding intricacy, executed only when the operation mode is the "normal operation" (if diverted to "print & copy" in step S102 in FIG. 10, the processing in FIG. 11 is not implemented).

Figure 12:
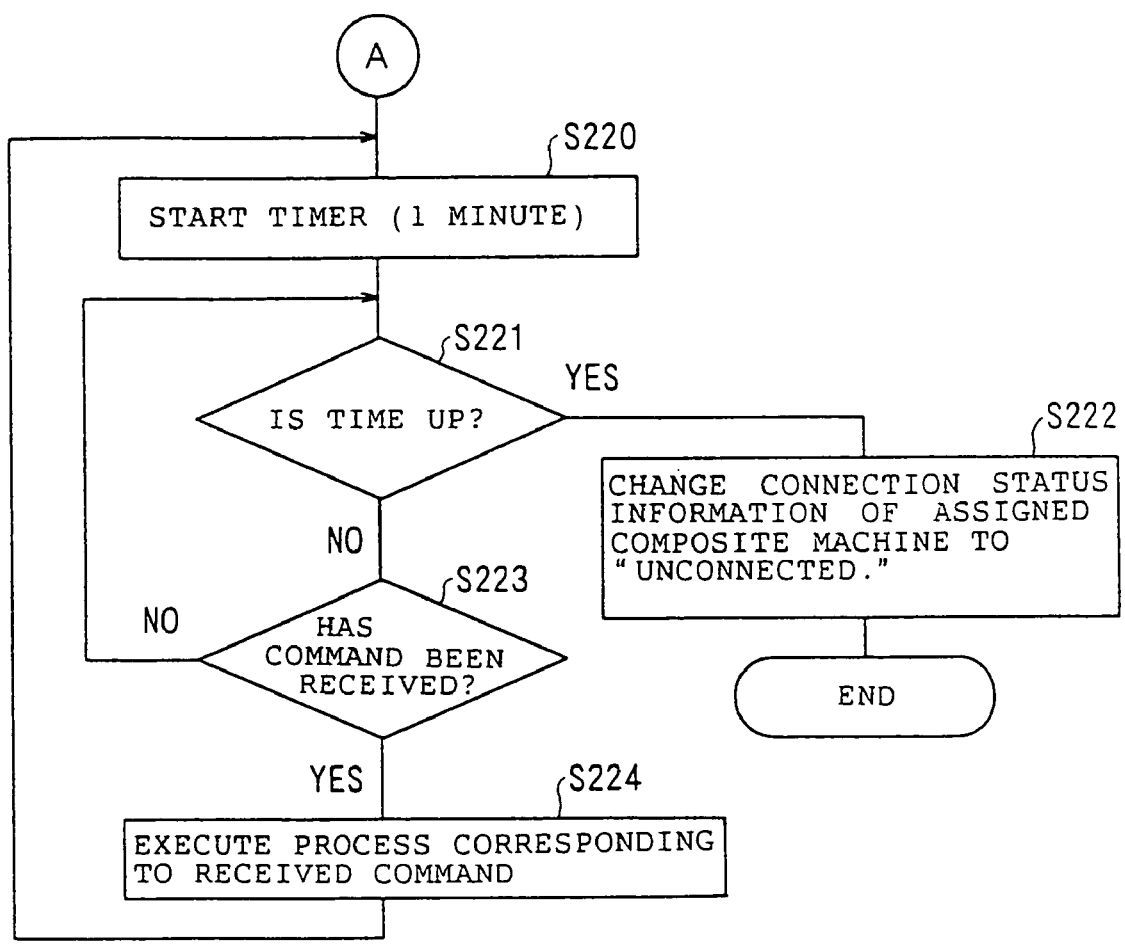
FIG. 12 is a flowchart showing an operating procedure of the server in the first embodiment.

On the other hand, the child processing unit 42, after transmitting the assignment command, as shown in FIG. 12, at first starts a timer (one minute in the first embodiment) (step S220). Thereafter, the child processing unit 42 monitors whether or not there occurs a timeout of the timer, and whether or not the command is received from the assigned multifunction machine 10 (steps S221, S223), and, when receiving the command (step S223; YES), executes a process and control corresponding to the command (step S224). Thereafter, the child processing unit 42 loops back to step S220, and restarts the timer.

Then, the child processing unit 42, detecting that the time is timed out (step S221; YES) without receiving the command, changes the state-of-connection information in the connection information on the assigned multifunction machine, to being "unconnected" (step S222), and finishes the processes shown in FIG. 12.

Namely, in the multifunction machine/server system in accordance with this embodiment, a finite number of child processing units 42 (the LAN circuit of which an information transmitting capability is limited) can be efficiently utilized by controlling the state of connection in the procedures described above.

Given next is an explanation of a process initiated by the panel control unit 14 after the connection management unit 22 has finished executing the processes shown in FIG. 10.

Figure 13:
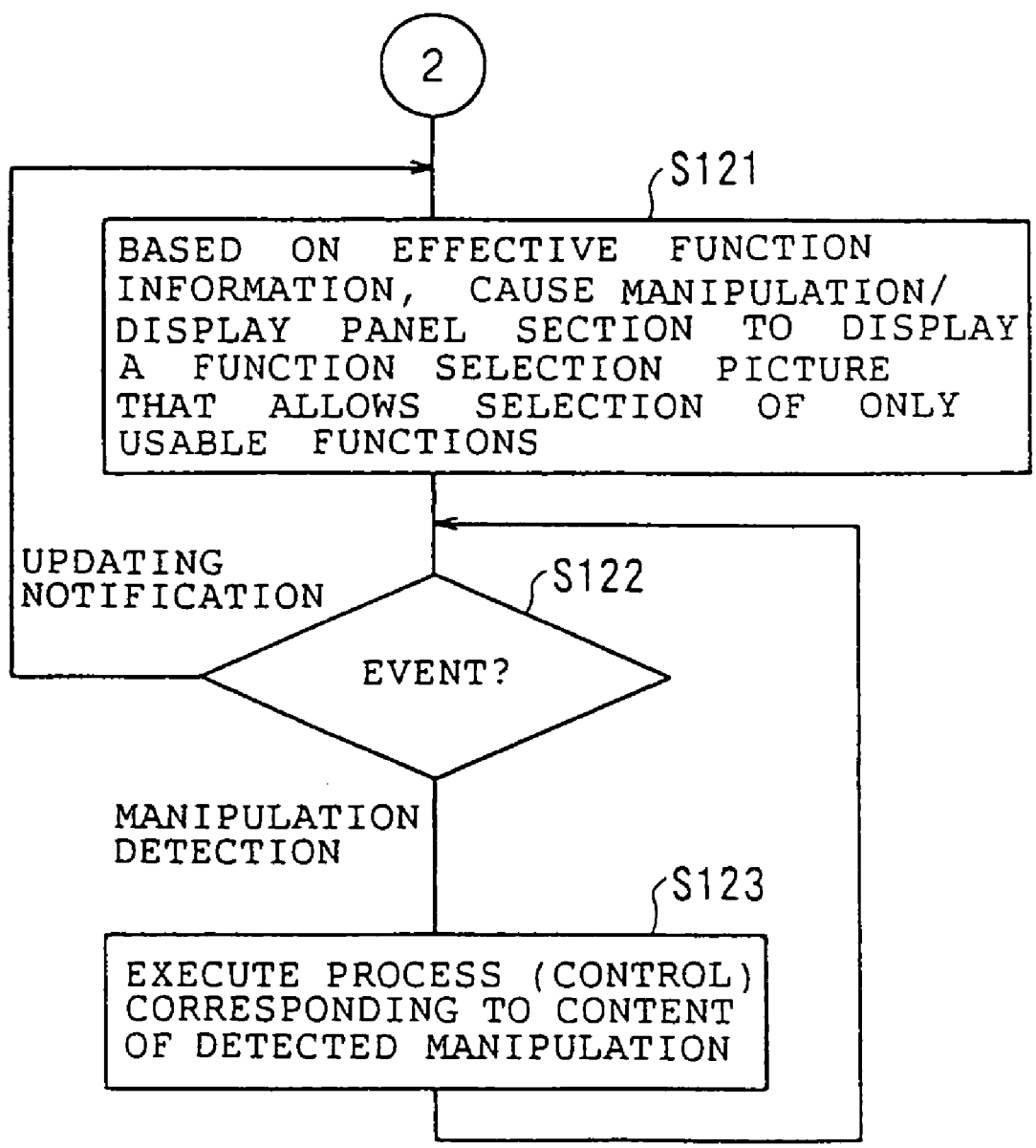
FIG. 13 is a flowchart showing an operating procedure with the multifunction machine in the first embodiment.

The panel control unit 14, as shown in FIG. 13, based on the effective function information recorded in the information recording unit 23, to begin with, makes the operation/display panel unit 11 display the function selection screen on which the functions usable at present can be selected (step S121). More specifically, if all the functions are usable, the function selection screen as illustrated in FIG. 14(A) is displayed on the operation/display panel unit 11, and, if only the print function and the copy function are usable (if the operation mode indicates "print & copy", and if not connected to the server 40), the function selection screen as illustrated in FIG. 14(B) is displayed on the operation/display panel unit 11.

Thereafter, the panel control unit 14 shifts to a standby state till the operation is effected upon the operation/display panel unit 11, or till the connection management unit 22 makes a notification to update the effective function information (step S122). Then, when notified of the effective function information having been updated (step S122; update notification), he panel control unit 14 returns to step S121 and changes the screen to the one corresponding to the updated effective function information. Further, the panel control unit 14, when detecting that the operation has been effected upon the operation/display panel unit 11 (step S122; detection of operation), executes a process (control) corresponding to a content of that operation (step S123). The panel control unit 14, after completing that process, moves back to step S122.

The operation of the panel control unit 14 will hereinafter be discussed in greater details.

For example, in the case of utilizing only the document registering function, the operator selects "document registration" by touching on an area where "document registration" is indicated on the function selection screen (see FIG. 14(A)), and subsequently selects "setting".

When detecting the "document registration" has been selected among the indications on the function selection screen, the panel control unit 14 records this effect in step S123 (FIG. 13), and executes control to change only a display mode of "document registration". Then, when detecting that "setting" has been selected, the panel control unit 14 recognizes that the function used this time is only the document registering function, and starts a document-registration-oriented information setting screen display process of displaying a document-registration-oriented information setting screen for obtaining from the operation the information (registration addressee) necessary for utilizing the document registering function.

Figure 15:
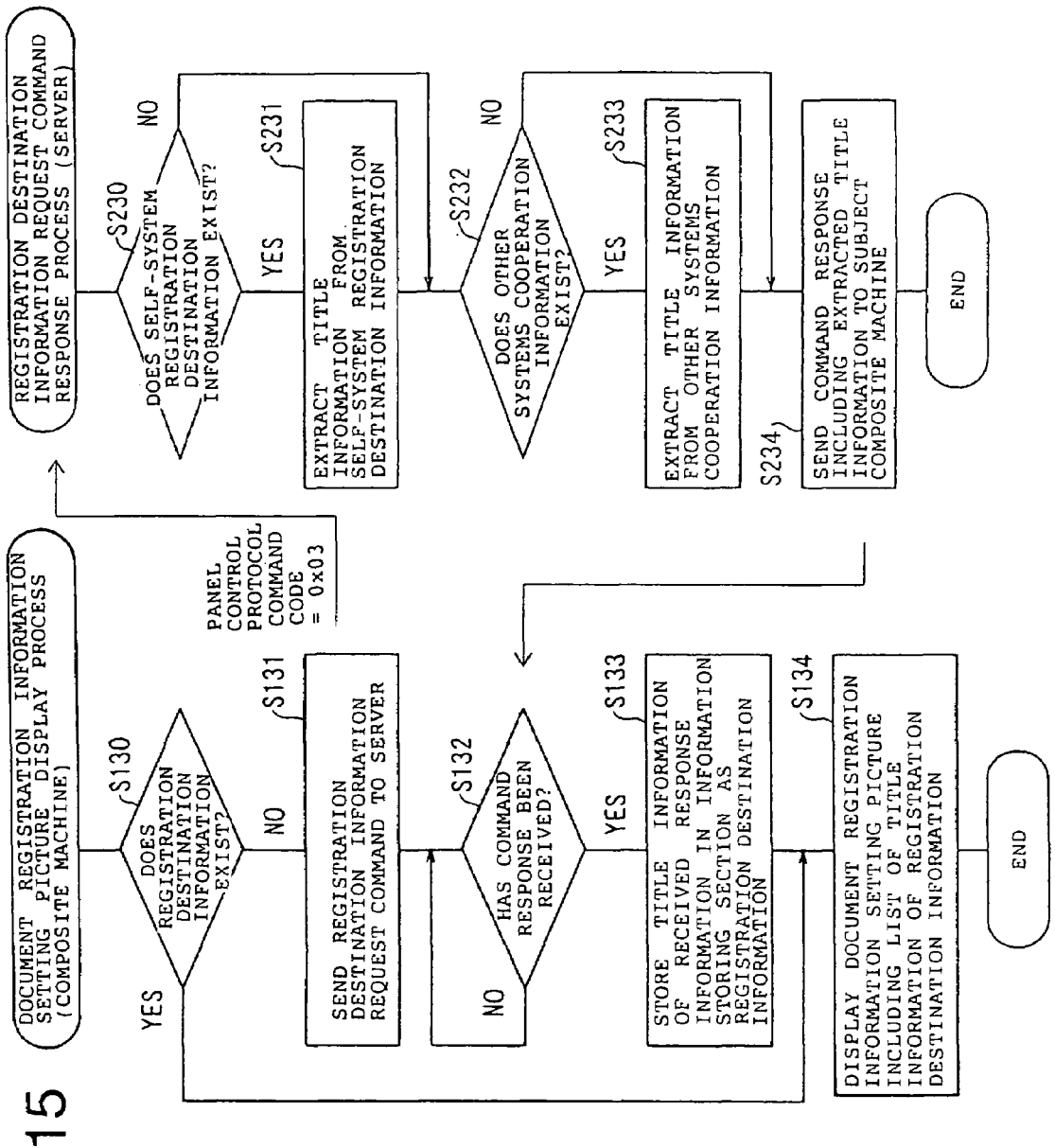
FIG. 15 is a flowchart showing operating procedures of the multifunction machine and the server in the first embodiment.

As shown in a left part of FIG. 15, when in the document-registration-oriented information setting screen display process, the panel control unit 14 at first judges whether or not a piece of registration addressee information is recorded in the information recording unit 23 (step S130). Then, if the registration addressee information is not recorded (step S130; YES), the panel control unit 14 transmits a registration addressee information request command to the server 40 by use of the panel-oriented communications control unit 27 (step S131).

The server (the child processing unit) having received the registration addressee information request command from the assigned multifunction machine 10 (which is hereinafter referred to as a target multifunction machine), starts a registration addressee information request command responding process shown in a right part of FIG. 15. The server 40, at the first onset, judges whether or not a piece of intra-self-system registration addressee information exists in the information recording unit 49 (step S230). Then, if the intra-self-system registration addressee information exists therein (step S230; YES), title information is extracted from the intra-self-system registration addressee information (step S231). Subsequently, the child processing unit 42 judges whether or not non-self system linkage information exists in the information recording unit 49 (step S232). Then, if the non-self system linkage information exists therein (step S232; YES), title information is extracted from the non-self system linkage information (step S234).

Then, the child processing unit 42 sends back to the target multifunction machine a command response to the registration addressee information request command which contains the extracted title information (step S234).

The panel control unit 14 having issued the registration addressee information request command waits till a command response to that command is sent back from the server 40 (step S132), and, when receiving the command response (step S132; YES), records the information recording unit 23 with the title information as the registration addressee information contained in application information received (step S133). Then, the panel control unit 14 makes the operation/display panel unit 11 display a document-registration-oriented information setting screen on which a content of the registration addressee information (including a title information list) is indicated (step S134).

Note that when the registration addressee information is recorded in the information recording unit 23 (step S130; YES), the panel control unit 14 advances directly to step S134 without communicating with the server 40, and makes the operation/display panel unit 11 display the document-registration-oriented information setting screen.

Figure 16:
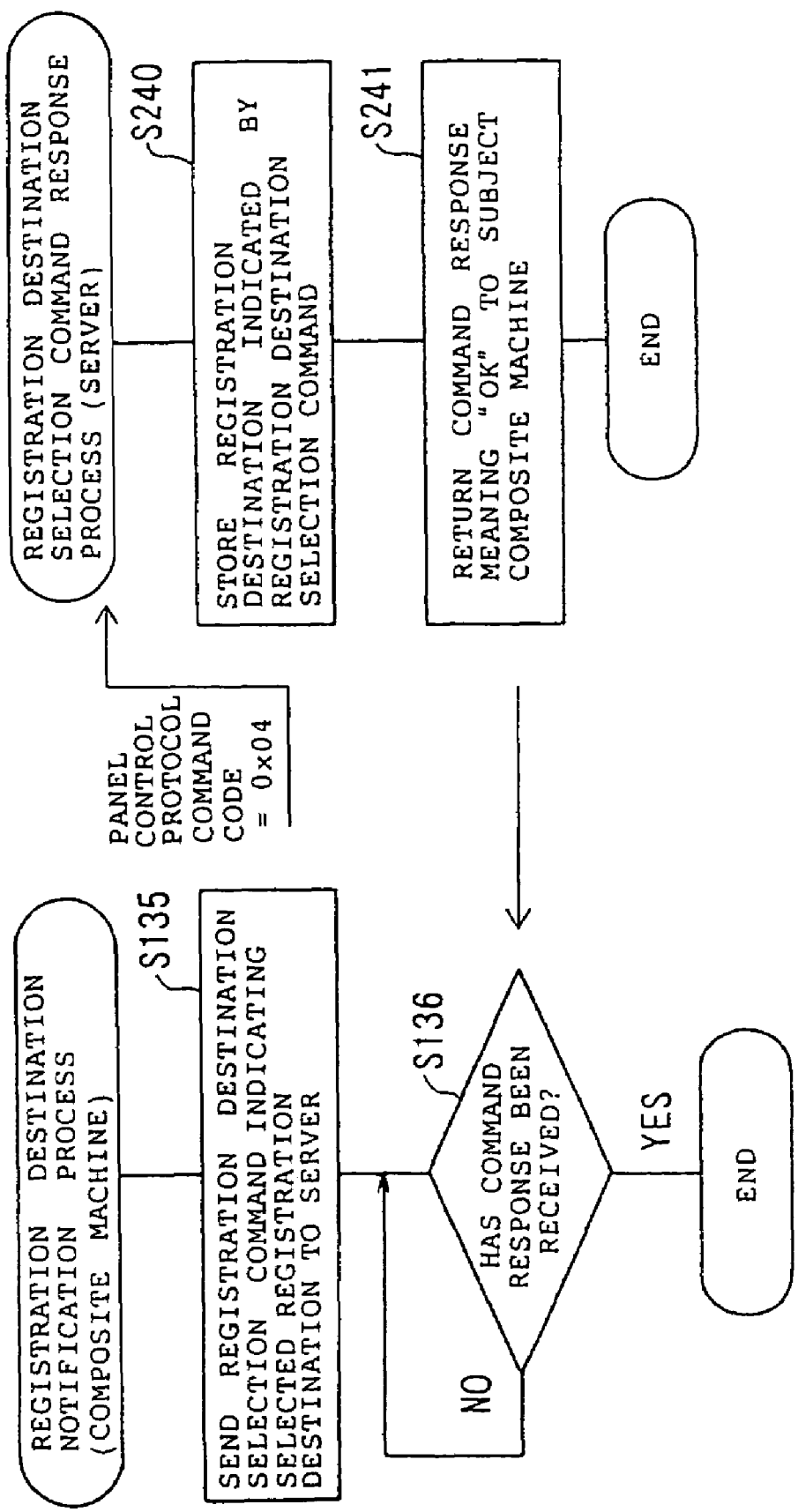
FIG. 16 is a flowchart showing the operating procedures of the multifunction machine and the server in the first embodiment.

Thereafter, the panel control unit 14 stands by in step S122 (FIG. 13) till the operation is implemented upon the operation/display panel unit 11, and, when detecting that the registration addressee (title information) has been selected, as sown in a left part in FIG. 16, sends to the server 40 a registration addressee selection command containing the selected title information (step S135). The child processing unit 42 having received the registration addressee selection command, as shown in a right part of FIG. 16, records a registration addressee indicated by the registration addressee selection command (step S240). Then, the child processing unit 42 sends a command response implying "OK" back to the target multifunction machine (step S241). The panel control unit 14 having received the command response finishes the illustrated processes and stands by for a next operation being performed (which is particularly to press a start button as an indication of starting the document registration).

Figure 17:
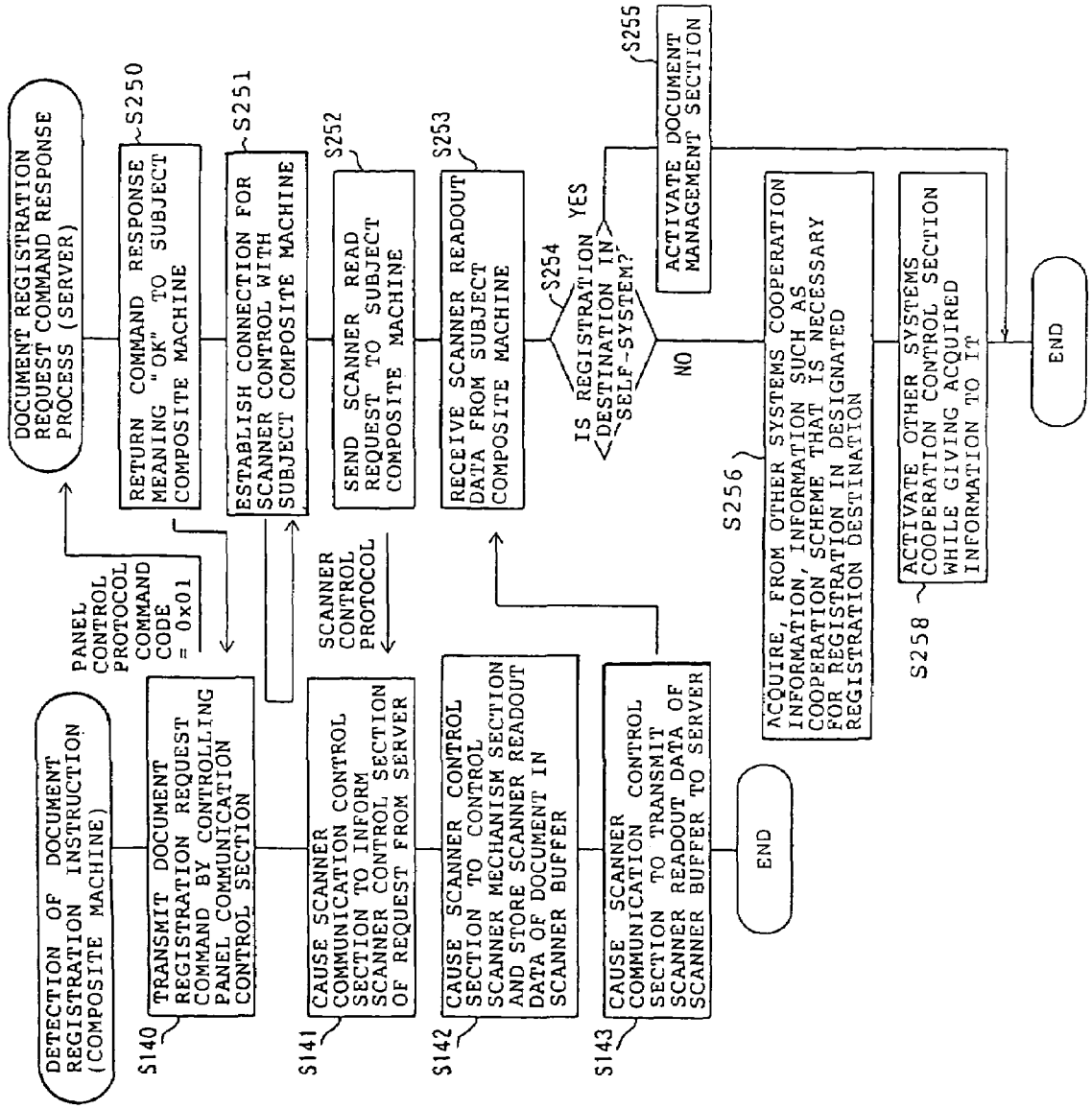
FIG. 17 is a flowchart showing the operating procedures of the multifunction machine and the server in the first embodiment.

The panel control unit 14, when detecting that the start of registering the document has been indicated, as shown in a left part of FIG. 17, sends the document registration request command back to the server 40 under the control of the panel-oriented communications control unit (step S140).

The server 40 (the child processing unit) having received the document registration request command, as shown in a right part of FIG. 17, sends the command response implying "OK" back to the target multifunction machine 10 (step S250), and establishes a connection for scanner control between to the target multifunction machine and the server 40 itself (step S251). Thereafter, the child processing unit 42 transmits to the target multifunction machine 10 a scanner reading request based on a scanner control protocol (step S252).

The scanner-oriented communications control unit 26 within the target multifunction machine notifies the scanner control unit 15 of the scanner reading request sent by the child processing unit 42 (step S141). The scanner control unit 15 notified of this request controls the scanner mechanism unit 12, and stores the scanner-oriented buffer 20 with scanner data of the document (step S254). Thereafter, the scanner-oriented communications control unit 26 transmits to the server 40 the scanner data in the scanner-oriented buffer 25 (step S255).

The child processing unit 42 in the server 40 receives the scanner data from the target multifunction machine (step S253). The child processing unit 42, if the designated registration addressee is a folder in the self-system (step S254; YES), obtains information required for registration in the designated registration addressee out of the intra-self-system registration addressee information, and starts up the document management unit 45 (step S255). Then, the thus activated document management unit 45 registers the designated registration addressee with the scanner data given from the target multifunction machine.

While on the other hand, if the registration addressee is a folder in the non-self system (step S254; NO), the child processing unit 42 obtains the information needed for registration in the designated registration addressee out of non-self system linkage information (step S257), and starts up the non-self system linkage control unit 47 by use of the obtained information (step S258). Then, the started-up non-self system linkage control unit 47 executes a process of registering the scanner data given from the target multifunction machine in a intra-non-self-system registration addressee location.

Figure 18:
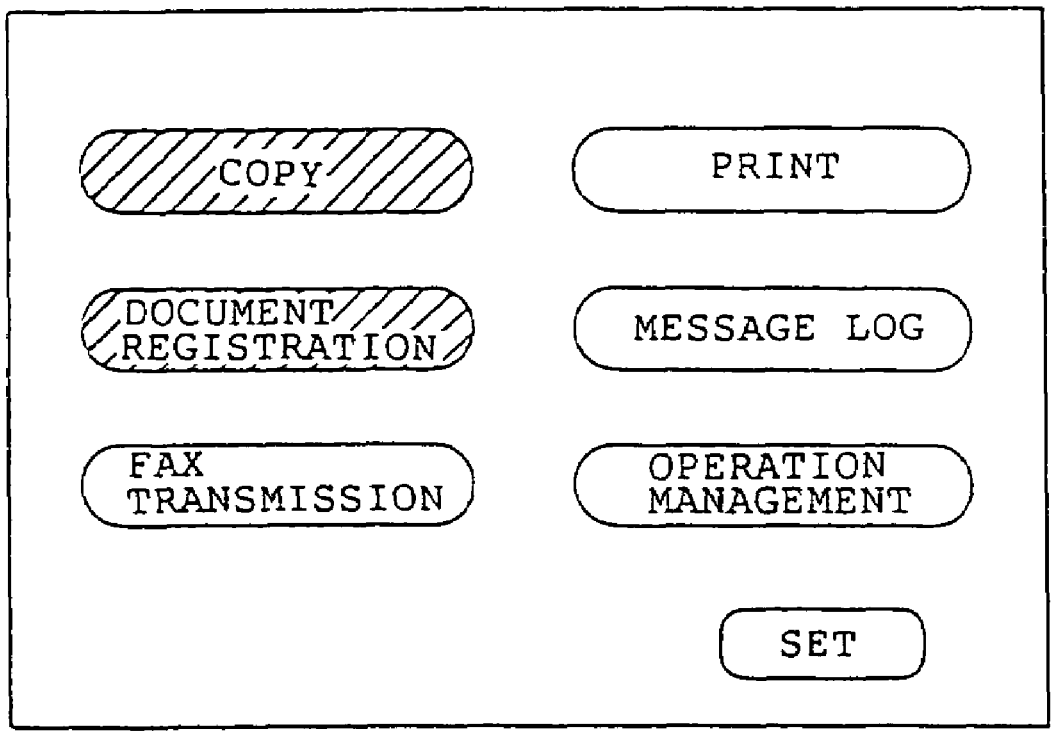
FIG. 18 is an explanatory diagram showing a function selection screen displayed by the multifunction machine in the first embodiment.

Further, for instance, in the case of utilizing the copy function and the document registering function, the operator touches on areas where "copy function" and "document registration" are indicated on the function selection screen. The panel control unit 14, when detecting this operation, changes the content on the function selection screen to those representing that "copy function" and "document registration" are selected as schematically shown in FIG. 18.

Figure 19:
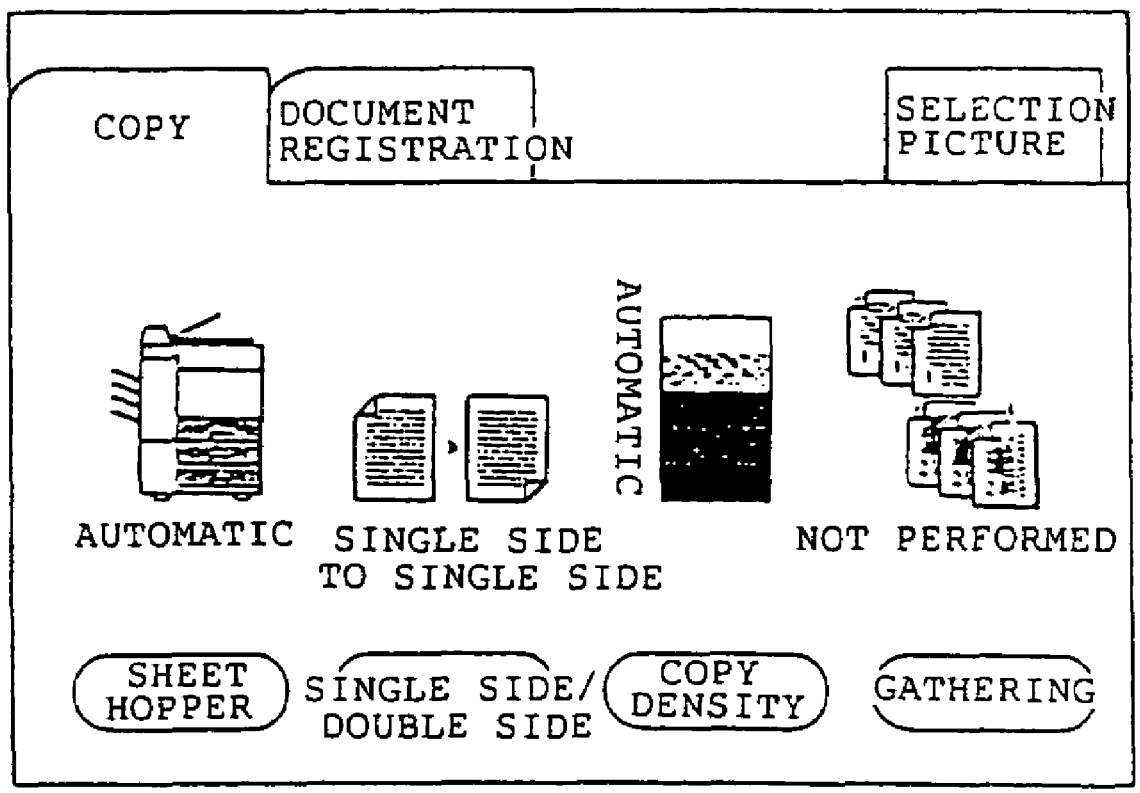
FIG. 19 is an explanatory diagram showing an information setting screen displayed by the multifunction machine in the first embodiment.

Thereafter, the panel control unit 14, when detecting that "setting" has been selected, recognizes that the functions used this time are the copy function and the document registering function, and makes the operation/display panel unit 11 display a screen as shown in FIG. 19 for setting the information on the copy and document registration. Then, the panel control unit 14 continues to record the data corresponding to the contents of the operations and, when detecting the start of operation has been indicated, as in the case of "document registration" (FIG. 17), transmits the document registering request command to the server by controlling the panel-oriented communications control unit 27. Moreover, the panel control unit 14 also indicates the printer control unit 16 to print the scanner data to be stored in the canner-oriented buffer 20 through the scanner control unit 15.

Thus, when indicated to execute the copy function and the document registering function, the respective units where these two functions are executed by use of the same scanner data, are controlled in the multifunction machine 10. Similarly for other functional combinations, the respective units are controlled so that the individual functions are executed by using the same scanner data. For example, if indicated to execute a plurality of functions including the document registering function and the FAX transmitting function, the multifunction machine 10 (the panel control unit 14) issues to the server 40 a command indicating that the FAX transmission and the document registration be performed using the same scanner data. Then, on the side of the server 40, the document registration and the FAX transmission are carried out by use of the scanner data sent from the multifunction machine 10.

Note that the panel control unit 14 is also constructed, during a simultaneous execution of the plurality of functions, to display a state display screen as shown in FIG. 20 on the operation/display panel unit 11, stop only the execution of the function corresponding to this selected character string when detecting that any one of "stop" character strings on the operation/display panel unit 11, and thus change the content on the state display screen.

Next, there will be explained operations, related to the accounting information, of the multifunction machine 10 and of the server 40. As shown in a left of FIG. 21, the accounting control unit 21 in the multifunction machine 10 always monitors an occurrence of an accounting event, an elapse of a backup time and a receipt of an accounting information inquiry command.

Then, the accounting control unit 21, when detecting the occurrence of the accounting event (step S301; YES), updates the accounting information in the information recording unit 23 (step S302).

It is to be noted that the accounting information in the information recording unit 23 is defined as information for recording a 1-day utilizing situation, wherein the number of utilizations is, as shown in FIG. 22, recorded for every process utilized. Further, in step S301, the accounting control unit 21 recognizes the occurrence of the accounting event from a notification given from the controls units 15–17. For example, in the case of being copied, each time the copy to the sheet is completed, the copy control unit 17 notifies the accounting control unit 21 of a sheet size and one-side/double-side information. Upon this notification, the accounting control unit 21 recognizes the occurrence of the accounting event, and updates a content of the accounting information in the information recording unit 23 in accordance with the information notified of.

Further, the accounting control unit 21, when detecting that the backup time has elapsed (step S303; YES), creates within the non-volatile information recording unit 24 a backup of the accounting information in the information recording unit 23 (step S304). Created in this step S304 in the non-volatile information recording unit 24 is the backup obtained by adding date information to the accounting information in the information recording unit 23. More specifically, the non-volatile information recording unit 24 is prepared with an accounting information file defined as a file (database) for recording the accounting information according to date, and in step S304 the accounting control unit 21 rewrites the accounting information on the very day of processing within the accounting information file with the accounting information in the information recording unit 23. Note that the accounting information in the information recording unit 23 is, when the date is changed, or when the power source is switched OFF, cleared after creating the backup thereof (after changing the contents of the accounting information file).

Then, the accounting control unit 21, when receiving the accounting information inquiry command from the server 40 (step S305; YES), transmits the accounting information in the information recording unit 23 to the server 40 (step S306).

The accounting information inquiry command is sent by the accounting management unit 48 in the server 40 through the communications control unit 53.

Figure 21:
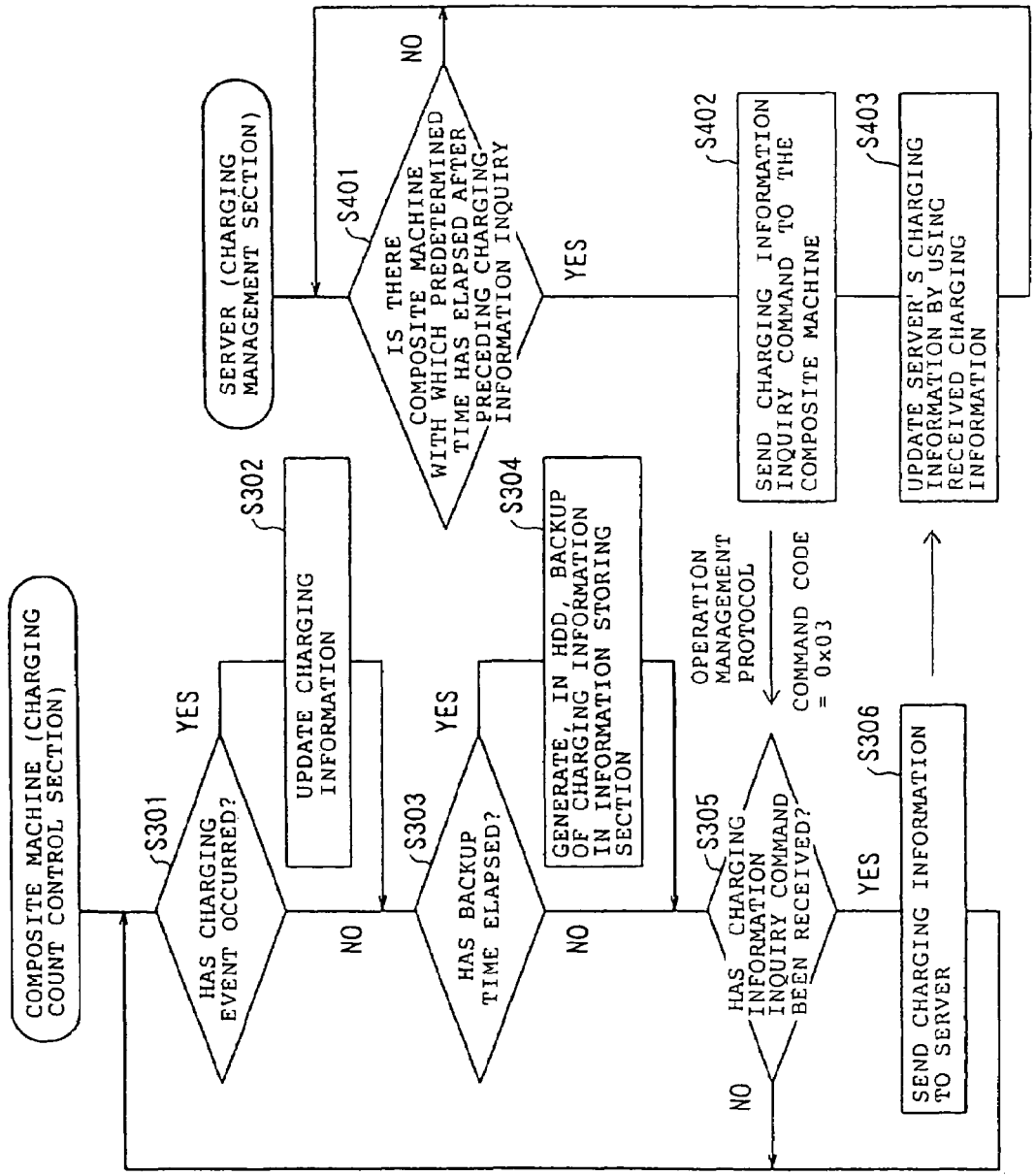
FIG. 21 is a flowchart showing accounting-information-related operating procedures of the multifunction machine and the server in the first embodiment.

As shown in a right part of FIG. 21, the accounting management unit 48 monitors whether or not a predetermined time has elapsed since each multifunction machine connected was inquired for the accounting information last time (step S401).

If there appears the multifunction machine with the elapse of the predetermined time since the last inquiry for the accounting information (step S401; YES), the accounting management unit 48 sends the accounting information inquiry command to that multifunction machine via the child processing unit 42 (the operation management unit) (step S402). Then, the accounting management unit 48 updates the accounting information in the server 40 by use of the accounting information sent from the multifunction machine (step S403).

The accounting information recorded in the server 40 is, as shown in FIG. 23, structured by adding up pieces of accounting data on a date- and multifunction-machine-basis. The accounting management unit 48, when executing the process in step S403, if there already exists the accounting information on a date when the accounting data were collected with respect to the multifunction machine with the collected accounting data, adds the accounting data from the multifunction machine to the existing accounting information. Further, if there is no relevant accounting information, the accounting management unit 48 newly creates an entry for the collected accounting data.

Further, functions which will be explained hereinafter are imparted to the accounting control unit 21 in the multifunction machine 10 and to the accounting management unit 48 in the server 40.

The accounting control unit 21 periodically checks whether or not the accounting information file in the non-volatile information recording unit 24 is in such a status that it can be normally read. Then, the accounting control unit 21, when detecting that the accounting information file has been destructed, requests the server 40 to transmit the accounting information on the self multifunction machine, and restructures an accounting information file on the basis of the transmitted accounting information.

The accounting management unit 48 also, as in the case of the accounting control unit 21, periodically checks whether or not the accounting information file in the information recording unit 49 is in such a status that it can be normally read. Then, the accounting management unit 48, when detecting that the accounting information file has been destructed, requests each multifunction machine to transmit contents of the accounting information file, and restructures accounting information on the basis of the transmitted information.

Namely, the multifunction machine/server system in the first embodiment is constructed so that the same accounting information is retained within the multifunction machine 10 and the server 40 as well. In other words, the multifunction machine/server system in the first embodiment exhibits an extremely low probability that the accounting information might be lost from within the system.

Items of accounting information in the multifunction machine 10 and in the server 40 are cleared upon completion of the utilizations thereof. To be specific, the manager of the accounting information, when utilizing (collecting) the accounting data, transmits an accounting information notification request command as shown in FIG. 24 to the server 40 by use of a management-oriented terminal capable of communicating with the server 40.

Figure 25:
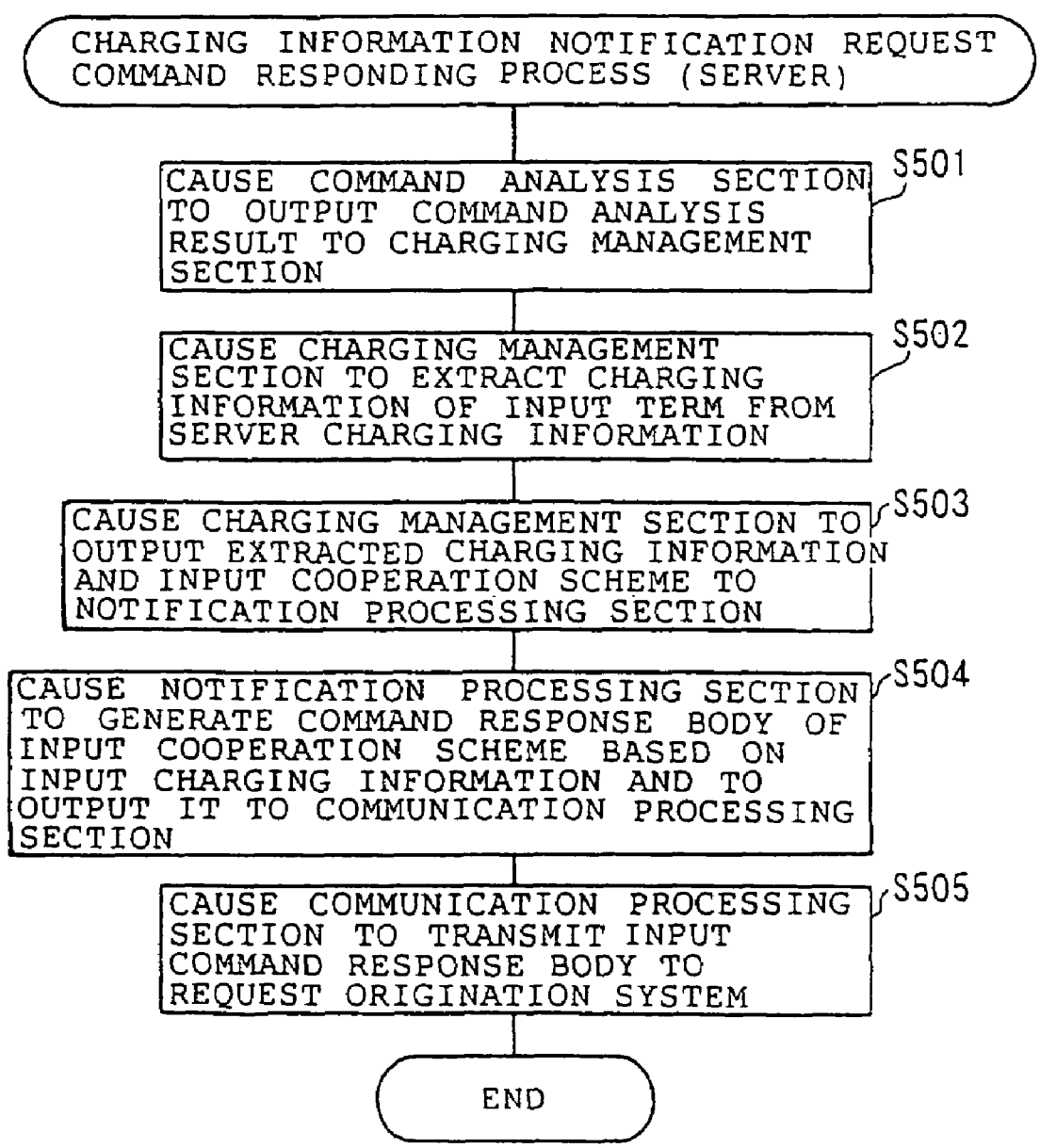
FIG. 25 is an explanatory diagram showing the accounting information notification request command received by the server, and a response command transmitted by the server in the first embodiment.

When the accounting information notification request command arrives at the server 40, as shown in FIG. 25, the command analyzing unit 51 in the server 40 outputs an analyzed result (a content of the accounting information notification request command) to the accounting management unit 48 (step S501). The accounting management unit 48 extracts accounting information for an inputted period (1998/1/1–1998/3/31) from the accounting information in the information recording unit 49 (step S502). Then, the accounting management unit 48 outputs the extracted accounting information and the inputted linkage system (MAIL) to the notification processing unit 52 (step S503).

The notification processing unit 52, based on the inputted accounting information and linkage system, creates a command response text as shown in FIG. 24, and outputs this text to the communications processing unit 50 (step S504). The communications processing unit 50 transmits this command response text to a requesting element (step S505).

The manager, after receiving the necessary accounting information, issues to the server 40 a command (for specifying a clearing period) for giving an indication to clear the accounting information of which the utilization has been finished. The accounting management unit 48 having received this command via the communications control unit 53 deletes the information specified within the accounting information in the information recording unit 49, and also issues to the relevant multifunction machine a command for indicating a deletion of the same information in the accounting information file. Then, the accounting control unit 21 in the multifunction machine 10 having received the same command deletes the specified information from the accounting information file.

Further, as the outline has already been explained, the accounting management unit 48, if a notification schedule is set in the information recording unit 49, also executes the process based on a content thereof. More specifically, the notification schedule consists of an address of the notified unit and schedule information for specifying a date and a time when notifying. The accounting management unit 48, if the notification schedule is set in the information recording unit 49 and when coming to the date and the time specified in the schedule information, transmits the accounting data collected in the set linkage system to a system having the address set in the notification schedule after having sent the accounting information last time. Note that the server 40 in the first embodiment uses the schedule information in such a form as to combine the information indicating what time the notification is implemented every day, the information indicating what time on which day in every week the notification is made, and the information indicating what time on which day of every month the notification is carried out. Namely, the notification schedule is structured so that the server 40 is capable of notifying of the accounting information, for example, at X o'clock on the first day of every month, at Y o'clock on the 15th day of every month, and at Z o'clock on Monday in every week.

Further, as a matter of fact, the accounting information and the commands pertaining to the accounting information are transferred and received between the management-oriented terminal and the server 40 through passwords, which involves the use of an encrypting technology in order to avoid an unlawful use and a falsification of the data.

That is, the manager previously registers (records) the password in the server 40, and the command given from the management-oriented terminal is encrypted with a key and thereafter transmitted to the server 40. The server 40 decrypts he password with the key, and the process to the command transmitted is executed only when encrypted correctly. The encryption is carried out similarly when the accounting information is transmitted from the server 40.

Second Embodiment

A multifunction machine/server system in a second embodiment will hereinafter be described. The multifunction machine/server system in the second embodiment is constructed of the multifunction machine exemplified in the first embodiment, and a multifunction machine and a server in the second embodiment, of which functions embrace those of the multifunction machine and the server exemplified in the first embodiment. Therefore, the following explanation will be focused upon only differences from the multifunction machine and the server in the first embodiment.

The multifunction machine in the second embodiment includes a large-capacity HDD capable of recording the documents, which corresponds to the non-volatile information recording unit 24. That is, the multifunction machine in the second embodiment is capable of utilizing the document registering function (which is, however, capable of registering the document only in the folder within the self-machine) even in a state of being unconnected to the server.

Further, the multifunction machine in the second embodiment has a circuit capable of transmitting and receiving the FAX signal., wherein the FAX transmitting function can be utilized even in the state of being unconnected to the server, and a response to a FAX transmission request from the server can be made.

When indicated to execute the FAX transmitting function in the state of being unconnected to the server, the operation mechanism of the multifunction machine is absolutely the same as the ordinary FAX. When indicated to execute the FAX transmitting function in a state of being connected to the server, however, the multifunction machine and the server in the second embodiment operate as follows.

The multifunction machine (hereinafter termed a requesting multifunction machine), when indicated to execute the FAX transmitting function in the state of being connected to the server, notifies the server of the telephone number already inputted for utilizing the FAX transmitting function.

On the other hand, the server is given a transmitting/receiving baud rate and a FAX number of each multifunction machine. Further, the server, when notified of a telephone number of a FAX transmitted device from the requesting multifunction machine, specifies an apparatus (the multifunction machine or the server itself) capable of performing the FAX transmission at the minimum cost on the basis of the transmitting/receiving baud rate and the FAX number of each multifunction machine which are retained inside.

If the specified apparatus proves to be the requesting multifunction machine, the server indicates the requesting multifunction machine to fax the scanner data. Whereas if the specified apparatus is not the requesting multifunction machine, the server indicates the requesting multifunction machine to transmit the scanner data to the self-apparatus. Then, the server, if the server itself is the apparatus capable of effecting the FAX transmission at the minimum cost, faxes the transmitted scanner data by utilizing its own FAX transmitting function. If the multifunction machine not classified as the requesting multifunction machine is the apparatus capable of implementing the FAX transmission at the minimum cost, the server requests this multifunction machine to fax the scanner data transmitted.

Moreover, a function termed a thumbnail display function is added to the multifunction machine in the second embodiment. The thumbnail display function will hereinafter be explained in details.

The thumbnail display function is provided for preventing stained-image data from being printed and registered due to a failure in reading the document (which implies a conversion into the scanner data) by the scanner mechanism unit. Note that the thumbnail display function is a function of which ON/OFF can be set on the data setting screen.

Figure 26:
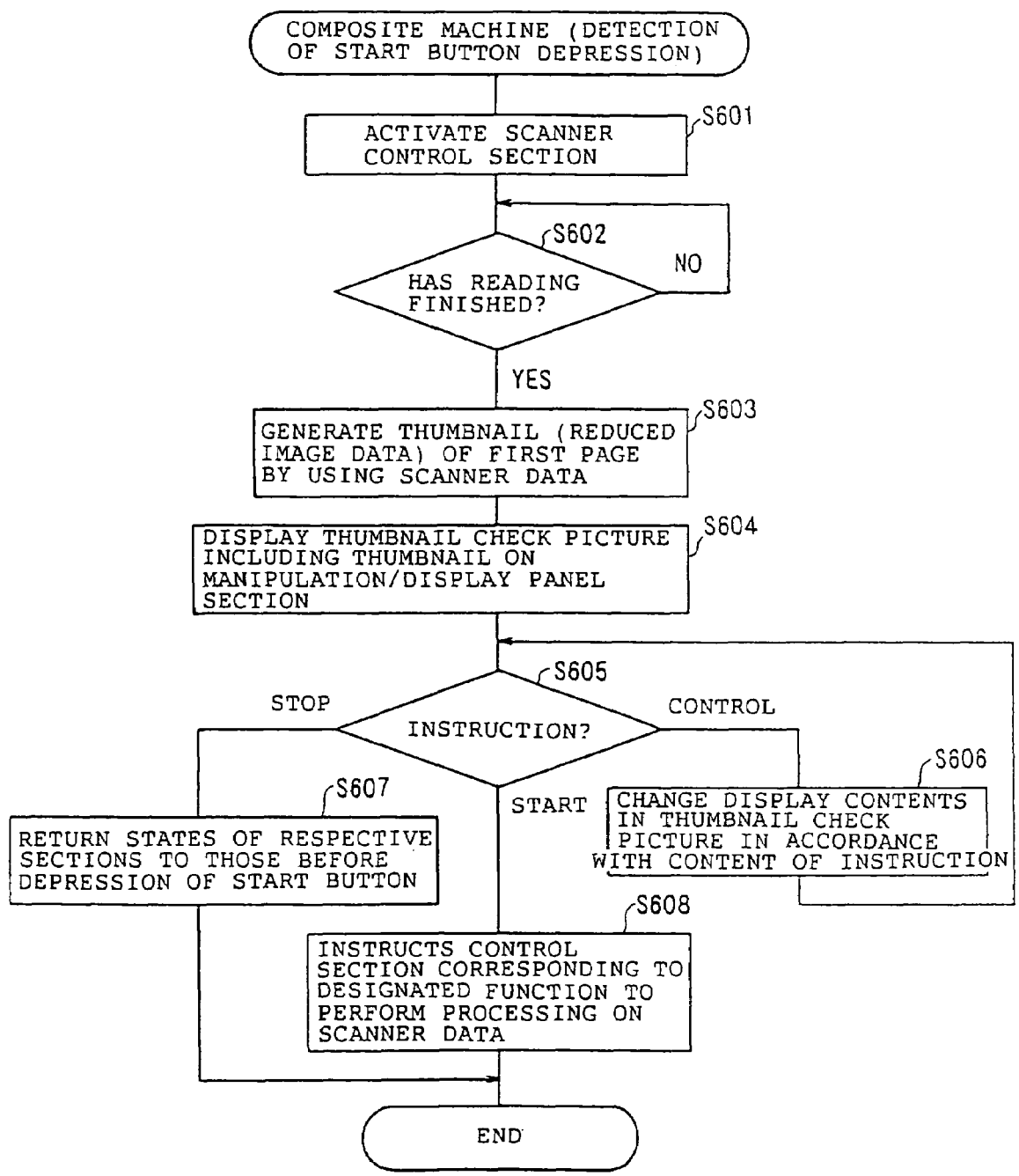
FIG. 26 is an explanatory flowchart showing a thumbnail display function incorporated into the multifunction machine in a second embodiment.

When the start button is pressed upon a completion of setting the data relative to some sort of function in a state where the utilization of the thumbnail display function is set, as shown in FIG. 26, the panel control unit at first starts up the scanner control unit to read (conversion into the scanner data) the document set in the scanner mechanism unit (step S601). Then, the panel control unit stands by for a completion of the reading process (step S602). When the reading process is completed (step S602; YES), the panel control unit creates a first-page thumbnail (a reduced image) (step S604). Subsequently, the panel control unit makes the operation/display panel display a thumbnail confirmation screen containing the created thumbnail (step S605).

Figure 27:
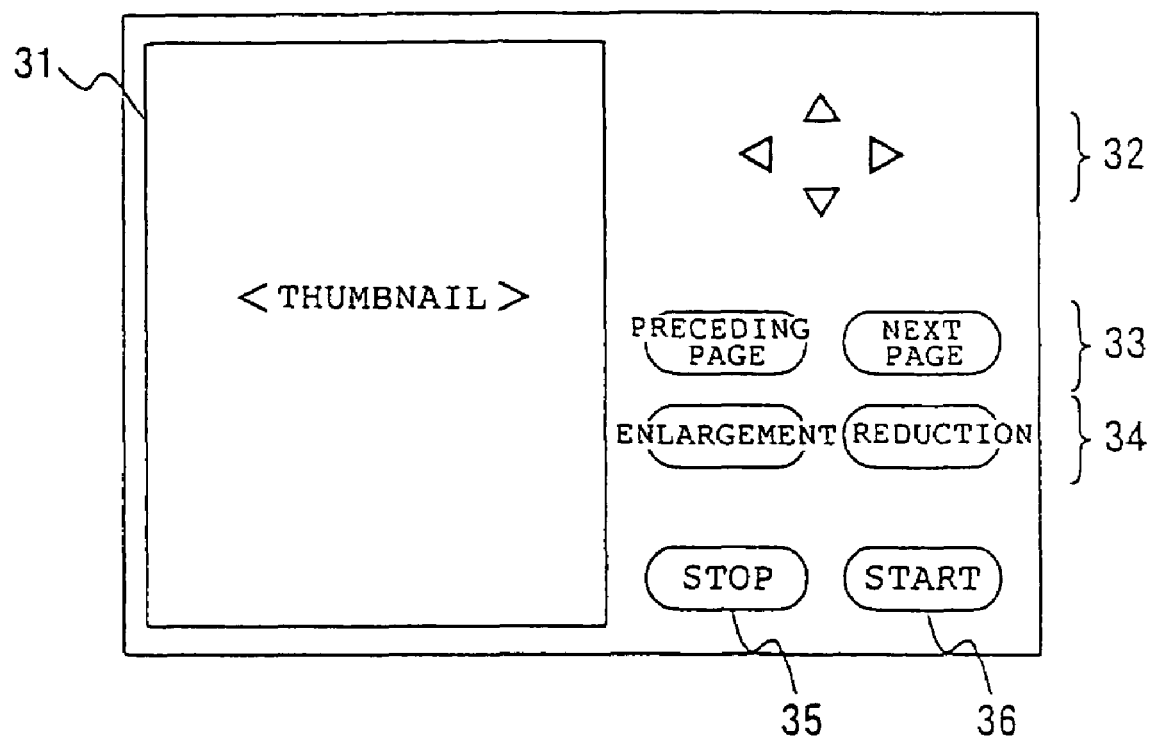
FIG. 27 is an explanatory diagram showing a thumbnail a confirmation screen displayed by the multifunction machine in a second embodiment.

As schematically shown in FIG. 27, the thumbnail confirmation screen is composed of a thumbnail display region 31, a positional control button 32, a page control button 33, a reduction rate control button 34, a stop button 35 and a start button 36, wherein one region of the created thumbnail is displayed in the thumbnail display region 31.

After the thumbnail confirmation screen has been thus displayed, the panel control unit shifts to a state of standing by for an input of a user's indication (step S605). Then, the panel control unit, when detecting that one of the control buttons 32–34 has been selected (step S605; control), changes a display content in the thumbnail display region 31 in accordance with the selected button (step S606). For example, when the page control button 33 is selected, the panel control unit creates a next-page (or previous-page) thumbnail and displays this thumbnail in the thumbnail display region 31. Further, when the reduction rate control button 34 is chosen, the panel control unit creates a thumbnail with an increased (or decreased) reduction rate relative to the page being displayed, and displays this thumbnail in the thumbnail display region 31. Moreover, when the positional control button 32 is selected, the area for displaying the thumbnail within the thumbnail display region 31 is shifted in any one of up-and-down directions and right-and-left directions corresponding to the selected button.

The panel control unit, when detecting that the start button is chosen (step S605; start), indicates the control unit in accordance with the specified function to start processing the scanner data (step S606). Further, the panel control unit, when detecting that the stop button is selected (step S605; stop), makes a status of each unit to the state before pressing the start button (step S107), and the processing shown therein is finished.

As discussed above, in the multifunction machine in the second embodiment, after confirming that the conversion into the image data has been precisely done using the thumbnail, the actual processing can be executed, thereby preventing the sheets and time from being consumed with a futility.

MODIFIED EXAMPLES

The multifunction machine/server system in each embodiment is constructed to collect the accounting information on the multifunction-machine basis, and may also be, as a matter of course, constructed so that the server is capable of collecting the accounting information on a user-basis or on the basis of section to which the user belongs. Note that the thus constructed multifunction machine/server system can be attained simply by modifying the multifunction machine so that a user ID is required to be inputted when operated, and the accounting information is recorded on the user-basis or section-basis by inputting the user ID.

Further, the multifunction machine/server system in each embodiment is constructed so that the server collects the accounting information and may also be, as a matter of course, constructed so that the server collects information on consumed states of consumables.

Third Embodiment

Figure 28:
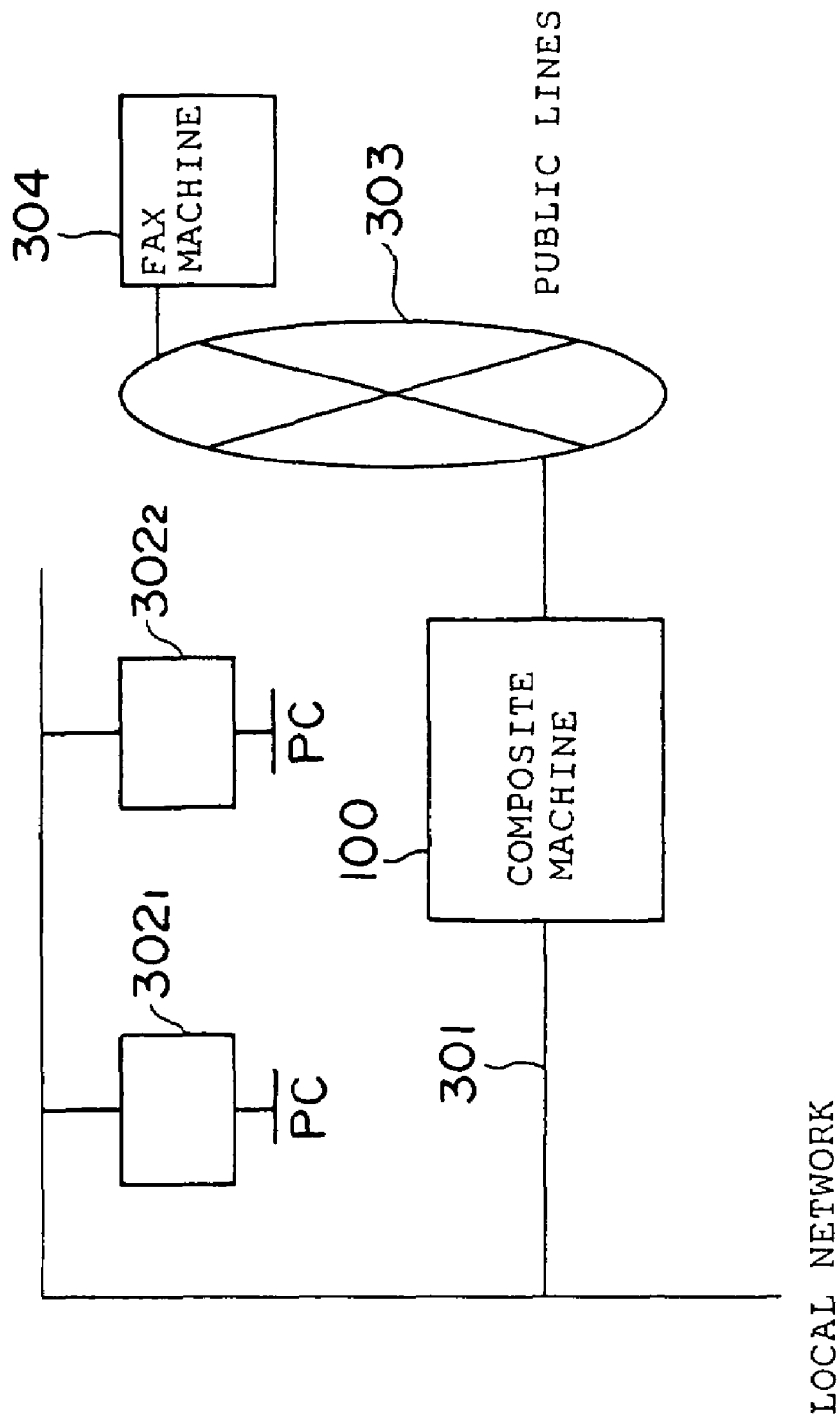
FIG. 28 is a diagram showing a communications network constructed of a multifunction machine in a third embodiment, and of devices connected to this multifunction machine via a local network and a public line.

FIG. 28 is a diagram showing a communications network constructed of a multifunction machine in accordance with a third embodiment of the present invention, and devices connected to this multifunction machine via a local network and a public line.

This multifunction machine 100 is connected to both of a local network 301 and a public line 303. In addition to the multifunction machine 100, two sets of personal computers $302_1$, $302_2$ typically shown herein are connected to the local network 301. In addition to the multifunction machine 100, a FAX device 304 is typically connected to the public line 303.

Figure 29:
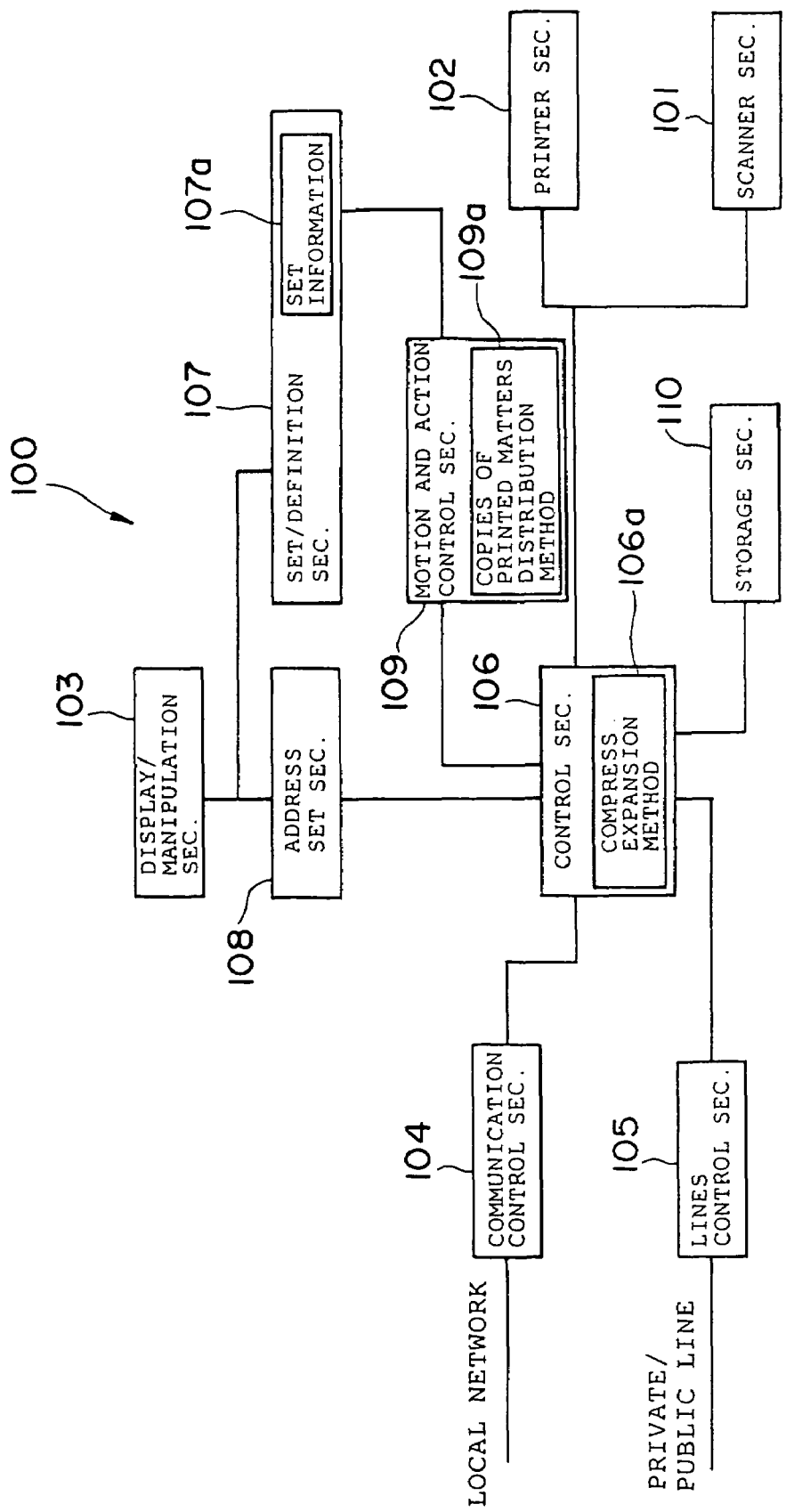
FIG. 29 is a diagram showing an internal configuration of the multifunction machine in the third embodiment of the present invention.

FIG. 29 is a diagram showing an internal configuration of the multifunction machine 100 illustrated as one block in FIG. 28.

Figure 41:
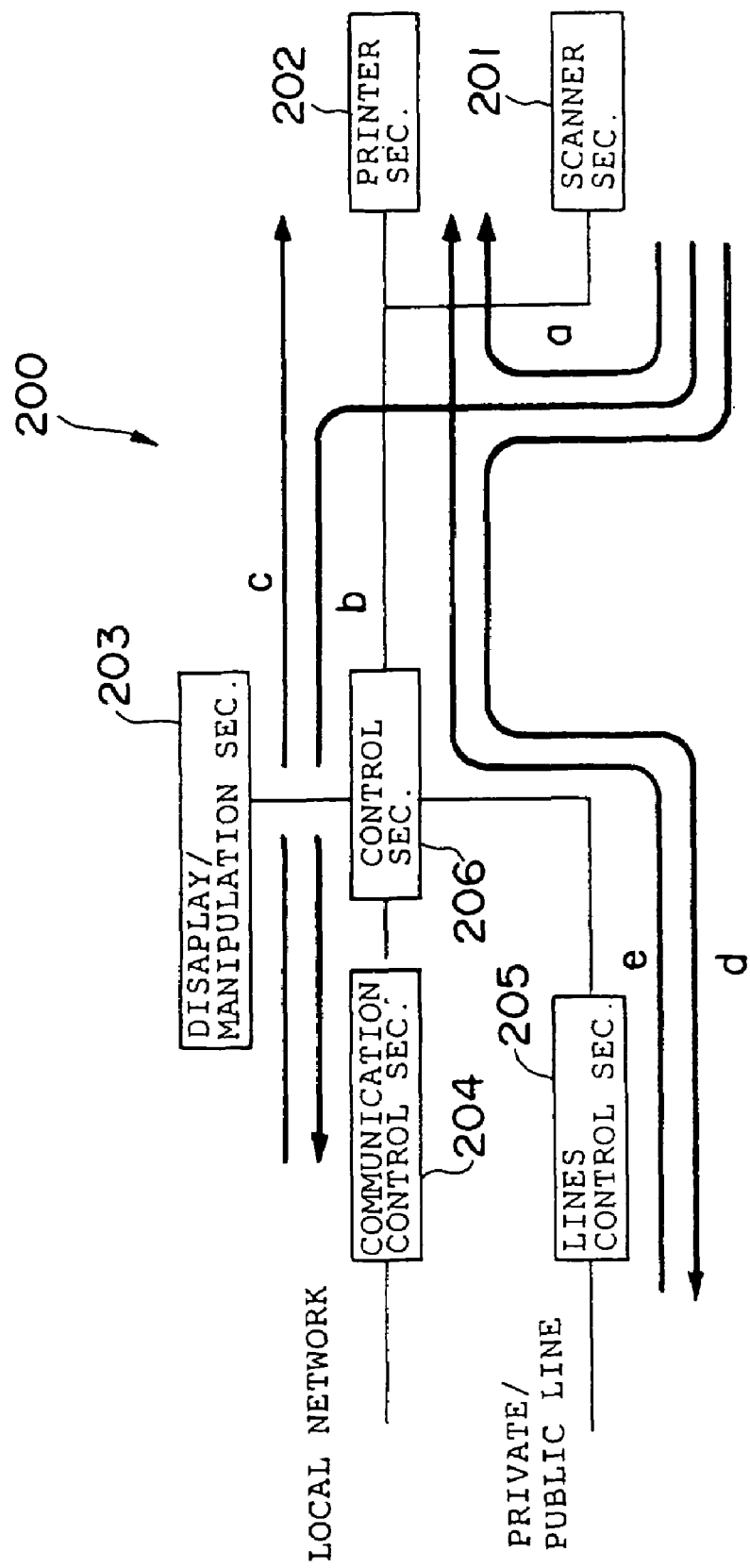
FIG. 41 is a block diagram showing one form of a prior art multifunction machine.

A printer unit 102, a display/operation unit 103, a communications control unit 104, a line control unit 105 and a control unit 106, which constitute the multifunction machine 100 shown in FIG. 29, correspond to the scanner unit 201, the printer unit 202, the display/operation unit 203, the communications control unit 204, the line control unit 205 and the control unit 206, which constitute the conventional multifunction machine 200 shown in FIG. 41. Among these units, the display/operation unit 103 and the control unit 106 are slightly different in terms of their operations from the display/operation unit 203 and the control unit 206 shown in FIG. 41, and are therefore so structured as to be adapted to the third embodiment.

A setting/defining unit 107 constituting the multifunction machine illustrated in FIG. 29 is an element playing a role of creating set information representing an addressee device list containing all devices to which the image data can be transmitted from the multifunction machine 100. In the third embodiment, the setting/defining unit 107 includes a set information recording unit 107a for recording the created set information. This set information recording unit 107 is stored with the set information created by the setting/defining unit 107.

FIG. 30 is a conceptual diagram showing a part of the set information.

As for the copy function, an image data transmitted device (destination) is limited to the printer unit 102 of the self multifunction machine 100 shown in FIG. 29, and hence there is no necessity for defining the destination in particular.

Concerning the print function, the image data transmitted device is identified by a URL (Uniform Resource Locator) name, or by a host name plus a printer name.

The host name is a nomenclature for specifying an apparatus connected to the local network and having a printer controlled by the apparatus itself, such as, e.g., one of the personal computers $302_1$, $302_2$ shown in FIG. 28 and, when the same kind of multifunction machine is further connected separately from the multifunction machine shown in FIG. 29 to the local network, this very multifunction machine. The host name may be, when the local network printer itself is connected, a nomenclature for specifying this printer itself. Further, it is also presumed that the specified apparatus includes a plurality of printers, and therefore the printer name is also a nomenclature for designating a specified printer among the printers controlled by the specified apparatus. If designated by the URL name, this URL name contains the host name and the printer name.

It may be arbitrary to decide whether the URL name or the host name plus the printer name is to be used, and the multifunction machine shown in FIG. 29 may be constructed so that only any one of these name options can be made, or both of the name options are usable but one option may be made depending upon a nature etc of the local network to which the multifunction machine 100 is connected.

With respect to the scanner function, the image data transmitted device is identified by the URL name, or by the host name plus a stored device directory name. The host name is a nomenclature for specifying one of apparatuses for controlling the image data stored device such as, e.g., one of the two personal computers typically shown in FIG. 28. The stored device directory name is a nomenclature for, there being a case where that specified apparatus might have a plurality of stored devices, specifying one of the plurality of stored devices. In the case of being specified by the URL name also, this URL name contains the host name and the directory name. It may be decided the same as in the case of having explained the printer apparatus whether the URL name or the host name plus the directory name is to be used.

In the case of the FAX function, the transmitted device is identified by a FAX number (a telephone number) of a co-communication FAX device and by ab abbreviated number for specifying this FAX number (the telephone number).

Note that FIG. 30 shows only one example of each of the print function, the scanner function and the FAX function, however, a plurality of destinations are inputted with respect to each of these functions, and set information representing an addressee list containing all the addressees thereof, is created. Further, though omitted in FIG. 30, the URL name and the FAX number are hard for the user to recognize a destination, and hence an easy-to-recognize destination name for the user such as a name of section of the destination etc is also recorded in the set information, corresponding to the URL name and the FAX number.

As discussed above, the transmission destination is not limited to what prescribes both of the function and the addressee, and may be what an output destination of the read image is univocally determined. Further, the transmission destination may also be what prescribes only the function or the function plus the addressee, or what includes an addition of other settings other than the function and the addressee. For instance, it is unfeasible to set the addressee in the copy function. In the case of the printer having a plurality of stackers, however, it is feasible to set which stacker the printed material is discharged to. What combines a difference between these settings with the copy function may also be defined as a transmission destination. Moreover, the print function, the scanner function and the FAX function have been described by exemplifying the case where all needs the addressees. In a case where there is only one addressee corresponding to the operation mode, however, what prescribes only each individual function may be set as a transmission destination. Thus, it is feasible to obviate such a problem inherent in the multifunction machine that the operation becomes intricate due to an increase in the number of functions by newly introducing a concept of the common transmission destination irrespective of the functions and enabling the transmission destination to be set regardless of the classification of the functions.

Referring back to FIG. 29, the discussion will continue.

An addressee setting unit 108 constituting the multifunction machine 100 in FIG. 29 is defined as an element playing a role of designating a destination of this time to which the image data obtained from an original copy which is to be read by the scanner unit 101 this time in accordance with an operation of the display/operation unit 103. When the transmission destination is designated by operating the display/operation unit 103, the addressee setting unit 108 sets a flag in the addressee designated in the addressee list represented by the set information recorded in the set information recording unit 107*a*. This flag indicates the transmission destination of this time. Herein, the addressee list is displayed on the display/operation unit 103, however, if the flag is set in the set information, the display/operation unit 103 displays the flag-set addressee in a special mode such as, e.g., a black-and-white reversion. Further, an interlocking operation control unit 109, when the scanner unit 101 reads the original copy and generates the image data, performs scheduling so that the set information stored in the set information recording unit 107*a* is read, then the thus generated image data is converted into a data format suited to the transmission destination where the flag is set in the set information, and the image data in the converted data format is sent to the transmission destination.

Note that FIG. 29 shows a number-of-prints distribution unit 107*a* included in the interlocking operation control unit 109, and this number-of-prints distribution unit 107*a* is an element needed in a modified example which will hereinafter be discussed, and is described on the occasion of discussing this modified example.

Moreover, the recording unit 110 illustrated in FIG. 29 serves to temporarily store the image data. The control unit 106 has a compression/extension unit 106*a*. The compression/extension unit 106*a* of the control unit 106 executes a compressing process upon the image data generated by reading the original copy with the scanner unit 101, and the image data in a compression format is temporarily stored in the recording unit 110. The compression-formatted image data stored in the recording unit 110 is read by the control unit 106 and subjected to an extension process by the compression/extension unit 106*a*. The extended image data is further converted into a data format corresponding to each of the print function and the FAX function etc. The image data is transmitted to and printed by the printer unit 102 in the case of the copy function, sent to the local network via the communications control unit 104 in the case of the print or scanner function, and sent to the circuit via the line control unit 105 in the case of the FAX function.

As described above, with the control unit 106 including the compression/extension unit 106*a*, it follows that the recording unit 110 is stored with the compression-formatted image data, whereby a recording capacity of the recording 110 is allowed to decrease.

Further, the recording unit 110 is also used as a temporary storage location for storing the image data (which is so compression-formatted as to be suited to each transmission via the local network or the circuit) inputted via the network or the circuit. The image data temporarily stored in the recording unit 110 is read by the control unit 106, then converted into the data format suited to printing in the printer unit 102, and then transmitted to the printer unit 102. The printer unit 102 performs printing based on the image data.

Figure 31:
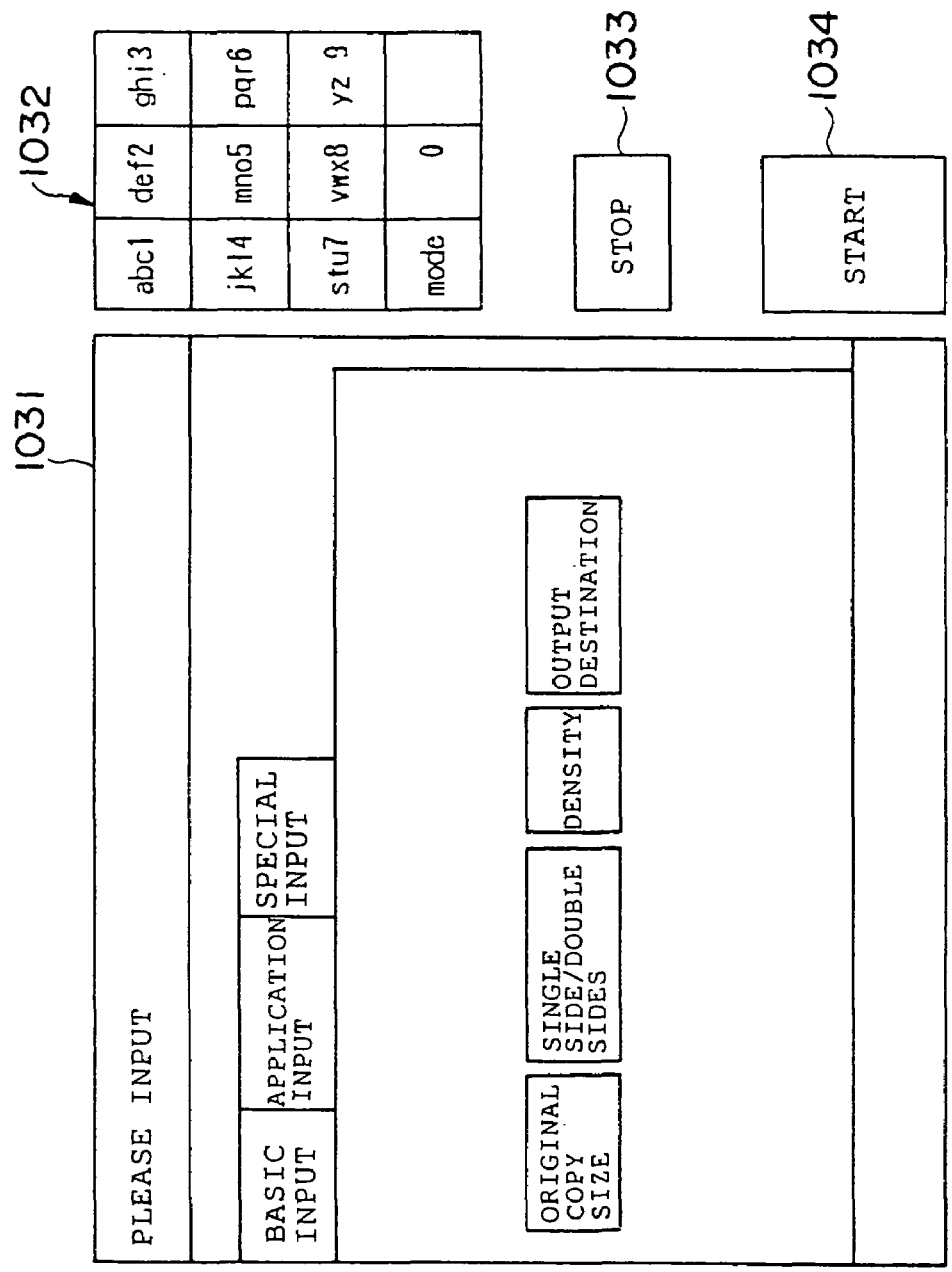
FIG. 31 is a diagram illustrating an operation panel on a display/operation unit in a state where an initial screen is displayed.
Figure 32:
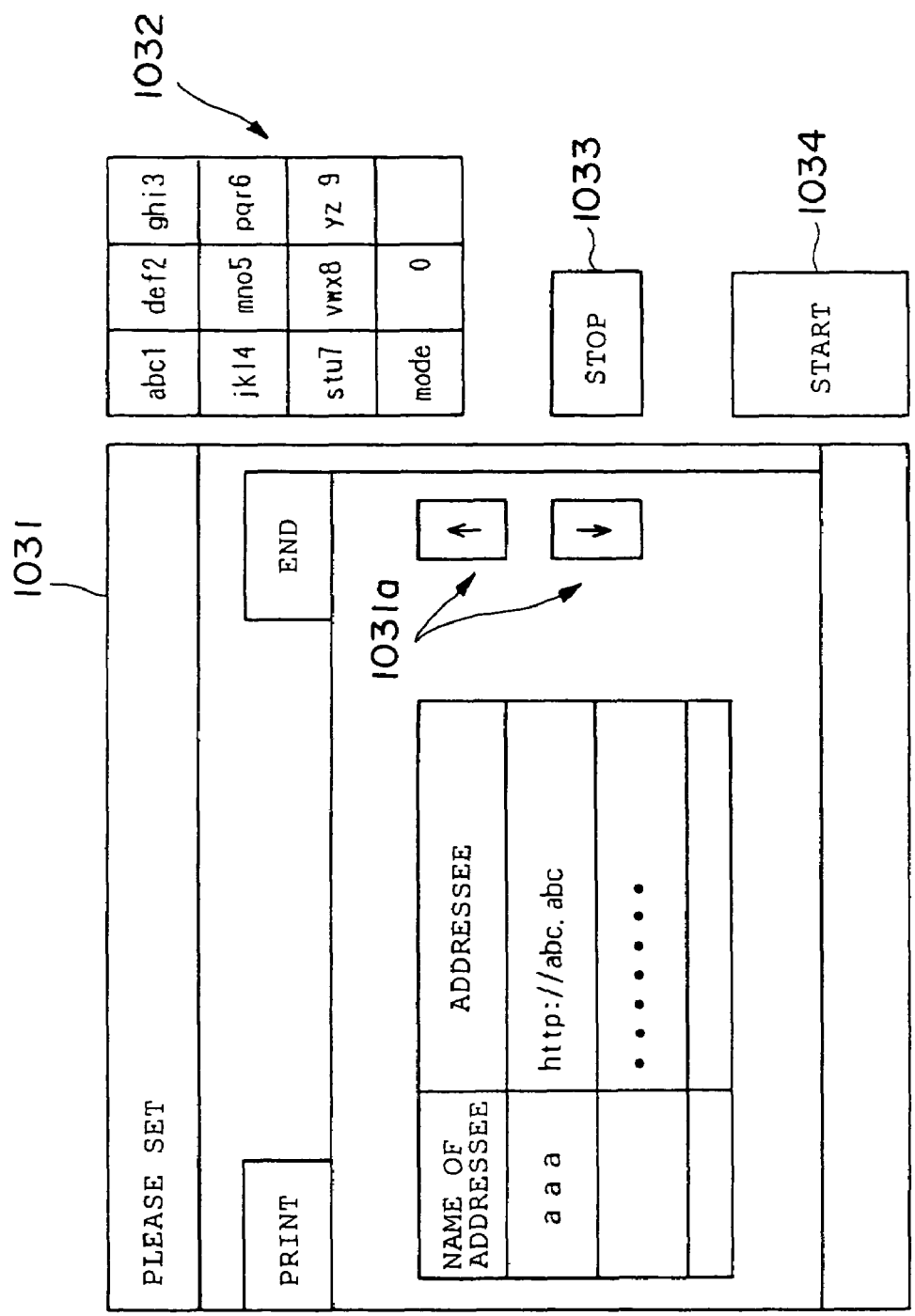
FIG. 32 is a diagram illustrating the operation panel on the display/operation unit in a state where an addressee setting/defining screen is displayed.
Figure 33:
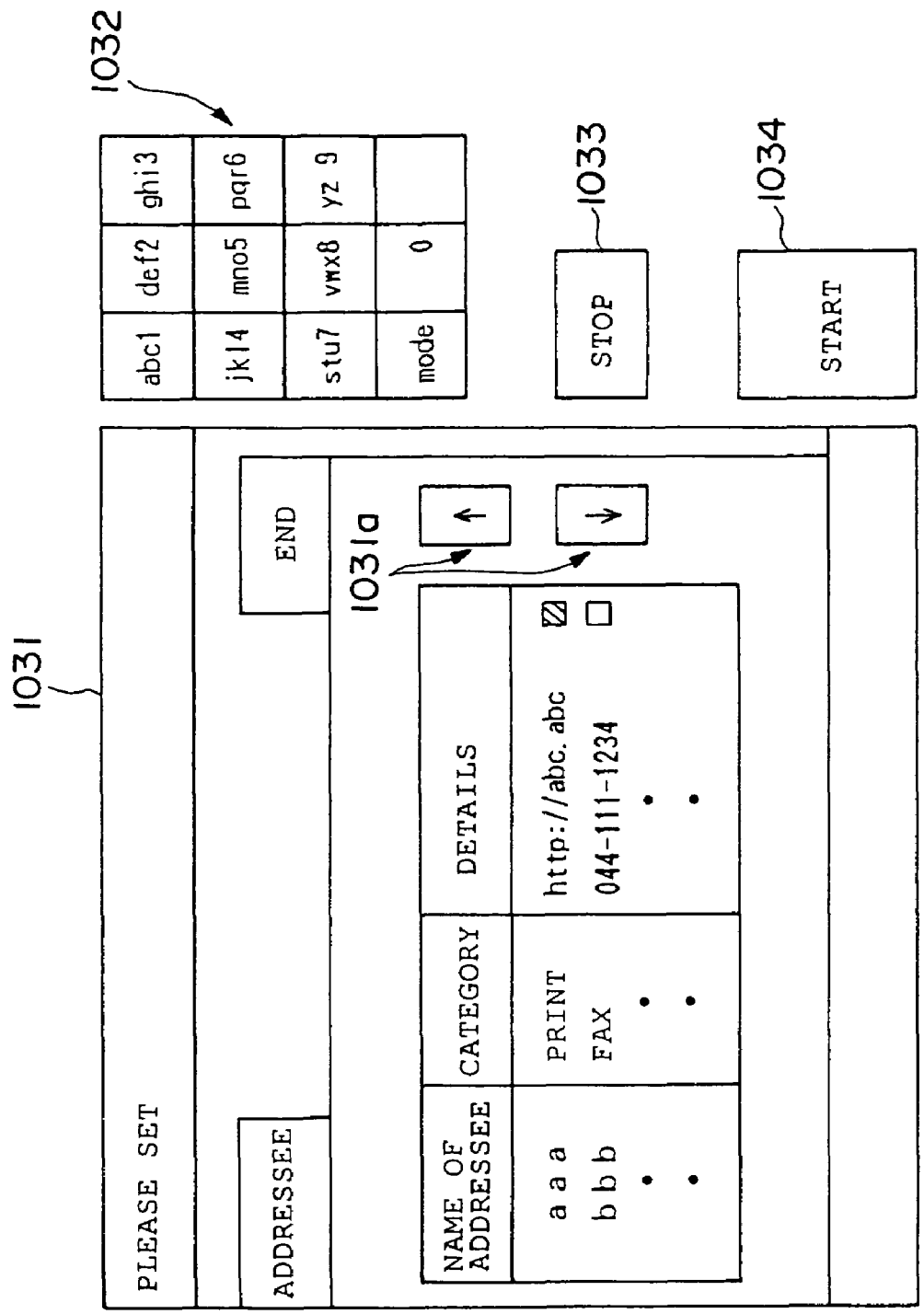
FIG. 33 is a diagram illustrating the operation panel on the display/operation unit in a state where an addressee selection screen is displayed.

FIGS. 31–33 are diagrams each illustrating an operation panel on the display/operation unit.

Disposed on this operation panel are a display area for displaying a variety of operation screens, a setting key 1032 for inputting characters and numerals, a stop button 1033 for indicting a stop of the operation, and a start button 1034 for indicating a start of the operation.

Herein, referring to FIGS. 31, 32 and 33, an input initial screen, an addressee setting/definition screen, and an addressee selection screen are respectively displayed on a display panel unit 1031.

Upon switching ON the power source of the multifunction machine 100 constructed as shown in FIG. 29, or when reset with an end of one operation, the input initial screen shown in FIG. 31 is at first displayed on the display panel unit 1031.

Herein, upon pressing a "special input" button by a finger, a menu screen of the "special input" is, though not illustrated, displayed, and, with a further operation on the menu screen, the addressee setting/definition screen shown in FIG. 32 is displayed. This addressee setting/definition screen shown in FIG. 32 is used for setting and defining an addressee for "print". In addition to this screen, there also exist addressee setting/definition screens for "scanner" and "FAX".

Although the characters and the numerals are inputted when operating the setting key 103, herein a column is chosen by a cursor key 1031*a*, and an addressee name and the addressee are inputted in characters and numerals to the selected column.

In the example shown herein, an addressee name "aaa" is shown. Herein, however, there is inputted the addressee name which is easy for the operator to understand such as, e.g., "SOUMU" when the addressee is a printer placed in, e.g., the general affairs (soumu) department. In this illustrative example, an addressee "http://abc.abc" is shown, however, as explained referring to FIG. 30, "URL name" or "host name plus printer name" is inputted to this column. The inputting is repeated by sequentially selecting the column with the cursor key 1031*a*, and, when finally pressing an "end" button, the display returns to the initialization screen shown in FIG. 31. At this time, the setting/definition unit 107 creates the set information which is stored in the set information recording unit 107*a*. The operation is the same with the "scanner"- and "FAX"-oriented addressee setting/definition screens.

The scanner unit 101 reads the original copy and thus generates the image data, and this piece of image data is sent to a single or a plurality of addressees, in which case an "addressee" button is pressed on the input initial screen shown in FIG. 31. Thereupon, the addressee setting unit 108 shown in FIG. 29 reads the set information, and there is displayed the addressee selection screen on which to display the addressee list as shown in FIG. 33. Displayed herein is the list containing all the addressees for "the print", "the scanner" and "the FAX" which have been set and defined in the explanation referring to FIG. 32, further including "the copy".

When fingering the addressee to which the image data is transmitted while scrolling the addressee list with the cursor key 1031*a*, a mark is displayed at the fingered addressee on the display screen, whereby it can be recognized that the addressee is selected. Further, the addressee setting unit 108 shown in FIG. 29 sets a flag to this selected addressee and writes it back to the set information storage unit 107*a*. In this addressee selection, it is feasible to chose an arbitrary number of arbitrary addressees irrespective of the functions such as the copy function, the print function, the scanner function and the FAX function etc.

The addressee is thus chosen, and further an "original copy size", a "one-side/double-side" and a "density" are set according to the necessity. Then, the original copy is set in the scanner unit 101, and the start button 1034 is pressed. Thereupon, the scanner unit 101 reads the original copy, thereby generating the image data. The image data is compressed by the compression/extension unit 106*a* of the control unit 106 and temporarily stored in the recording unit 110. Thereafter, the control unit 106, based on an indication of the interlocking operation control unit 109, reads the compressed image data recorded in the recording unit 110, and converts the image data into a data format corresponding to the addressee. The image data having converted into the above data format is outputted toward the addressee. The interlocking operation control unit for monitoring the flag set in the set information indicates which addressee the image data is outputted to.

Figure 34:
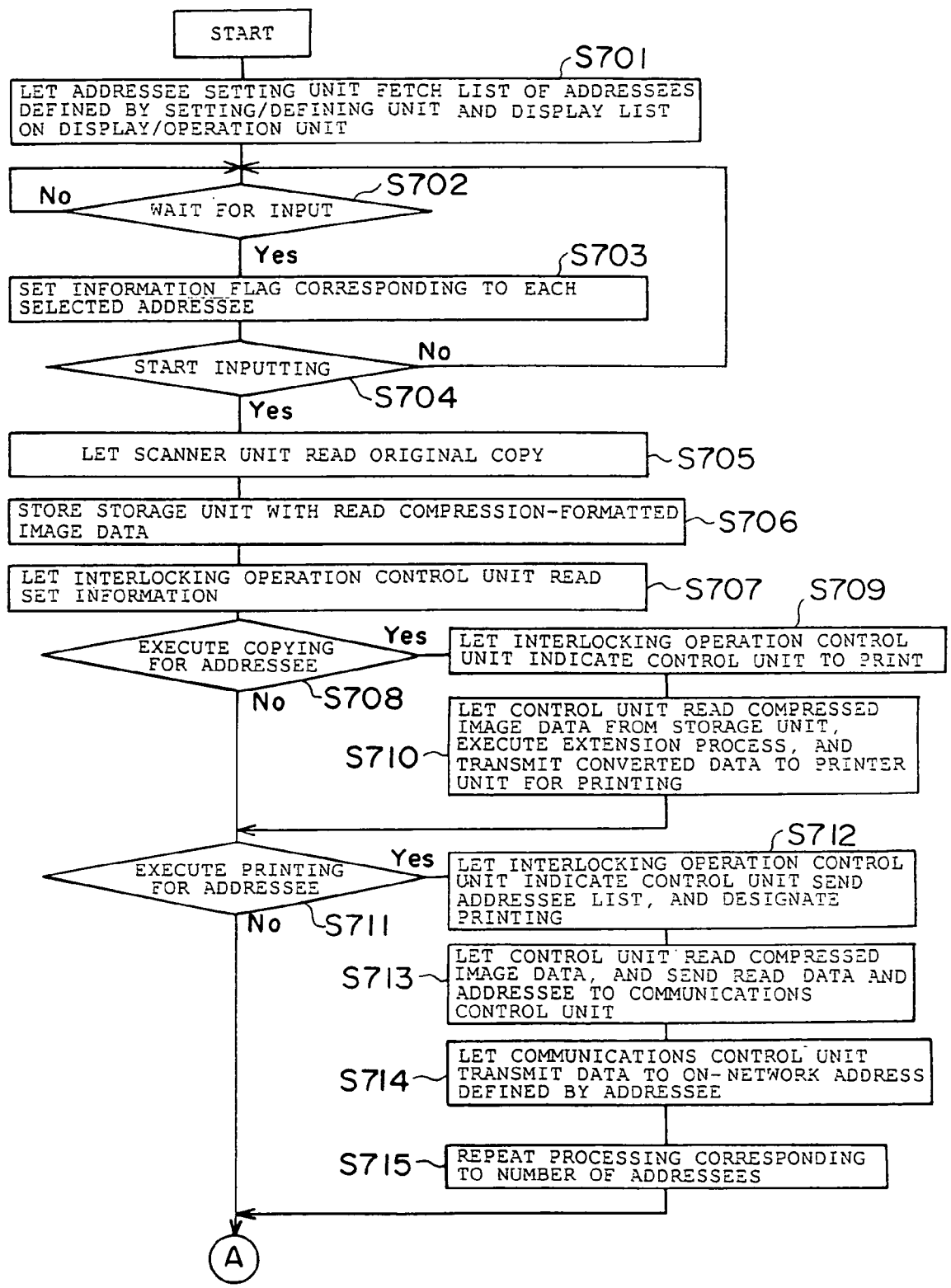
FIG. 34 is a diagram showing a first half of a flowchart showing an operation of the multifunction machine shown in FIG. 2 when transmitting image data.
Figure 35:
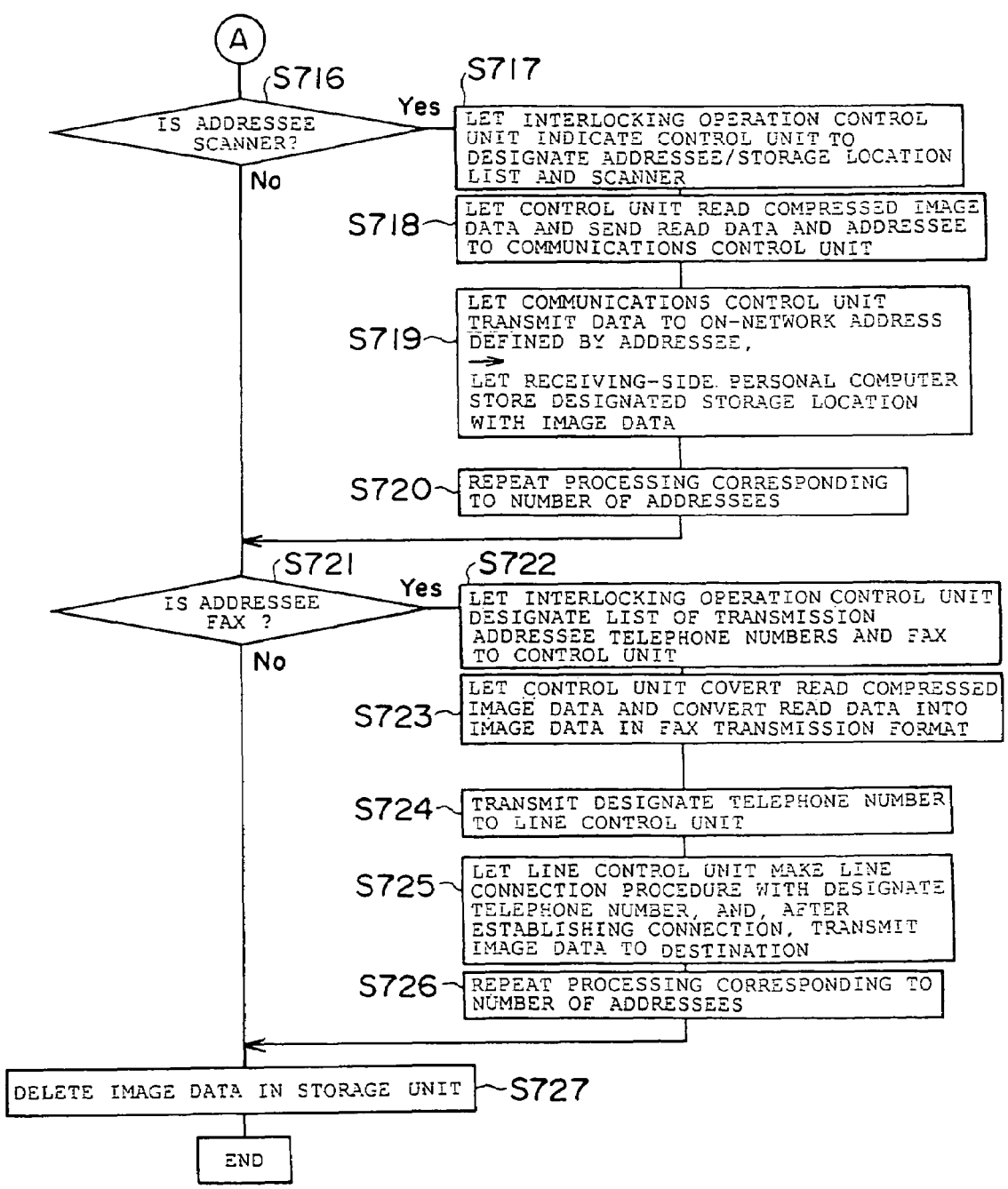
FIG. 35 is a diagram showing a second half of the flowchart showing the operation of the multifunction machine shown in FIG. 2 when transmitting the image data.

FIGS. 34 and 35 are diagrams respectively showing a first half and a second half of the flowchart showing the operations of the multifunction machine shown in FIG. 2 when transmitting the image data. Herein, though individually explained so far, the operations of the multifunction machine when outputting the image data are described en bloc in accordance with this flowchart.

To begin with, when the user presses the "addressee" button on the input initial screen shown in FIG. 31, the addressee setting unit 108 fetches the addressee list defined by the setting/definition unit 107 out of the set information, and makes the display/operation unit 103 display this list (step S701, see FIG. 33). Subsequently, the setting/definition unit 107 stands by till the user selects the addressee from the addressee list displayed thereon (step S702), and, when selected, sets the flag in the set information corresponding to the chosen addressee (step S703). The addressee selecting operation is repeated according to the necessity, and, upon pressing the start button 1034 (step S704), the scanner unit 101 reads the original copy, thereby generating the image data (step S705). The image data obtained through the reading process is converted into a compression format by the compression/extension unit 106*a* of the control unit 106, and is stored in the recording unit 110 (step S706).

Subsequently, the interlocking operation control unit 109 reads the set information and checks which addressee the flag in the set information is set to (step S707). If the address to which that flag is set contains "copy" (step S708), the interlocking operation control unit 109 indicates the control unit 106 so that the printer unit 102 performs printing (step S709). Then, the control unit 106 the reads the compressed image data stored in the recording unit 110, and the compressed image data is subjected to an extension process by the compression/extension unit 106*a* of the control unit 106. The image data after having been extension-processed is transmitted to the printer unit 102, wherein the printing is carried out (step S710).

If the addressee to which the flag in the set information is set contains an addressee of print" (step S711), the interlocking operation control unit 109 sends a "print" addressee list to the control unit 106 and indicates the control unit 106 to effect the "print" (step S712). Thereupon, the control unit 106 reads the compressed image data from the recording unit 110, and, after converting this piece of image data into a "print"oriented data format, transmits the thus formatted data and a data addressee to the communications control unit 104 (step S713). The communications control unit 104 receives the data and the addressee thereof, and executes a data transmission process to an address on the network which is defined by the above addressee (step S714). The data transmission process described above is repeated a given number of times corresponding to the number of addressees to which the flag is set (step S715).

If the addressee in the set information to which the flag is set contains an addressee of "scanner" (step S716), the interlocking operation control unit 109 sends to the control unit 106 an addressee (i.e., storage destination) list relative to "scanner", and indicates the control unit 106 that the "scanner" function should be executed (step S717).

Then, the control unit 106 reads the compressed image data out of the recording unit 110, and, after converting the data into a "scanner"-oriented data format, transmits this pieces of data and a data addressee (storage destination) to the communications control unit 104 (step S718). The communications control unit 104 receives this piece of data and information on the data addressee (storage destination), and implements the data transmission process to an address on the network which is defined by that addressee (step S719). Thereupon, in the receiving-side personal computer etc, the image data is stored in the designated storage destination. The data transmission process described above is repeated a given number of times corresponding to the number of addressees to which the "scanner" flag is set (step S720).

If the addressee in the set information to which the flag is set contains an addressee of "FAX" (step S721), the interlocking operation control unit 109 sends to the control unit 106 an addressee (a telephone number) list of "FAX", and indicates the control unit 106 that the "FAX" function should be executed (step S722). Then, the control unit 106 reads the compressed image data out of the recording unit 110, and converts the data into a "FAX"-oriented data format (step S723). Then, the control unit 106 transmits the designated telephone number to the line control unit 105 (step S724). Thereupon, the line control unit 105 makes a procedure for a circuit connection with respect to the designated telephone number, and, after establishing the connection, transmits the image data to the designated destination (step S725). The above circuit connecting procedure with respect to the designate telephone number and the image data transmission process, are repeated a given number of times corresponding to the number of addressees to which the "FAX" flag is set (step S726).

Upon an end of all the processes discussed above, the image data in the recording nit 110 are deleted (step S727).

In accordance with the third embodiment, as described above, it is possible to transmit the image data to the designated addressee by specifying one or a plurality of addressees without being aware of which function is used among the four functions such as "copy function", "print function", "scanner function" and "FAX function".

MODIFIED EXAMPLE

Next, a modified example of the third embodiment discussed above will be explained.

Figure 36:
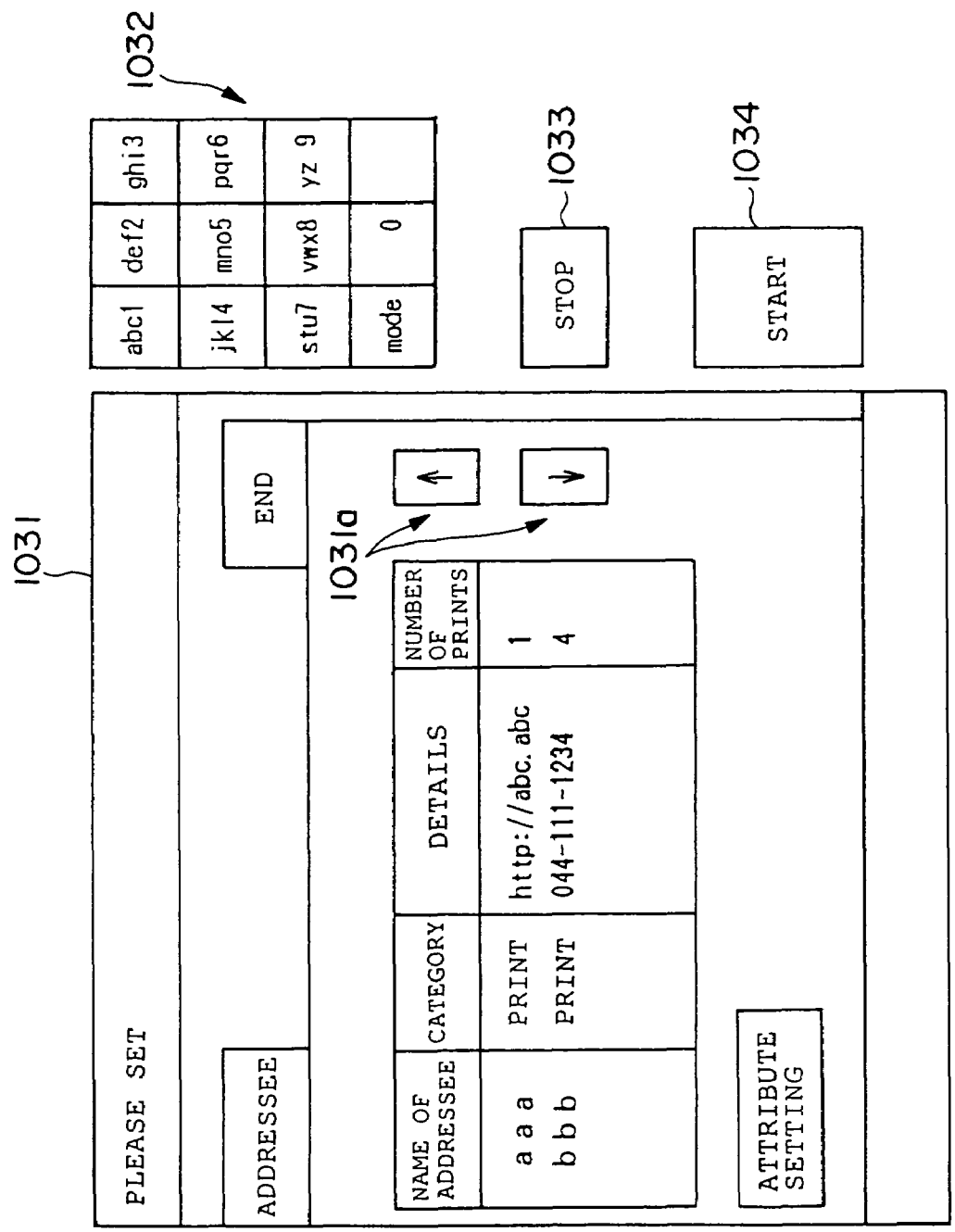
FIG. 36 is a diagram showing the operation panel in a state where an addressee selection screen is displayed in a modified example of the third embodiment.
Figure 37:
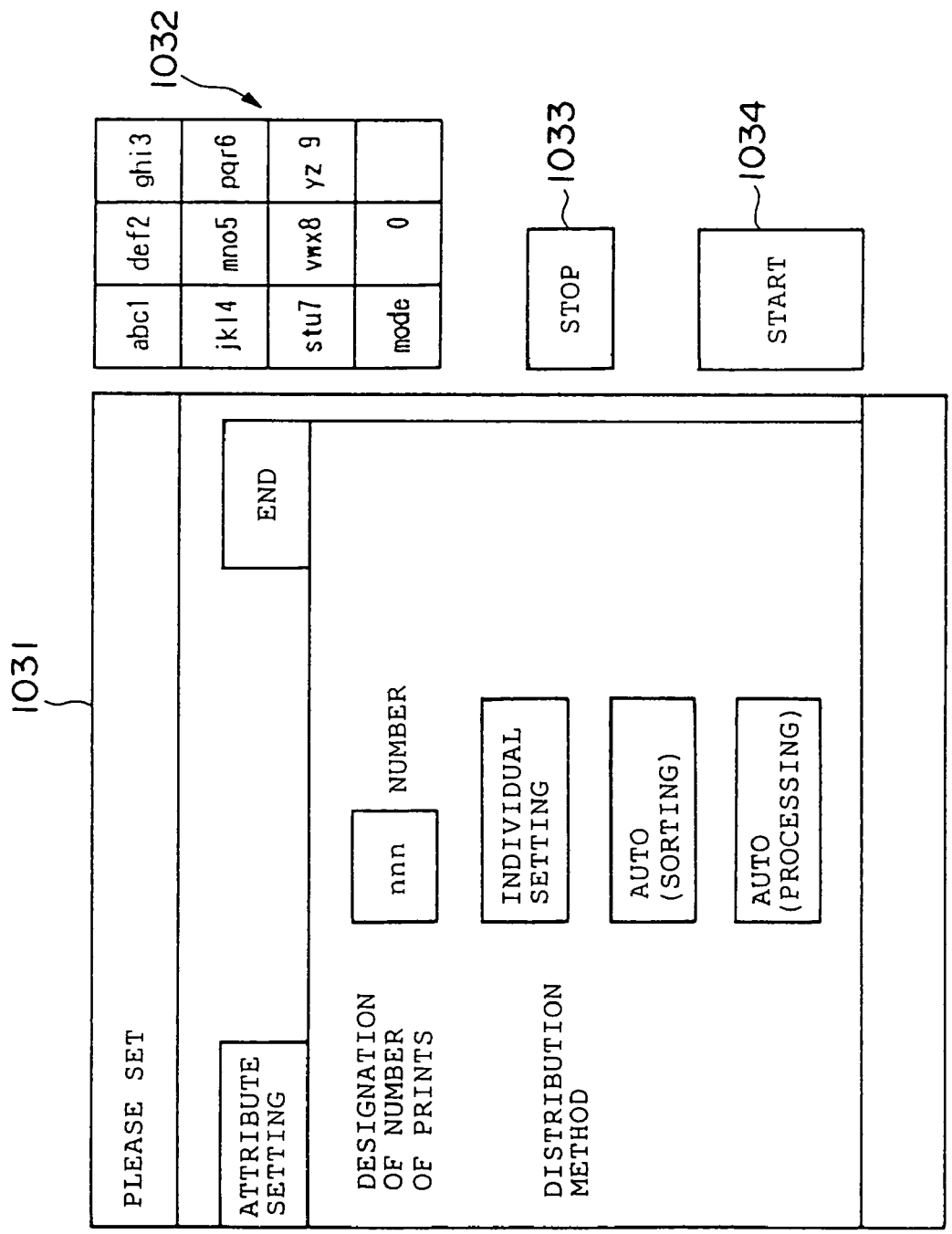
FIG. 37 is a diagram showing the operation panel in a state where an attribute setting screen is displayed.

FIG. 36 is a diagram showing the operation panel on which to display an addressee selection screen in this modified example as a substitute for the addressee selection screen shown in FIG. 3 in the third embodiment. FIG. 37 is a diagram showing the operation panel on which an attribute setting screen is displayed.

The addressee selection screen shown in FIG. 36 is different from the addressee selection screen shown in FIG. 33 in that an indication column of "the number of prints" and an "attribute setting" button are displayed in each addressee region. Upon pressing this "attribute setting" button, the attribute setting screen shown in FIG. 37 is displayed. The number of copies or prints and a number-of-copies- or prints distribution method are designated on this attribute setting screen. Among three buttons for showing the distribution method, an "individual setting" button is used for selecting a mode in which the user specifies the number of prints for each addressee. When setting the number of prints by taking this mode, one or a plurality of addressees shown in FIG. 36 are chosen on the selection screen. Next, the selected addressees are again selected by using the cursor button 1031a, subsequently the "attribute setting" button is pressed, and, with the "individual setting" selected, the number of prints is specified. Thereupon, the number of prints for the addressees selected is specified. When pressing the "end" button on the attribute setting screen, the display returns to the addressee selection screen shown in FIG. 36, then the a "attribute setting!" button is pressed after choosing the next addressee with the cursor button 1031a, and the number of prints for this addressee is set in the same way as the above. This operation is repeated, thereby setting the number of prints for each individual addressee.

Note that when the addressee is chosen on the addressee selection screen shown in FIG. 36, "1" is set as an initial value of the number of prints for the selected addressee. Accordingly, the above operation may be executed only when the number of prints for one addressee is set to 2 or more. Further, the "individual setting" is set as an initial setting for the distribution method on the attribute setting screen illustrated in FIG. 37. Hence, when performing the individual setting operation as to the number of prints, there is no necessity for manipulating the "individual setting" button each time.

Moreover, an "auto (sorting)" button and an "auto (processing)" button are prepared by way of other buttons for the number-of-prints distribution method. When pressing the "auto (sorting)" button or the "auto (processing)" button, the specified number of prints implies not the number of prints for the individual addressee but a total number of prints for all the addressees selected on the addressee selection screen shown in FIG. 36. When setting he number of prints by pressing the "auto (sorting)" button or the "auto (processing)" button, the set number of prints are automatically distributed to the selected addressee. On the occasion of this distribution, when the "auto (sorting)" button is pressed, the prints are distributed corresponding to a sorting capability per addressee of the printer (including its own printer unit 102 for copying). When the "auto (processing)" button is pressed, the prints are distributed corresponding to a print processing capability per addressee of the printer. This distribution method will be explained later on by exemplifying a specific example.

Next, the set information in this modified example will be described.

Used herein is three kinds of set information which will be exemplified as follows.

TABLE 1

(Set Information 1)

| Addressee | Type | Details | Flag | Number of Prints |
|---|---|---|---|---|
| aaa | print | http://xxx.aaa | ON | 5 |
| bbb | print | http://xxx.bbb | OFF | 1 |
| ccc | print | http://xxx.ccc | ON | 3 |

TABLE 2

(Set Information 2)

| Number of Prints | xxx |
|---|---|
| Distribution Method | 1 . . . individual setting |
| | 2 . . . auto (sorting capability) |
| | 3 . . . auto (processing capability) |

TABLE 3

(Set Information 3)

| Name of Addressee | Sorting Capability | Processing Capability |
|---|---|---|
| aaa | 20 (stages) | 30 (sheets/min) |
| bbb | 10 (stages) | 10 (sheets/min) |
| ccc | 5 (stages) | 10 (sheets/min) |

The "addressee", the "type" and the "details" in the set information shown in Table 1 are the same as the set information set through manipulations on the addressee setting/definition screen shown in FIG. 32 in the third embodiment discussed above and have already been explained, of which the repetitive explanation is therefore omitted herein. Further, the "flag" indicates the addressee (ON) selected on the addressee selection screen shown in FIG. 36, and the "number of prints" is individually set or automatically distributed for each addressee.

The set information 2 shown in Table 2 indicates the method of distributing the set number of prints, wherein what is stored therein is classified into "individual setting", "auto (sorting capability)" and "auto (processing capability)". The "number of prints" in this item of set information 2 is effective both in the "auto (sorting capability)" mode and in the "auto (processing capability)" mode, and represents a total number of prints. This total number of prints are automatically distributed to the addressee at which the flag of the set information is set ON.

The set information 3 shown in Table 3 consists, though a set screen on which to set this item of set information 3 is not shown, of pieces of data set in combination with setting the addressee list excluding the settings of the "flag" and the "number of prints" in the set information 1, wherein the sorting capability and the processing capability are set for each addressee. Note that if the printer has no sorting capability, "no sorting capability" is set therein. It should be also noted that this item of set information 3 may automatically be set by obtaining the data on the sorting capability and the processing capability from each printer in a way that is normally carried out, instead of setting on the operation panel.

These items of set information 1, 2 and 3 are stored in the set information recording unit 107a illustrated in FIG. 29, and are referred to by the interlocking operation control unit 109 on the occasion of transmission of the image data. In accordance with this modified example, the interlocking operation control unit 109 includes the number-of-prints distribution unit 109a, and when the "auto (sorting capability)" or the "auto (processing capability)" is set in the set information 2, this number-of-prints distribution unit 109a distributes the set number of prints to each addressee for "copy" and "print" in the manner which will be hereinafter be exemplified.

(Distribution Based on Sorting Capability)

Let $n$ be the total number of prints, $m$ be the number of addressees selected this time (to which the flag is set) for "print" inclusive of "copy", $P_k$ (k=1 to m) be the sorting capability for each addressee, and $Z_k$ (k=1 to m) be the number of prints distributed to each addressee $k$.

(1) To begin with, one print at the minimum is distributed to each of the selected addressees. Accordingly, a remaining number-of-prints $n_a$ is given by:

$$n_a = n - m$$

(2) When $n_a > P_1 - 1$, $$Z_1 = P_1$$

and $n_a$ is updated into $n_a - (Z_1 - 1)$. Herein, "−1" in each of $P_1 - 1$ and $Z_1 - 1$ implies that one print was initially distributed to each addressee.

(3) The operation described above is repeated while sequentially updating $k$ to 1, 2, . . . , and when $n_a \leq P_k - 1$ all the remaining prints $n_a$ are distributed to the addressee $k$, at which time the distribution comes to an end.

(4) When $n_a > P_m - 1$ with respect to k=m, the number-of-prints $Z_m$ is to be set such as $Z_m = n_a + 1$. Namely, the prints, which are to be overflown in terms of the sorting capability, are distributed to the last addressee $m$.

(Distribution Based on Processing Capability)

Assuming that $n$ be the total number of prints, A be the final total of the processing capability (prints/min) for every addressee, and $P_k$ (k=1 to m) be the processing capability for every addressee, the number of prints for the addressee $k$ is given by:

$$(P_k/A) \times n$$

However, one print at the minimum is to be distributed to each addressee, besides the number of prints to the above addressee is adjusted to a value of integer, and further the total number of prints is adjusted to $n$.

Figure 38:
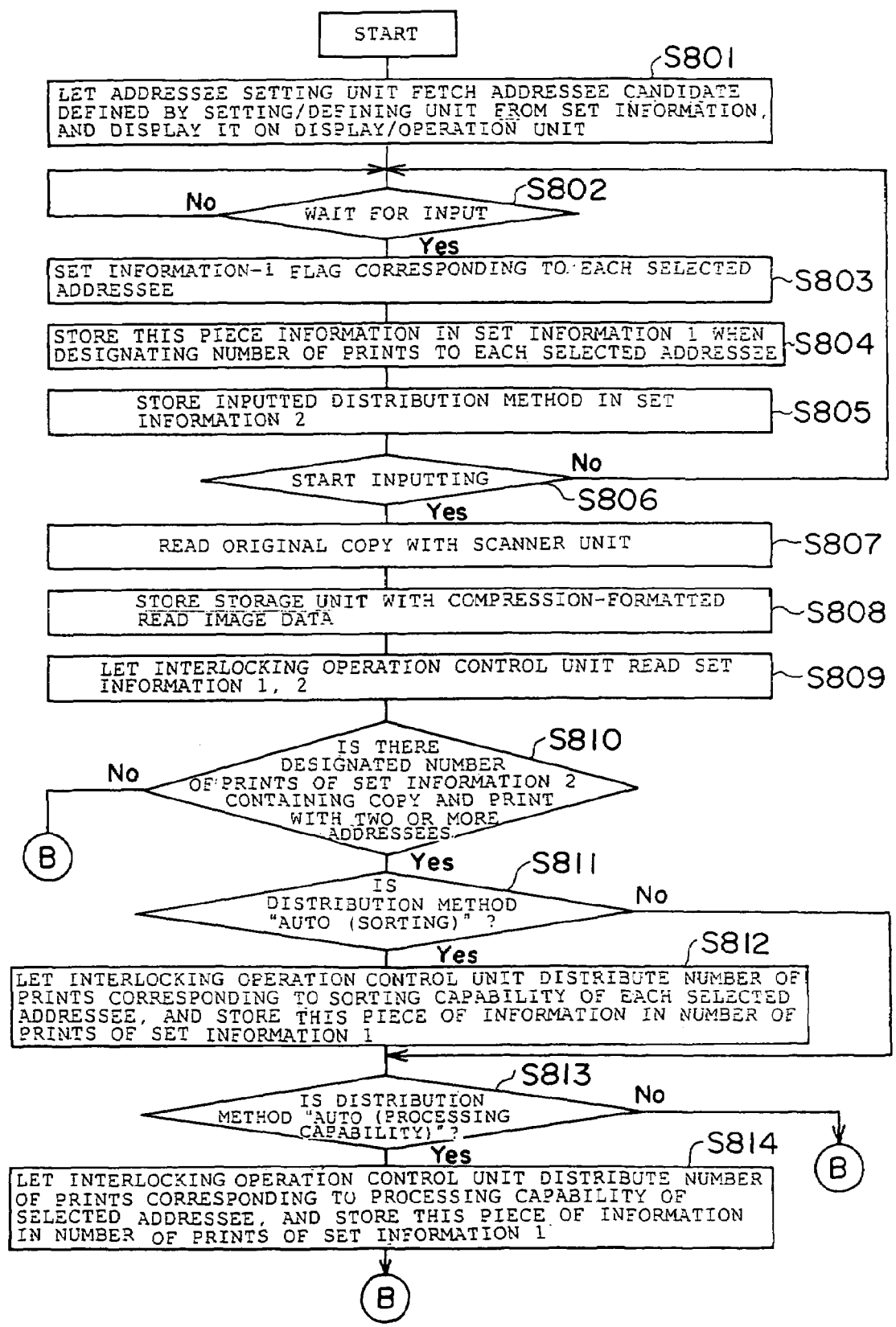
FIG. 38 is a diagram showing a part of a flowchart showing an operation when transmitting the image data in the modified example of the third embodiment.
Figure 39:
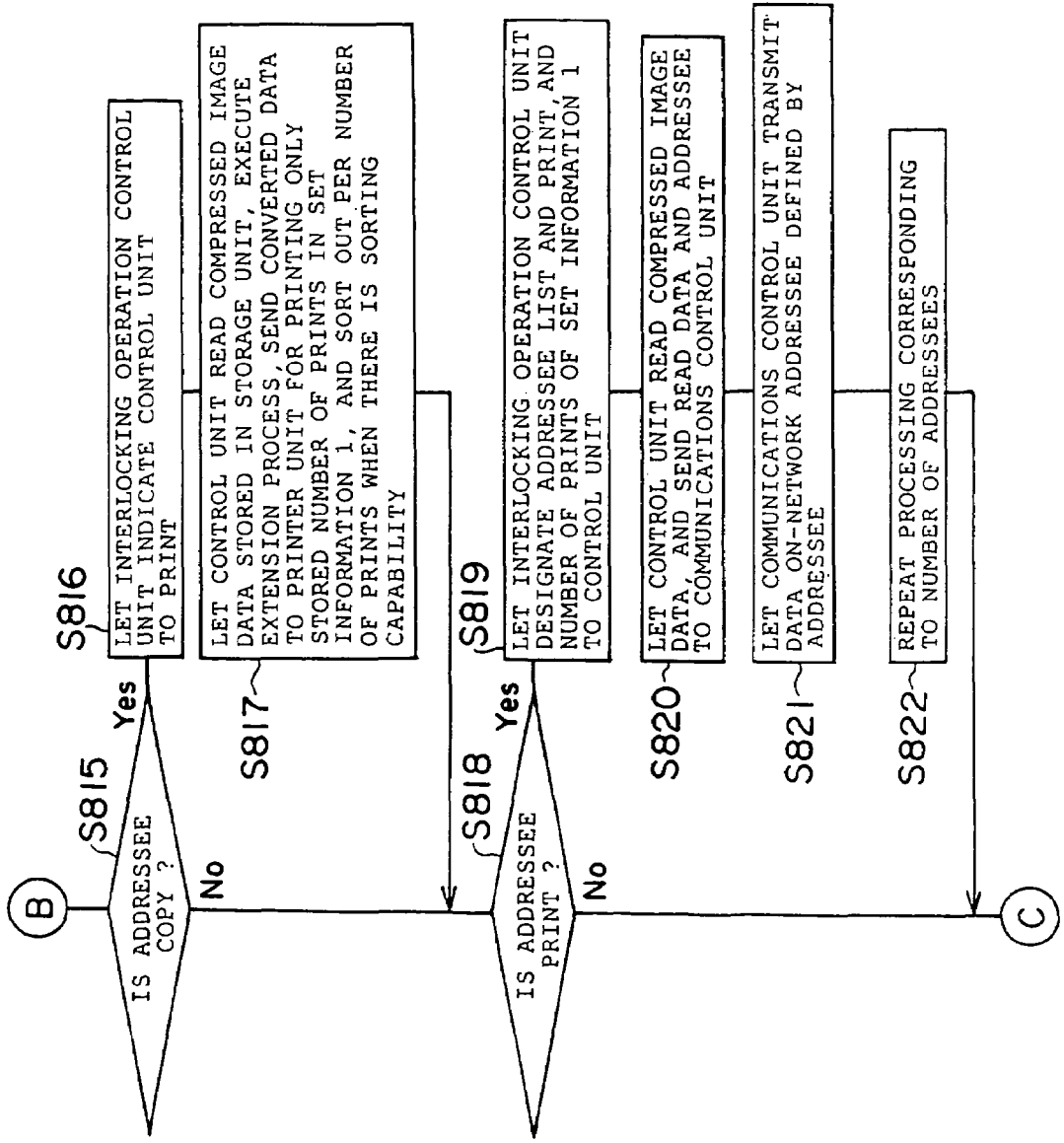
FIG. 39 is a diagram showing a part of the flowchart showing an operation when transmitting the image data in the modified example of the third embodiment.
Figure 40:
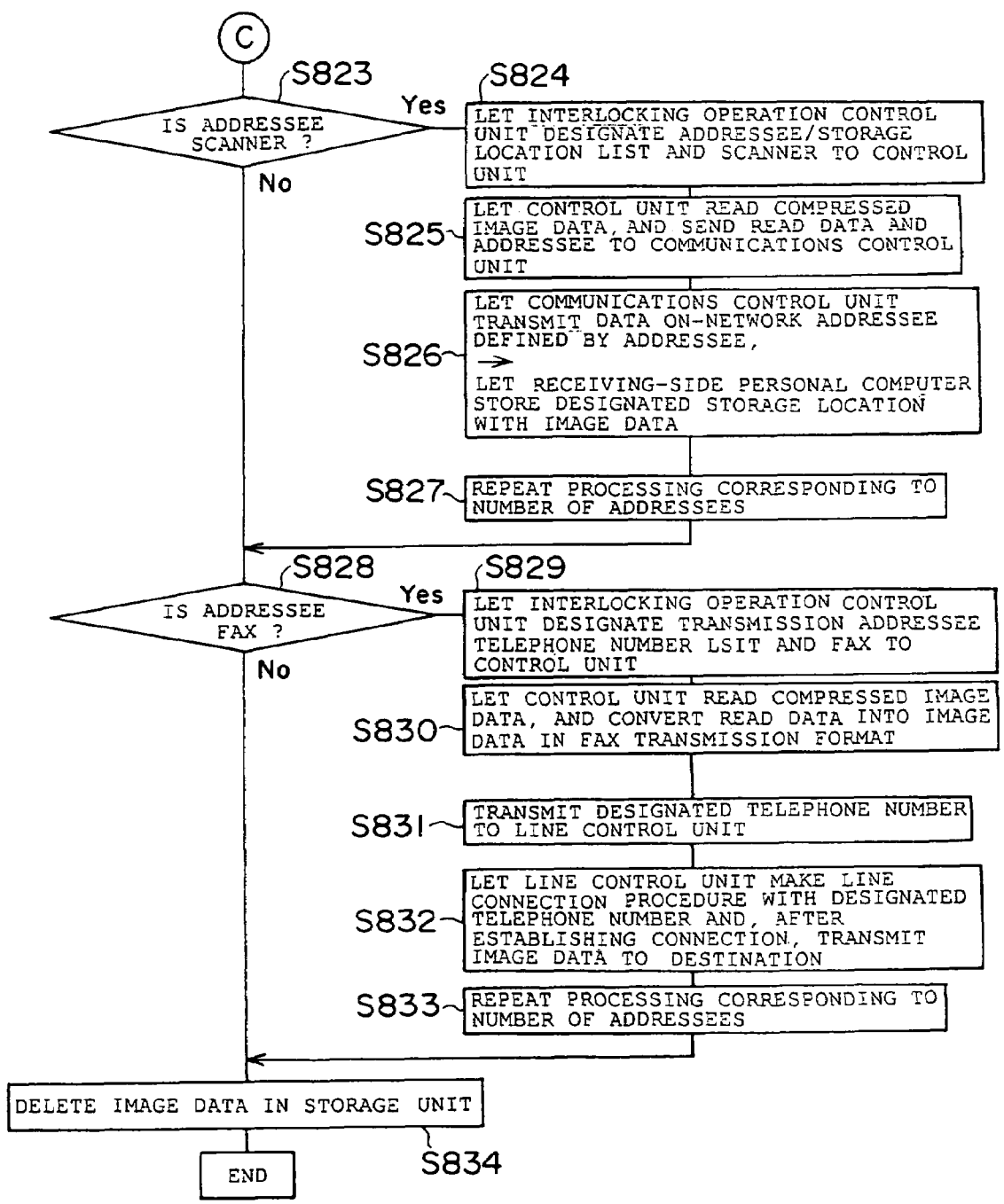
FIG. 40 is a diagram showing a part of the flowchart showing the operation when transmitting the image data in the modified example of the third embodiment.

FIGS. 38–40 are diagrams each showing a part of the flowchart showing the operation when transmitting the image data in the modified example explained herein. Differences from the flowcharts shown in FIGS. 34 and 35 given above are explained.

Respective steps S801–803 are the same as steps S701–S703 in FIG. 34, and hence the explanation thereof is omitted. The "set information" is written in step S703 in FIG. 34, however, "set information 1" is written in step S803 in FIG. 38 for a distinction from other items of set information 2 and 3.

In step S804, if the number of prints for each selected addressee is individually specified, the specified number of prints for each addressee is stored in the set information 1 (see Table 1). This is a process of "individual setting" on the attribute setting screen shown in FIG. 37.

In step S805, the distribution method specified on the attribute setting screen illustrated in FIG. 37 is stored in the set information 2 (see Table 2). At this time, if the "auto (storing capability)" or the "auto (processing capability)" is set, the total number of prints is also set and stored in the set information 2.

Upon pressing the start button (step S806), the scanner unit 101 reads the original copy, thereby generating the image data (step S808). The thus generated image data is converted into a compression format by the compression/extension unit 106a of the control unit 106 (step S708).

Subsequently, the interlocking operation control unit 109 reads the two items of set information 1 and 2 (step S809), and judges whether or not two or more addressees are chosen when "copy" and "print" are combined, and whether or not the number of prints is specified in the set information 2 (step S810). When the addressee is singular, or when the number of prints is not specified even if there are two or more addressees, the processing proceeds directly to step S815.

When satisfying a condition in step S810, the processing advances to step S811, wherein it is judged whether or not the distribution method stored in the set information 2 is defined as the "auto (sorting capability)". If the distribution method is the "auto (sorting capability), in step S812, the set number of prints are distributed based on the above-described distribution method corresponding to the sorting capability. The number of thus distributed prints is stored in the column of "number of prints" for each addressee in the set information 1.

Further, it is judged in step S813 whether or not the distribution method stored in the set information 2 is defined as the "auto (processing capability)". If the distribution method is the "auto (processing capability), in step S814, the set number of prints are distributed based on the above-described distribution method corresponding to the processing capability, and the number thereof is stored in the column of "number of prints" for each addressee in the set information 1. Note that if the distribution method is the "individual setting", the number of prints for each addressee in the set information 1 is, as described above, already individually set.

Steps S815–S834 are the same as steps S708–S727 in FIGS. 34 and 35 except for such a point that the number of prints is specified in the case of "copy" and "print", and the repetitive description is therefore omitted.

The number of prints is specified for every addressee with respect to "copy" and "print", and only the specified number of prints are printed on each receiving side. Then, when having the sorting capability, the sorting process is implemented therein.

In this modified example, the total number of prints is specified, and the set number of prints for each addressee are automatically distributed. Therefore, if there are large numbers of addressees and of prints, a usability of the multifunction machine is enhanced all the more.

In the multifunction machine, the server and the multifunction machine/server system constructed of the multifunction machines and the server according to the present invention, it is feasible to execute the first kind of processes by use of each multifunction machine without providing for every multifunction machine the hardware (such as the FAX-oriented circuit and document-management-oriented recording device etc) needed for only the first kind of processes. Hence, a document environment, which is the same as the document environment structured by use of the conventional multifunction machines, can be actualized at lower costs. Further, the electronic documents relative to the first kind of processes executed by the respective multifunction machines, converge at the server and can be therefore managed at a higher efficiency.

Moreover, according to the multifunction machine incorporating the four functions such as "copy", "print", "scanner" and "FAX", what is done is to simply set the addressee without being aware of the "function" when transmitting the image data to the addressee, and thereafter the function suited to that addressee automatically works, whereby the image data is send toward the addressee. The operability is therefore enhanced. Furthermore, when the set number of prints are automatically distributed, the usability is more improved.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A multifunction machine/server system comprising:
  a server connected to a network and comprising a parent operation management unit and child processing units; and
  a plurality of multifunction machines connected to the network,
  each of said plurality of multifunction machines, comprising:
  a first-kind-of-process unit for transferring, when requested for a first kind of process, an electronic document needed for executing the first kind of process to said server via the network, and requesting said server to execute the first kind of process with respect to the electronic document; and
  a second-kind-of-process unit for solely executing, when requested for a second kind of process, the second kind of process without linkage with said server,
  wherein said server executes the first kind of processes that said plurality of multifunction machines request said server to execute by judging by the parent operation management unit of the server whether a connection request from the multifunction machine is acceptable and allocating one of the server child processing units to the multifunction machine, if judged the connection request is acceptable, and
  wherein the server child processing unit starts a server first kind of process requested by the multifunction machine.

2. A multifunction machine communicably connected via a network to a server, comprising:
  scanner means for generating image data of document;
  first-kind-of-process executing means for executing a first kind of process in linkage with said server, which utilizes the image data generated by said scanner means;
  second-kind-of-process executing means for executing a second kind of process requiring no operation in linkage with said server, which utilizes the image data generated by said scanner means;
  designating means for designating said first- or second-kind-of-process executing means based upon organizing and presenting, via display means, addressees according to a first- or second-kind-of-process;
  execution control means for making, when said designating means designates the first- or second kind of process, said scanner means generate the image data, and making said first- or second-kind-of-process executing means execute the first or second kind of process using the image data;
  state judging means for judging whether the first kind of process is in such a state as to be possible of linking with said server via a child processing unit in the server allocated to the multifunction machine; and
  designation control means for controlling, when said state judging means judges that the first kind of process is not in such a state as to be possible of linking with said server, said designating means so that said designating means is unable to designate the first kind of process,
  wherein said state judging means, when said multifunction machine is started up, and when a first predetermined time elapses since said state judging means makes a judgment of not being in an operable state in linkage with said server, transmits a request for establishing a connection to said server,
  said state judging means, judges to be in the operable state in linkage with said server, when a completion-of-assignment notification, which indicates the linkage operation is possible in response to the connection establishing request, is received from the server, and
  said state judging means, judges not to be in the operable state in linkage with said server, when the completion-of-assignment notification is not received from the server, or when a second predetermined time elapses since a latest connection establishing request has been transmitted to said server.

3. A multifunction machine according to claim 2, wherein the completion-of-assignment notification includes information about a function executable by said server, said state judging means recognizes the first-kind-of-process to which said server can correspond on the basis of the completion-of-assignment notification, and said designation judging means, when said state judging means makes the judgement of being in the operable state in linkage with said server, controls said designating means to inhibit, within the first-kind-of-process, a designation of a process excluding the process to which said server recognized by said state judging means can correspond.

4. A multifunction machine according to claim 2, further comprising:

operation mode information recording means for recording operation mode information indicating whether not said first-kind-of-process executing means is utilized, wherein said state judging means, when said operation mode information recording means is recorded with the operation mode information indicating that said first-kind-of-process executing means is not utilized, makes the judgment of not being in the operable state in linkage with said server without trying to communicate with said server.

5. A multifunction machine according to claim 2, wherein said execution control means, when a plurality of processes are designated by said designating means, makes said scanner means generate the image data, and controls said first- or second-kind-of-process executing means to execute the plurality of processes designated by use of the image data in common.

6. A multifunction machine according to claim 2, wherein the first kind of process executed by said first-kind-of-process executing means contains a process of requesting said server to fax the image data generated by said scanner means.

7. A multifunction machine according to claim 2, wherein the first kind of process executed by said first-kind-of-process executing means contains a process of requesting said server to register the image data generated by said scanner means.

8. A multifunction machine according to claim 2, wherein the second kind of process executed by said second-kind-of-process executing means contains a process of requesting a node connected to the network to print the image data generated by said scanner means.

9. A multifunction machine according to claim 2, further comprising:

utilizing situation monitoring means for monitoring a situation of how each of said first- and second-kind-of-process executing means is utilized;

utilizing situation information recording means recorded with utilizing situation information defined as monitored result of said utilizing situation monitoring means; and utilizing situation information transmitting means for transmitting to said server the utilizing situation information recorded in said utilizing situation information recording means.

10. A multifunction machine according to claim 9, wherein said utilizing situation information recording means is non-volatile recording means, and includes:

destruction detecting means for detecting a destruction of the utilizing situation information recorded in said utilizing situation information recording means; and utilizing situation information managing means for, when said destruction detecting means detects a destruction of the utilizing situation information, requesting said server to send the utilizing situation information: on, said self multifunction machine, and making said utilizing situation information recording means recorded with the utilizing situation information received as a response to the above request.

11. A multifunction machine according to claim 2, further comprising:

displaying means capable of displaying the image data, wherein said execution control means makes, before causing said first- or second-kind-of-process executing means to execute the first or second kind of process, said displaying means display the image data generated by said scanner means, and makes, only when indicated to continue the process, said first- or second-kind-of-process executing means execute the designated first or second kind of process which uses the image data.

12. A multifunction machine according to claim 2, wherein said designating means comprising a touch panel having a function of displaying an image and a function of outputting positional information on a touch position, and said designation control means controls said designating means to display an image through which a designation-inhibited process can not be designated from the first or second kind of process.

13. A multifunction machine comprising:

a scanner unit for generating image data by scanning an image;

a printer unit for printing the image data;

a communications control unit for transmitting the image data onto a network;

a line control unit for transmitting the image data onto a public line;

a main control unit for controlling said scanner unit, said printer unit, said communications control unit and said line control unit in order to actualize a scanner function of sending the image data generated by said scanner unit onto the network for saving the image data, a copy function of transmitting the image data to said printer unit and executing the printing of the image data, a print function of sending the image data onto the network, and a FAX function of sending the image data onto the public line;

an operation unit for performing an operation of designating two or more arbitrary addressees according to a type of function from among all addressees to which the image data can be sent via the network and/or the public line, in advance of the generation of the image data by said scanner unit; and an interlocking operation control unit for executing data format conversion scheduling based upon the designating of addressees according to a type of function so the image data generated by said scanner unit are suited to be distributed to all the addressees designated by the operation of said operation unit.

14. A multifunction machine according to claim 13, further comprising:

a recording unit stored with the image data generated by said scanner unit, wherein said main control unit further includes compression/extension processing means for executing a compression process upon the image data, thus storing said recording unit with the compressed image data, and executing an-extension process upon the compressed image data by reading the same, image data from said recording unit.

15. A multifunction machine according to claim 13, wherein said operation unit further includes designating means for designating the number of prints, and said interlocking operation control unit further includes number-of-prints distributing means for distributing to the addressees a total number of prints, which is designated by said designating means.

16. A multifunction machine according to claim 15, wherein said number-of-prints distributing means distributes the designated total number of prints in accordance with sorting capabilities of a plurality of addressees.

17. A multifunction machine according to claim 15, wherein said number-of-prints distributing means distributes the designated total number of prints in accordance with print processing capabilities of the plurality of designated addressees.

* * * * *

UNITED STATES PATENT AND TRADEMARK OFFICE
CERTIFICATE OF CORRECTION

| | | |
|---|---|---|
| PATENT NO. | : 7,173,721 B1 | |
| APPLICATION NO. | : 09/360520 | |
| DATED | : February 6, 2007 | |
| INVENTOR(S) | : Sumitake Kobayashi et al. | |

It is certified that error appears in the above-identified patent and that said Letters Patent is hereby corrected as shown below:

Column 39, Line 67, change "information: on," to --information on--.

Signed and Sealed this

Twenty-second Day of May, 2007

JON W. DUDAS
*Director of the United States Patent and Trademark Office*